United States Patent
Beausoleil, Jr. et al.

(10) Patent No.: US 6,195,475 B1
(45) Date of Patent: Feb. 27, 2001

(54) NAVIGATION SYSTEM FOR HANDHELD SCANNER

(75) Inventors: Raymond G. Beausoleil, Jr., Redmond, WA (US); Ross R. Allen, Belmont, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/153,639

(22) Filed: Sep. 15, 1998

(51) Int. Cl.$^7$ .................................................. G06K 9/20

(52) U.S. Cl. ........................................................ 382/312

(58) Field of Search ..................................... 382/312, 313, 382/314, 315, 316, 317, 318, 319, 320, 321, 322, 323, 324; 250/556, 557, 208.1, 559.44; 235/462

(56) References Cited

U.S. PATENT DOCUMENTS

| | | | |
|---|---|---|---|
| 4,719,584 | * 1/1988 | Rue et al. | 364/516 |
| 4,849,906 | * 7/1989 | Chodos et al. | 364/516 |
| 4,912,519 | 3/1990 | Yoshida et al. | 356/28 |
| 5,578,813 | 11/1996 | Allen | 250/208.1 |
| 5,644,139 | 7/1997 | Allen et al. | 250/557 |
| 5,657,402 | * 8/1997 | Bender et al. | 382/284 |
| 5,764,871 | * 6/1998 | Fogez | 395/127 |
| 5,805,742 | * 9/1998 | Whitsitt | 382/275 |
| 5,825,044 | 10/1998 | Allen et al. | 250/557 |
| 5,920,657 | * 7/1999 | Bender et al. | 382/284 |
| 5,960,097 | * 9/1999 | Pfeiffer et al. | 382/103 |
| 6,122,078 | * 9/2000 | Leberl et al. | 358/474 |

FOREIGN PATENT DOCUMENTS

| | | | |
|---|---|---|---|
| 0730366A2 | 9/1996 | (EP) | H04N/1/107 |

OTHER PUBLICATIONS

Aschwanden, et al., "Experimental Results From A Comparative Study On Correlation–Type Registration Algorithms", Electronics Laboratory, pp. 268–289 (no date).

Choi, et al., "Contrast enhancement of missile data through image sequence stabilization and product correlation", SP1E vol. 2182 Image and Video Processing II, pp. 164–175 (1994).

Secilla, et al., "Locating Templates In Noisy Enviroments", Proceedings of THE 5th Scandinavian Conference on Image Analysis, pp. 101–108 (Jun. 2–5, 1987).

Mostafavi, et al., "Image Correlation with Geometric Distortion Part II: Effect on Local Accuracy", IEEE Transactions on Aerospace and Electronic Systems, vol. AES–14, No. 3, pp. 494–500 (May 1978).

Smith, et al., "Optimum windows for image registration", SPIE vol. 186 Digital Processing of Aeial Images, pp. 98–107 (1979).

(List continued on next page.)

Primary Examiner—Jose L. Couso

(57) ABSTRACT

A method and apparatus are provided for efficiently obtaining navigational position of a sensor array based on a correlation between images captured by the sensor array at successive points in time. This is achieved by first acquiring a reference frame through said sensor array, successively acquiring a sample frame through said sensor array. Correlation data representing a relationship between the sample frame and the reference frame is then generated and a displacement of a reference feature contained in both the reference frame and the sample frame is determined based on the correlation data. The correlation surface of the correlation data is modeled as a general two-dimensional Taylor series expansion. The method and apparatus of the present invention can be advantageously employed in a scanning device to provide efficient scheme for obtaining navigational information based on a comparison of image frames captured by a sensor array of the scanning device at successive points in time.

26 Claims, 41 Drawing Sheets-

OTHER PUBLICATIONS

Jain, et al., "Displacement Measurement and Its Application in Interframe Image Coding", IEEE Transactions on Communications, vol. COM–29, No. 12, pp. 1799–1808 (Dec. 1981).

Whitten, "Scale Space Tracking and Deformable Sheet Models for Computational Vision", IEEE Transactions On Pattern And Machine Intelligence, vol. 15, No. 7, pp. 697–706 (Jul. 1993).

Silver, "Normalized Correlation Search in Alignment, Gauging, and Inspection", SPIE vol. 755 Image Pattern Recognition: Algorithm Implementations, Techniques and Technology, pp. 23–34 (1987).

Eklund, et al., "Real–Time Visual Tracking Using Correlation Techniques", Second IEEE Workshop on Applications of Compute Vision, pp. 256–263 (Dec. 5–7, 1994).

Steding, et al., "Optimum filters for image registration", SPIE vol. 186 Digital Processing of Aerial Images, pp. 88–97 (May 22–24, 1979).

Eckert, et al., "Effect of tracking strategies on the velocity structure of two–dimensional image sequences", Journal of the Optical Society of America A, Optics and Image Science, vol. 10, No. 7, pp. 1582–1585 (Jul. 1993).

Takemori, et al., "Resolution improvement in speckle displacement and strain sensor by correlation interpolation", SPIE vol. 1553 Laser Interferometry IV: Computer–Aided Interferometry, pp. 137–148 (1991).

Voles, et al., "Interpolating sampled cross–correlation surfaces of images for fine registration", IEEE Proceedings–F, Communications, Radar and Signal Processing, vol. 127, Pt. F, No. 5, pp. 401–404 (Oct. 1980).

Mostafavi, et al., "Image Correlation With Geometric Distortion Part 1: Acquistion Performance", IEEE Transactions On Aerospace and Electronic Systems vol. AES–14, No. 3, pp. 487–492 (May 1978).

* cited by examiner

| $C_2$ | $C_3$ | $C_4$ |
|---|---|---|
| $C_1$ | $C_0$ | $C_5$ |
| $C_8$ | $C_7$ | $C_6$ |

↔

| f(−1, 1) | f(0, 1) | f(1, 1) |
|---|---|---|
| f(−1, 0) | f(0, 0) | f(1, 0) |
| f(−1, −1) | f(0, −1) | f(1, −1) |

FIG. 18

$b_{10} = 2 [ (C_4 + C_5 + C_6) - (C_0 + C_3 + C_7) ] - \frac{1}{2} b_{20}$ $b_{01} = \frac{3}{2} [ (C_3 + C_4) - (C_6 + C_7) ] - \frac{1}{2} b_{11}$ $b_{10} = 2 [ (C_0 + C_3 + C_7) - (C_1 + C_2 + C_8) ] + \frac{1}{2} b_{20}$ $b_{01} = \frac{3}{2} [ (C_2 + C_3) - (C_7 + C_8) ] + \frac{1}{2} b_{11}$ $b_{10} = \frac{3}{2} [ (C_4 + C_5) - (C_1 + C_2) ] - \frac{1}{2} b_{11}$ $b_{01} = 2 [ (C_2 + C_3 + C_4) - (C_0 + C_1 + C_5) ] - \frac{1}{2} b_{02}$ $b_{10} = \frac{3}{2} [ (C_5 + C_6) - (C_1 + C_8) ] + \frac{1}{2} b_{11}$ $b_{01} = 2 [ (C_0 + C_1 + C_5) - (C_6 + C_7 + C_8) ] + \frac{1}{2} b_{02}$

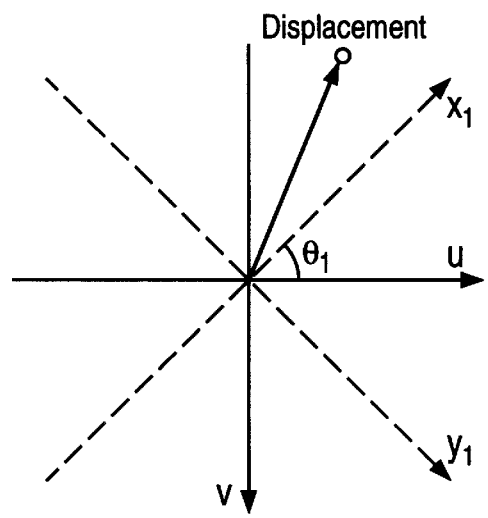
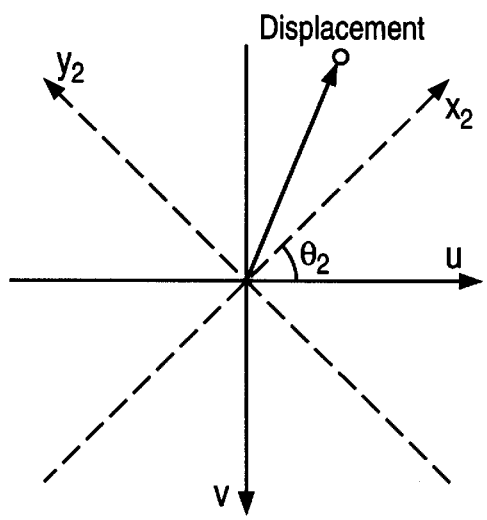
FIG. 45A　　　　　FIG. 45B
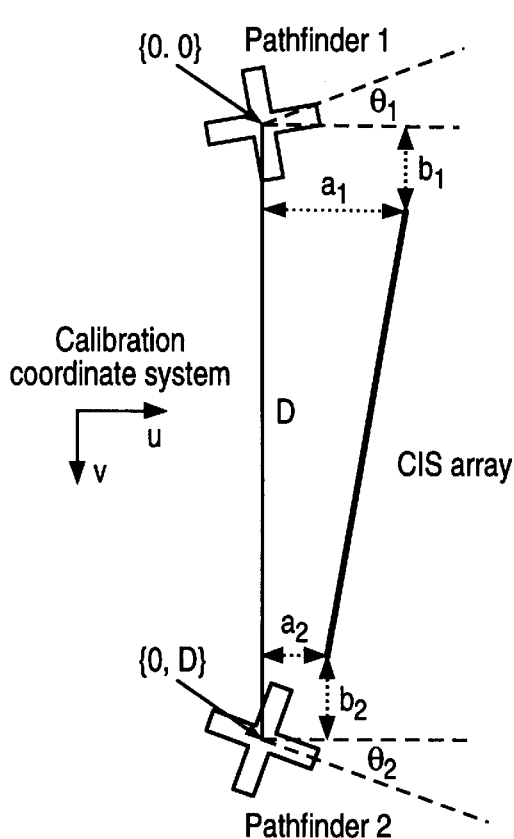
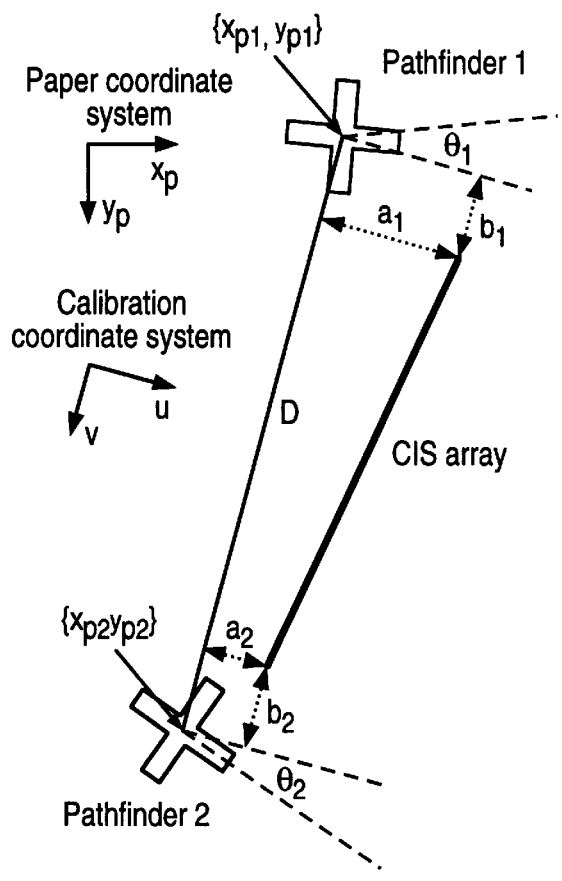
FIG. 46A　　　　　FIG. 46B Navigation Path Reconstruction Algorithm 1. Define Rom-stored constants $$C_1 = \frac{m_1}{D} \cos \theta_1 \qquad C_2 = \frac{m_2}{D} \cos \theta_2$$

$$S_1 = \frac{m_1}{D} \sin \theta_1 \qquad S_2 = \frac{m_2}{D} \sin \theta_2$$

$$A_1 = \frac{a_1}{D} \qquad B_1 = \frac{b_1}{D}$$

$$A_2 = \frac{a_2}{D} \qquad B_2 = \frac{b_2}{D}$$

2. Transform navigator displacements into calibration frame $$\Delta u_1 = C_1 \Delta x_1 + S_1 \Delta y_1$$
$$\Delta v_1 = C_1 \Delta y_1 + S_1 \Delta x_1$$
$$\Delta u_2 = C_2 \Delta x_2 + S_2 \Delta y_2$$
$$\Delta v_2 = C_2 \Delta y_2 + S_2 \Delta x_2$$

3. Update navigator positions in paper frame
   Define the temporaries $c_p \equiv y_{p2} - y_{p1}$ and $s_p \equiv x_{p2} - x_{p1}$, and then compute $$x'_{p1} = x_{p1} + \Delta u_1 c_p + \Delta v_1 s_p$$
$$y'_{p1} = y_{p1} - \Delta u_1 s_p + \Delta v_1 c_p$$
$$x'_{p2} = x_{p2} + \Delta u_2 c_p + \Delta v_2 s_p$$
$$y'_{p2} = y_{p2} - \Delta u_2 s_p + \Delta v_2 c_p$$

4. Compute CIS endpoint positions in the paper frame
   Define the temporaries $c'_p \equiv y'_{p2} - y'_{p1}$ and $s'_p \equiv x'_{p2} - x'_{p1}$, and then compute $$x'_{c1} = x'_{p1} + A_1 c'_p + B_1 s'_p$$
$$y'_{p1} = y'_{p1} - A_1 s'_p + B_1 c'_p$$
$$x'_{p2} = x'_{p2} + A_2 c'_p - B_2 s'_p$$
$$y'_{p2} = y'_{p2} - A_2 s'_p - B_2 c'_p$$

FIG. 49

NAVIGATION SYSTEM FOR HANDHELD SCANNER

BACKGROUND OF THE INVENTION

1. Field of the Invention

The present invention relates generally to navigation techniques based on sensor arrays and, more particularly, to navigation techniques used in scanning devices.

2. Related Art

Navigational schemes to determine a position of a sensor array are used in a variety of applications. For example, these navigational schemes can be employed to correlate images captured by a scanning device or to determine a position of a cursor-control device, such as a mouse.

Scanners for electronically forming an image of an original are known. Typically, the captured image provided by a scanner is a pixel data array that is stored in memory in a digital format. A distortion-free image requires a faithful mapping of the original image to the pixel data array. Scanners typically include at least one means for imposing a mechanical constraint during the image capture process in order to maximize the likelihood of faithful mapping.

The four types of scanners known in the art are drum scanners, flatbed scanners, two-dimensional array scanners and hand scanners. Drum scanners attach the original to the surface of a cylindrical drum that rotates at a substantially fixed velocity. During the rotation of the drum, an image sensor is moved in a direction parallel to the rotational axis of the drum. The combination of the linear displacement of the image sensor and the rotation of the original on the drum allows the entire original to be scanned. At any moment during the imaging process, the current position within the pixel data array relative to the original can be determined by measuring the angular position of the drum and the translational position of the sensor. The position of the pixel data array with respect to the original is fixed as long as the original is properly attached to the drum, the drum rotation is properly controlled, and the sensor is properly controlled in its displacement along the linear path.

Flatbed scanners include a linear array sensor that is moved relative to the original along an axis that is perpendicular to the axis of the array. Thus, the position of the sensor in one dimension may be known by tracking the relative movement of the sensor. The position of the sensor in the perpendicular direction is implicitly fixed by addressing a particular array element at which intensity is to be measured. In one embodiment of the flatbed scanner, the original is placed on a transparent platen and the sensor, along with an image illumination source, is placed on a side of the platen opposite to the original. As long as the original is not moved relative to the platen, the pixel data array will be fixed with respect to the image to be captured. In another embodiment, the original is moved, rather than the sensor. This second embodiment is typical of facsimile machines. Precision paper transports provide a high degree of positional accuracy during the image-capture process.

Advantages of the drum and flatbed scanners include the ability to accommodate documents at least as large as A4, or 8.5"×11" paper. Moreover, some of these scanner can handle Al paper in a single setup. However, the scanners are not generally portable, since they require a host computer for control, data storage and image manipulation.

Two-dimensional array scanners may be used in the absence of mechanical encoding constraints, and require only that the array and original be held motionless during an exposure period. A two-dimensional array of photosensitive elements directly accomplishes the mapping of the image of the original into a pixel data array. However, because a single 300 dpi mapping of an 8.5"×11" original requires an image sensor having an array of 2500×3300 elements, i.e. 8.25 million pixels, these scanners are cost-prohibitive in most applications.

Conventional hand scanners require a user to move a linear array of electrooptical sensor elements over an original. The movement is by hand manipulation. Array-position information is determined using navigational methods such as those employed in operation of a computer "mouse." As a linear sensor array is moved, the rotation of wheels, balls or rollers that are in contact with the original is sensed, and the position information is determined from the mechanical details of the rotation. In general, the surface of the mechanical element in contact with the original has a high coefficient of friction, e.g. rubber, so as to resist slip and skid. A cylindrical roller or two wheels connected by a rigid axle may be used to enforce a single translational degree of freedom during the scanning process. A straight-edge or other fixture is often used to fix the scan direction with respect to the original and to further enforce the translational constraint provided by the pair of wheels or the roller. Nevertheless, the position encoder approach is one that is often susceptible to slips and skips, so that the pixel data array loses its correspondence with the image on the original.

Hand scanners are typically connected directly to a personal computer for image data storage, processing, and use. Data rates from the image sensor tend to limit the scanning speed. The scanners provide feedback to the user, typically by means of green or red light emitting diodes, to maintain the appropriate speed for the desired image resolution. Some hand scanners use electromagnetic brakes to prevent the user from dragging the scanner over the image too rapidly, with the mechanical resistance increasing with increases in scanning speed.

Hand scanners utilize relatively small imaging arrays and generally cannot handle larger than A6 documents in a single pass. This requires stitching algorithms to join together multiple swaths of a larger document. Swath stitching is done in a separate operation by the personal computer. Scanning a multi-page business document or report with a hand scanner is a tedious process that often yields low-quality results.

As previously noted, some type of fixture is typically used with a hand scanner. In the absence of a fixture, there is a tendency to impose some rotation as the hand scanner is moved across an original. If the user's elbow is resting on a flat surface during movement of the scanner, the rotation is likely to have a radius defined by the distance between the scanner and the user's elbow. As a consequence, the scanned electronic image will be distorted. Other curvilinear movements during the swath of the scanner will also create distortions.

What is needed is a navigation scheme that allows handheld scanners to accomodate curvilinear movement during a scanning process with a high degree of correspondence between the original image and the resulting image.

SUMMARY OF THE INVENTION

A method and apparatus are provided for efficiently obtaining navigational position of a sensor array based on a correlation between images captured by the sensor array at successive points in time. This is achieved by first acquiring a reference frame through said sensor array, successively acquiring a sample frame through said sensor array. Correlation data representing a relationship between the sample frame and the reference frame is then generated and a displacement of a reference feature contained in both the reference frame and the sample frame is determined based on the correlation data. The correlation surface of the correlation data is modeled as a general two-dimensional Taylor series expansion.

The method and apparatus of the present invention can be advantageously employed in a scanning device to provide efficient scheme for obtaining navigational information based on a comparison of image frames captured by a sensor array of the scanning device at successive points in time.

BRIEF DESCRIPTION OF THE DRAWINGS

FIG. 18 is a schematic diagram of the mapping between the 3×3 navigator pixel-shift correlation grid and the corresponding values of f(x, y) as defined by (6).

FIGS. 45A and 45B are schematic diagrams of the two navigator coordinate systems, embedded in the calibration reference frame. Note that navigator1 has a left-handed coordinate system, while that of navigator2 is right-handed. In the cases shown here, both rotation angles $\theta_1$ and $\theta_2$ are positive; in FIG. 2, $\theta_2$ is negative as shown.

FIGS. 46A and 46B are diagrams illustrating a comparison of the calibration and paper coordinate systems. These figures illustrate coordinate systems compatible with those chosen by S. Pollard.

FIG. 49 is a listing of a sequence of formulas needed to completely implement the worst-case navigation path reconstruction algorithm.

DETAILED DESCRIPTION OF THE INVENTION

Figure 1:
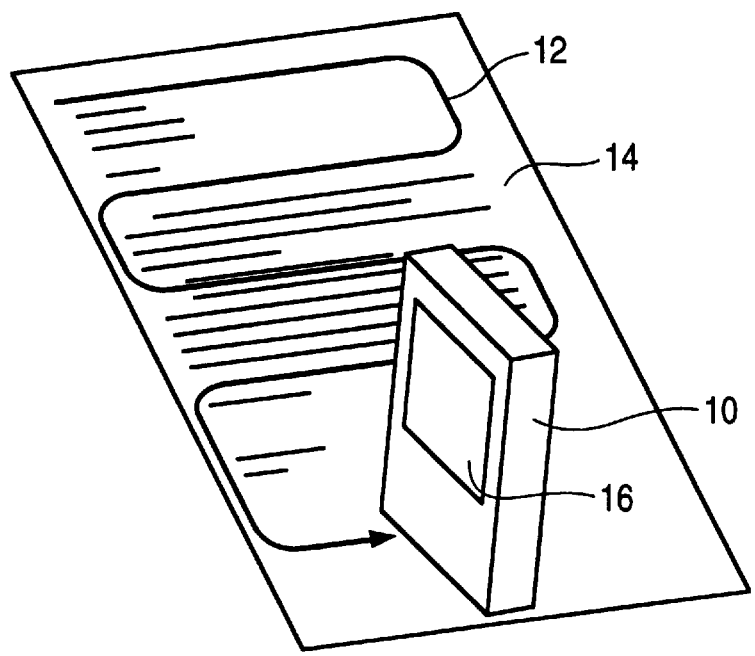
FIG. 1 is a perspective view of a hand-held scanning device following a meandering path on an original, in accordance to the invention.

A navigation method for a scanning device is provided. The navigation method entails acquiring a reference frame and sample frame by means of at least one navigation sensor that detects inherent structure-related properties of an original being scanned. Movement of an image sensor along the original may be tracked by monitoring variations of the inherent structure-related properties as the image sensor is moved relative to the original. Preferably, the inherent structure-related properties that are monitored are inherent structural features, such as paper fibers, or other constituents of the original. Navigation may also be speckled-based, wherein movement of the image sensor along the original is tracked by monitoring variations of speckle patterns produced using coherent illumination for acquiring the navigation information.

"Inherent structure-related properties" are defined herein as properties of the original that are attributable to factors that are independent of forming image data and/or of systematic registration data on the original. The navigation information may be formed by generating a position signal that is responsive to detection of inherent structure-related properties, such as a position signal of speckle information or a position signal that permits tracking of individual inherent structural features. "Inherent structural features" are defined herein as those features of an original that are characteristic of processes of forming the original and are independent of forming image data and/or systematic registration data on the original. For example, if the original recorded media is a paper product, the inherent structural features of interest may be paper fibers. As another example, navigation of the image sensor across a glossy original or an overhead transparency film may be determined by tracking surface texture variations that affect specular fields. Typically, the inherent structural features are microscopic, e.g. between 10 and 40 $\mu$m, features of surface texture.

Thus, the contemplated approaches to acquiring navigation information vary in scope. In the broadest approach, there is no limitation to the sources of navigation information that is to be used to remove distortion artifacts of curvilinear and rotational movement of the scanning device along a scan path. The navigation signal may therefore be in the form of a position signal that is responsive to detection of image data on the original (e.g., identification of edges of text characters), with the position signal then being used in the manipulation of an image signal. A narrower second approach is one in which a position signal is responsive to detection of inherent-structure related properties, such as the properties that determine speckle patterns.

The third approach is to track navigation of the scanning device by monitoring the positions of individual inherent structural features (e.g., paper fibers) over time. This third approach is the narrowest of the three, since it is actually a subcategory of the second approach.

In the preferred embodiment, the image sensor is a linear array of electrooptical elements, while the navigation approach utilizes at least one two-dimensional array of navigation sensor elements. By placing a separate two-dimensional navigation array at each end of the image sensor, the scanner is afforded three degrees of freedom of movement. If the original is planar, two of the degrees of freedom are translational and are perpendicular to each other within the plant of the original, while the third degree of freedom is rotational about the normal to the plane of the original. The accuracy of rotation tracking is enhanced by the use of two navigation arrays, with each array having a smaller array extent than would be necessary if only a single navigation array were used. While the preferred embodiment is one in which a navigation sensor is a two-dimensional array, linear arrays may also be used. Moreover, as will be described more fully below, navigation information for rectifying image data could feasibly be acquired by fixing other position-tracking means to the scanning device, including encoding wheels and balls, computer mice track balls, registration grid-detectors, accelerometers, mechanical linkages, non-contacting electromagnetic and electrostatic linkages and time-delay integration sensor arrays. In many of these alternative embodiments, navigation information for rectifying the image data is acquired in manners independent of any inherent structure-related properties of the original, since position tracking does not include image acquisition.

The navigation sensors are in a known position relative to the image sensor. Preferably, the navigation sensors are as close to the end points of the imaging sensor as possible, so that the navigation sensors are less susceptible to traveling beyond the edge of an original as the image array is moved. The image sensor forms a signal that is representative of an image of interest. Simultaneously, each navigation sensor forms a signal representative of the inherent structure-related properties of the original. The scanning device may be moved in a freehand meandering pattern, such as one of alternating left-to-right and right-to-left movements with descent along the original, with the device remaining in contact with the original. Each one of the side-to-side swaths should overlap a portion of the previous swath, so that the image may be manipulated with respect to position and stitched either during or following the scanning process. The manipulation of the image signal is a rectification of image data, with the rectification being based upon the relative movement between the navigation sensor or sensors and the inherent structure-related properties detected by the navigation sensors. The manipulation is a "rectification" of the image signal, i.e., an operation of arranging and modifying acquired image data based upon navigation data in order to achieve conformance between original and output images. The stitching is used to connect image data acquired during successive swaths.

Preferably, each navigation sensor includes one or more light sources designed to provide contrast dependent upon the inherent structure-related properties of the original. Emitted light may be in the visible range, but this is not essential. For example, "grazing" light that has large angles of incidence relative to the surface normal will interact with paper fibers at or near the surface of an original that is a paper product, creating contrast-enhancing shadows among the fibers. On the other hand, if the original has a glossy surface, such as a photographic print, a clay-coated paper or an overhead transparency film, normally incident light will produce an image in the specular field that has image-contrast features sufficient for purposes of navigation. Optical elements such as filters and one or more imaging lenses further improve detection of inherent structure-related properties.

With reference to FIG. 1, a portable, hand-held scanning device 10 is shown as having followed a meandering path 12 along an original 14. In the preferred embodiment, the original is a piece of paper, an overhead transparency film, or any other image-bearing surface upon which inherent structure-related properties of the original generate sufficient contrast to provide position information during navigation along the meandering path. Typically, the positions of inherent structural features are tracked and the position information is used to rectify image data, but other embodiments will be described. The scanning device is preferably self-contained and battery powered, but may include a connection to an external source of power or to data ports of computers or networks.

The scanning device 10 of FIG. 1 includes an image display 16. The display may provide almost immediate viewing of a captured image. However, a display is not essential to the use of the scanning device.

The scanning device 10 allows three degrees of freedom, with two being in translation and one in rotation. The first degree is the side-to-side movement (X axis movement) along the original 14. The second degree of freedom is movement upwardly and downwardly along the original (Y axis movement). The third degree of freedom is the ability to operate the device with rotational misalignment of a linear array of image sensor elements relative to an edge of the original 14 ($\theta$ axis movement). That is, the linear array of imaging elements may have an angle of attach that is not perpendicular to the direction of device translation.

Figure 2:
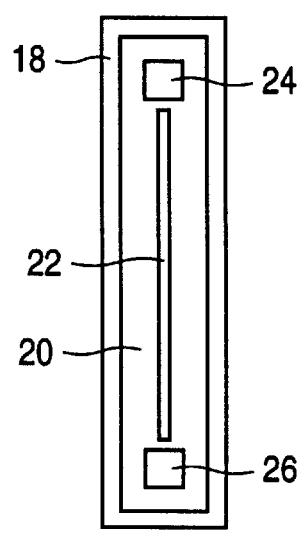
FIG. 2 is a rearward view of imaging and navigation sensors of the scanning device of FIG. 1.
Figure 3:
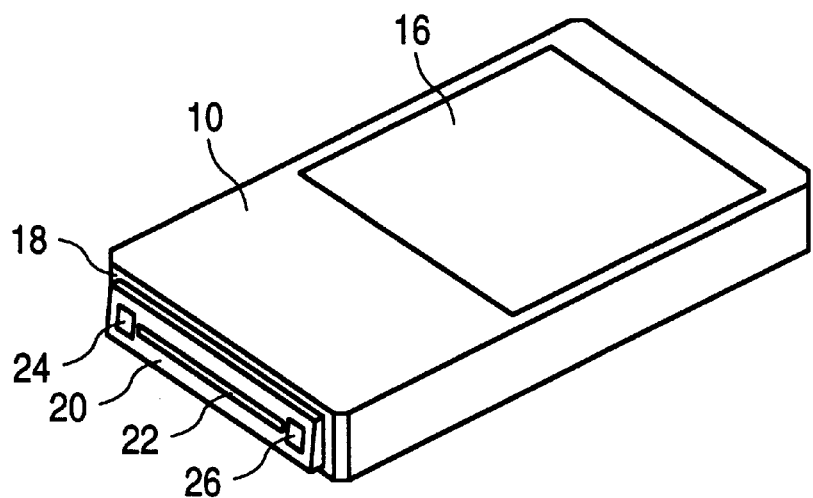
FIG. 3 is a perspective view of the scanning device of FIG. 1, shown with the imaging and navigation sensors exposed.

Referring now to FIGS. 1–3, the forward side 18 of the scanning device 10 includes a pivoting member 20 that aids in maintaining proper contact between the original 14 and an imaging sensor 22. Navigation sensors 24 and 26 are located at the opposed ends of the imaging sensor. Because the navigation sensors are mounted on the pivoting member, the navigation sensors are in a fixed location relative to the imaging sensor.

For reasons of physical compactness, the imaging sensor array 22 is preferably a contact image device, but for applications in which compactness is less of a concern or a smaller image is desired, sensors employing projection optics may be employed, with magnification less than unity. In such applications, the elements of the imaging sensor 22 should be smaller and more closely packed together. Contact imaging devices typically employ lenses sold under the trademark SELFOC, which is a federally registered mark of Nippon Sheet Glass Company Limited. Less conventionally, contact imaging can be obtained using interleaved array elements of sources and proximal sensors, without any imaging lenses. Conventional imaging sensors for scanning applications may be used. The imaging sensor may be part of a unit that also includes an illumination source, illumination optics, and image transfer optics.

The imaging sensor is shown as a linear array of discrete optically sensitive elements. The spacing of the elements plays a role in determining the spatial resolution of the scanner 10. For example, a linear array having a length of 101.6 mm requires 1200 sensor elements to achieve a resolution of 300 dpi. The sensor may be a charged coupled device, an amorphous silicon photodiode array, or any other type of linear array sensor known in the art.

A key consideration in the design of the imaging sensor unit is speed. The imaging sensor 22 preferably is able to image each pixel at approximately 10K samples per second. Linear imaging arrays generally produce a serial data stream, wherein pixel values, i.e. charges, are placed into a shift register and then shifted out. Achieving the desired speed requires either very fast serial transfer rates out of the entire image array or multiple taps, so that pixel values can be shifted through fewer cells. This introduces parallelism, which is advantageous for digital processing.

Another consequence of the speed requirement is that the products of pixel areas, at the surface of the original, and their solid angles of emitted light collected and conveyed to each array element should be sufficiently large to produce a detectable signal in integration times on the order of 100 microseconds. An enhancement option is to add an optical element to the sensor to increase the effective fraction of sensor pitch for which each sensing element is responsive. Since there is typically unused area in the array matrix, such light collection optics increase sensitivity.

A straightforward modification of the imaging sensor 22 enables sensing of color images. Three linear arrays parallel to one another, each with at least one embedded filter element that selectively passes red, green and blue components of the incident light respectively, would allow color imaging. Alternatively, a single array having broad-band sensitivity may be sequentially illuminated by red, green and blue light sources.

Regarding illumination for improving the operation of the imaging sensor 22, a linear array of high intensity light emitting diodes at the amber wavelength may be used. However, the selection of the preferred illumination source and any optical elements is dependent upon the medium of the original. The wavelength of the light is selected to maximize the contrast image data acquired during the scan of a given area of the original 14, while disregarding unwanted signals. Illumination optics may consist of LED dome lenses or may include a light pipe consisting of a precision-molded optical element that channels the illumination onto the original with a minimal amount of light loss. Such a design can afford a relatively uniform illumination of a target area of the original at a wide range of angles, but blocks normal incident rays in order to avoid specular surface reflections.

In FIG. 1, the meandering path 12 is shown as having four and a fraction swaths, i.e., side-to-side passes across the original 14. A useful imaging sensor 22 for most opportunistic applications has a length within the range of 25.4 mm and 101.6 mm. If the sensor 22 has a length of 63.5 mm, an A4 paper can be scanned in four or five swaths. As will be explained more fully below, the swaths should include regions of overlap, so that a stitching process can be used to produce a faithful reproduction of the original image.

The scanning device 10 typically includes at least one navigation sensor 24 or 26. In the preferred embodiment, the device includes a pair of navigation sensors, with these sensors being at opposite ends of the imaging sensor 22. While a one-dimensional array of optoelectornic elements may be used, in the preferred embodiment, each navigation sensor is a two-dimensional array of elements. The navigation sensors 24 and 26 are used to track movement of the scanning device 10 relative to the original 14.

In the preferred embodiment, each navigation sensor 24 and 26 captures images related to inherent structure-related properties of the original in order to produce information related to the position of the scanning device 10. For most prior art scanning devices, inherent structural features are considered to be noise. For the scanning device 10 of FIGS. 1–3, such features are noise with regard to the imaging sensor 22, but may be used to provide a basis for the navigation sensors 24 and 26 to generate position information. Useful, high-contrast images of surface texture can be generated by detecting structural variations that are inherent to the medium or are formed on the medium, e.g., text. For example, images may be formed based upon the contrast between shadows in valleys and bright spots at the peaks of inherent structural features. Such features are typically microscopic in nature, often ranging between 10 $\mu$m and 40 $\mu$m in size on common printed media. As an alternative, speckle may be used, since specular reflection of a coherent beam produces a contrast pattern of bright and dark areas. A third source of contrast information is color. Color contrast is independent of surface texture. Even when illuminating the texture-free surface with light in the visible range, color contrast exists between regions of different colors, e.g. between different shades of gray.

However, it is contemplated to use the invention for applications in which navigation information is independent of inherent structure-related properties of the original. For example, one or both of the navigation sensors 24 and 26 of FIG. 2 may be used to form successive images being used to determine the position and the orientation of the image sensor 22 along the original 14. In this embodiment, all three sensors 22, 24 and 26 image text on the original, but only the signal from the sensor 22 is used to acquire image data. The signals from the navigation sensors 24 and 26 are used to acquire image-based navigation information.

Non-imaging approaches can also be used to acquire and process X, Y and theta position information. Unfortunately, many of the alternative means impose various limitations upon compactness, convenience of use, speed, freedom of motion, power consumption, accuracy, precision, and/or cost. One imaging-independent alternative available to acquiring position information is to provide one or more encoding wheels in place of the navigation sensors. The encoding wheels may then roll without slip upon the scanned surface, enabling the scanning device to travel along straight or curvilinear trajectories. It is not critical that the encoding wheels be on a common axis. The wheels may be mounted to swivel. Encoders coupled to monitor rotations would provide the input data from which to calculate position and orientation of an imaging sensor relative to a starting position and orientation.

Another image-free approach to acquiring navigation information is to use track balls similar to those for a computer mouse. A track ball could be used in place of each encoder wheel described above. Encoders would be used to obtain two-dimensional displacement information from each track ball. In another approach, optical or electronic (capacitive, resistive or inductive) sensors may be used in place of the navigation sensors of FIG. 2 in order to sense position and orientation relative to a cooperative (active or passive) grid or other reference constructed in an underlying tablet that, in turn, serves as a support for the original being scanned.

Another image-free approach to acquiring position and orientation information is to provide an accelerometer. An on-board inertial navigation platform may be used, with accelerations being sensed and integrated either once to obtain velocities or twice to obtain positions. Or velocities of spring-suspended masses could be sensed and integrated once in order to obtain positions. Gyroscopes could be employed in a direct sensing of orientation.

Yet another alternative approach would be to use any of a variety of mechanical linkages with which to track position and orientation relative to reference coordinates fixed with respect to the medium being scanned. Position and orientation information could be obtained by means of sensors coupled to measure the relative movement of the mechanical members. These sensors could be of either the relative or absolute type and could be based on direct position and orientation sensing, or the sensing of accelerations or velocities that would then be integrated with respect to time, once or twice, to obtain positions. Non-contacting remote sensing could also be used to measure position and orientation of the scanning device relative to reference coordinates fixed with respect to the scanned original. Example of such non-contacting sensing would include those that use electromagnetic fields, waves or beams (e.g. at optical or radio frequencies): electric effects (e.g. capacitive); and/or magnetic effects (e.g. inductive). These approaches could utilize standard or differential Global Positioning technologies and potentially could use satellites. These approaches can also include traditional navigation/surveying methods, such as triangulation. They could also include techniques employed in robotics technologies, such as using shaped light beams and interpreting position from images of where these beams intercept the moving object.

The navigation sensors 24 and 26 of FIG. 2 effectively observe a moving image of the original 14 and produce an indication of the displacement in two planar dimensions between successive observations. As will be explained more fully below, pixel values from the navigation sensors are operated upon by processing elements to determine proper mapping of image data from the imaging sensor 22. The processing elements operate on a particular pixel and its nearest neighbors to produce an array of correlation values at each pixel location. The correlation values are based upon comparison between a current image of the surface structure and a stored image representing a known position of inherent structural features, wherein the stored image serves as a position reference. However, operations other than the correlation process may be employed in manipulating the input image data to form the output image.

Figure 4:
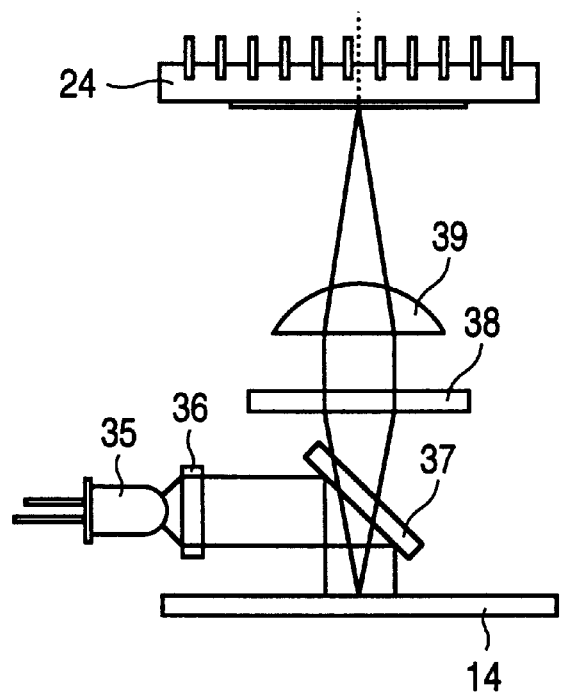
FIG. 4 is a schematical side view of an illumination system for one of the navigation sensors of FIG. 3.
Figure 5:
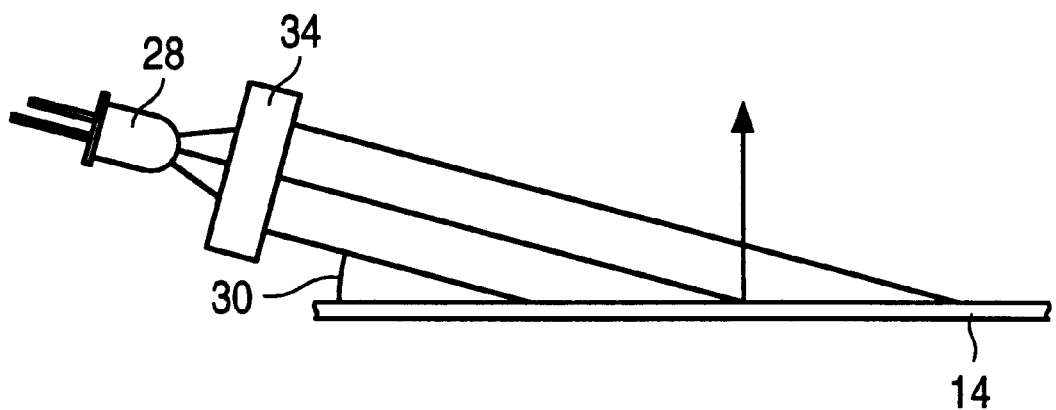
FIG. 5 is a side schematical view of a light emitting diode and optical elements for providing the illumination described with reference to FIG. 4.

Referring now to FIGS. 4 and 5, navigation sensor 24 is shown as being operatively associated with illumination optics. If the original 14 is a paper product for which paper fibers are to be detected by the navigation sensor 24, the introduction of light at a grazing angle of incidence is preferred. While not essential, one or more light emitting diodes (LEDs) 28 may be used. The grazing angle 30, which is the completion of the angle of incidence, is preferably in the range of zero degrees and fifteen degrees, but this may change depending upon the properties of the original 14. In FIG. 5, the source 28 is shown with illumination optics 34. The optics may comprise a single element or a combination of lenses, filters and/or holographic elements to accomplish suitable collimated and generally uniform illumination of the target surface. The wavelength of the light emitted by the source 28 should be selected to enhance the spatial frequency information available for navigation. Fixed pattern noise in the illumination field should be minimized. The output of source 28 may require adjustment to accommodate wide dynamic ranges of reflectivity of the medium as the scanning device proceeds over printed materials with absorbing or reflecting inks or other marking agents.

In FIG. 4, light from a source 25 is collimated at a illumination optics 36 and then redirected by an amplitude splitting beam-splitter 37. That portion of the light energy from the LED directly to and transmitted through the beam-splitter is not shown in FIG. 4. The light energy from the beam-splitter illuminates the original 14 along the normal to the surface.

Also represented in FIG. 4 is the portion of the light energy that is reflected or scattered from the original 14 and passed through the beam-splitter 37 for aperturing and filtering at element 38 and focusing to an image at element 39. The portion of light energy passing from the original to the beam-splitter and reflecting from the beam-splitter is not shown. The magnification of navigation imaging optics should be constant over the field-of-view of the two-dimensional sensor array 24 which detects the focused light. In many applications, the modulation transfer functions, i.e. the amplitude measure of optical frequency response, of the navigation optics must be such as to provide attenuation before the Nyquist frequency that is determined by the pitch of the sensor elements of the navigation sensor and by the magnification of the optical elements. The optical elements should also be designed to prevent background illumination from creating noise. Note that a wavefront splitting beam-splitter could also be used.

The selection of the angle of incidence depends upon the material properties of the original. Grazing angles of illumination generate longer shadows and more apparent contrast, or AC signal if the surface of the original is not glossy. The DC signal level, however, increases as the illumination angle approaches the normal to the original.

Illuminating the target region of the original 14 at a grazing angle 30 works well for applications in which the surface of the original has a high degree of unevenness at the microscopic level. For example, the introduction of light from the source 28 at a grazing angle provides a high signal-to-noise ratio of data related to inherent structural features when the original is stationery, cardboard, fabric, or human skin. On the other hand, the use of incoherent light at a normal angle of incidence may be preferred in applications in which position data is needed to track scanner movement along such originals as photographs, glossy magazine pages, and overhead transparency films. With normal illumination, using incoherent light, viewing the original in the specularly reflected field will provide an image that is sufficiently rich in texture content to allow image and correlation-based navigation. The surface of the original has a microscopic relief such that the surface reflects light as if the surface were a mosaic of tiles, or facets. Many of the "tiles" of an original reflect light in directions slightly perturbed from the normal. A field of view that includes the scattered light and the specularly reflected light can thus be modeled as though the surface were composed of many such tiles, each titled somewhat differently with respect to the normal. This modeling is similar to that of W. W. Barkas in an article entitled "Analysis of Light Scattered from a Surface of Low Gloss into Its Specular and Diffuse Components," in *Proc. Phys. Soc.*, Vol. 51, pages 274–292 (1939).

FIG. 4 shows illumination by a source 35 of incoherent light, which is directed along the normal of the surface of the original 14. FIG. 5 describes illumination at a grazing angle 30. In a third embodiment, no illumination is provided. Instead, the navigation information is accumulated using background light, i.e. light from the environment.

In a fourth embodiment, coherent illumination is introduced at normal incidence to permit speckle-based navigation. Relative motion between a scanning device and an original may be tracked by monitoring motion of speckle relative to the navigation sensors. If coherent illumination is used without using imaging optics, then by selecting a small area of illumination and by having a relatively large separation between the surface of the original and the photodetector array of the navigation sensor 24, the resulting predominant speckle cell sizes with coherent illumination are sufficiently large to satisfy the Nyquist sampling criterion. The use of a beam splitter allows the direction of both the incident illumination and the detected scatter to be near to normal to the surface of the original, as similarly accomplished in FIG. 4

Figure 6:
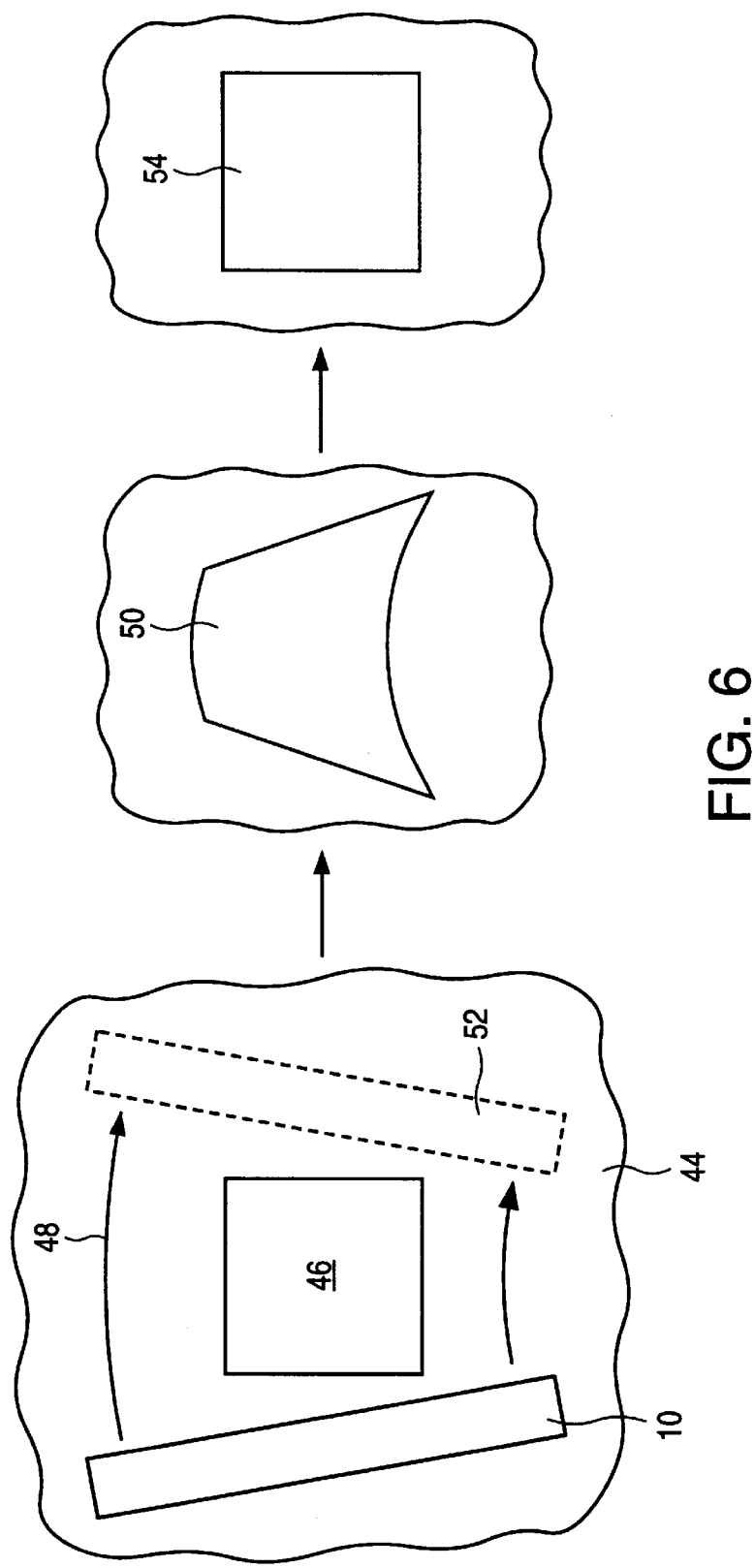
FIG. 6 is a conceptual view of the image capture operation of the scanning device of FIG. 1.

Referring now to FIG. 6, the scanner 10 is shown as being moved across an original 44 having a block 46 imprinted onto a surface of the original. Because the scanner 10 is not subjected to any kinematic constraints in the plane of the original, there is a tendency for a user to follow a curvilinear path across the original, as when the forearm of the user rotate about the elbow. In FIG. 6, the scanning device is shown as following a curved path 48 across the block 46. If the lower edge of the scanning device is the edge that is closer to the elbow that defines the axis of rotation, the lower edge will have a shorter radius. Consequently, imaging elements of an imaging sensor will vary with respect to the time and distance required to pass over the block 46. A distorted image 50 of the block is captured as the device is moved to the second position 52, shown in dashed lines.

The captured image 50 would be the stored image in the absence of processing to be described below. However, as the imaging sensor captures data related to the block 46, navigation information is acquired. In the preferred embodiment, one or more navigation sensors capture data related to inherent structural features of the original 44. Movement of the inherent structural features relative to the scanning device 10 is tracked in order to determine displacement of the imaging sensor relative to the block 46. A faithful captured image 54 may then be formed. The image 54 is defined herein as the "rectified" image.

Figure 7:
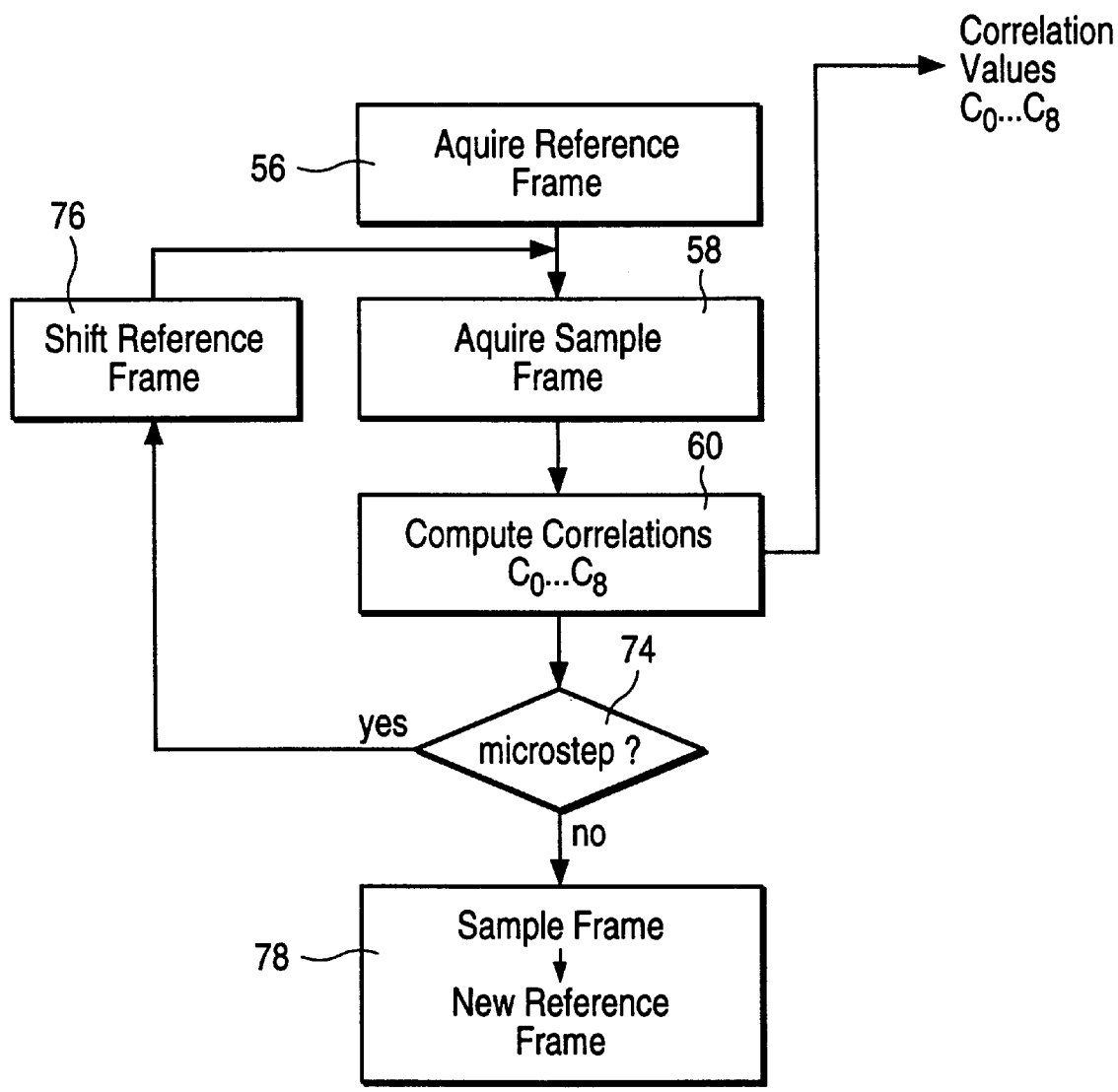
FIG. 7 is an operational view of one embodiment of the navigation processing of the scanning device of FIG. 1.

In FIG. 7, one embodiment of navigation processing is shown. The navigation processing is performed by correlating successive frames of navigation information, such as data related to inherent structural features. The correlations compare the positions of the inherent structural features in successive frames to provide information related to the position of a navigation sensor at a particular time. The navigation information is then used to rectify image data. The processing of FIG. 7 is typically performed for each navigation sensor.

In a first step 56, a reference frame is acquired. In effect, the reference frame is a start position. The position of a navigation sensor at a later time may be determined by acquiring 58 a sample frame of position data from the navigation sensor at the later time and then computing correlations 60 between the reference frame and the later-acquired sample frame.

Acquiring the initial reference frame 56 may take place upon initiation of the imaging process. For example, the acquisition may be triggered by mere placement of the scanning device into contact with the original. Alternatively, the scanning device may include a start button that initiates the image process and the navigation process. Initiation may also take place by a periodic pulsing of the illumination system of each navigator. If there is a reflected signal that exceeds a prescribed threshold of reflection or a correlation signal that indicates motion, the reference frame is then acquired.

While the navigation processing is performed computationally, the concepts of this embodiment may be described with reference to FIGS. 7 and 8. A reference frame 62 is shown as having an image of T-shaped inherent structural feature 64. The size of the reference frame depends upon factors such as the maximum scanning speed of the scanning device, the dominant spatial frequencies in the imaging of the structural features, and the image resolution of the sensor. A practical size of the reference frame for a navigation sensor that is thirty-two pixels (N) by sixty-four pixels (M) is 24×56 pixels.

At a later time (dt) a navigation sensor acquires a sample frame 66 which is displaced with respect to frame 62, but which shows substantially the same inherent structural features. The duration dt is preferably set such that the relative displacement of the T-shaped feature 64 is less than one pixel of the navigation sensor at the velocity of translation of the scanning device. An acceptable time period is 50 µs for velocities of 0.45 meters/sec at 600 dpi. This relative displacement is referred to herein as a "microstep".

If the scanning device has moved during the time period between acquiring 56 the reference frame 62 and acquiring 58 the sample frame 66, the first and second images of the T-shaped feature will be ones in which the feature has shifted. While the preferred embodiment is one in which dt is less than the time that allows a full-pixel movement, the schematic representation of FIG. 8 is one in which the feature 64 is allowed to shift up and to the right by one pixel. The full-pixel shift is assumed only to simplify the representation.

Figure 8:
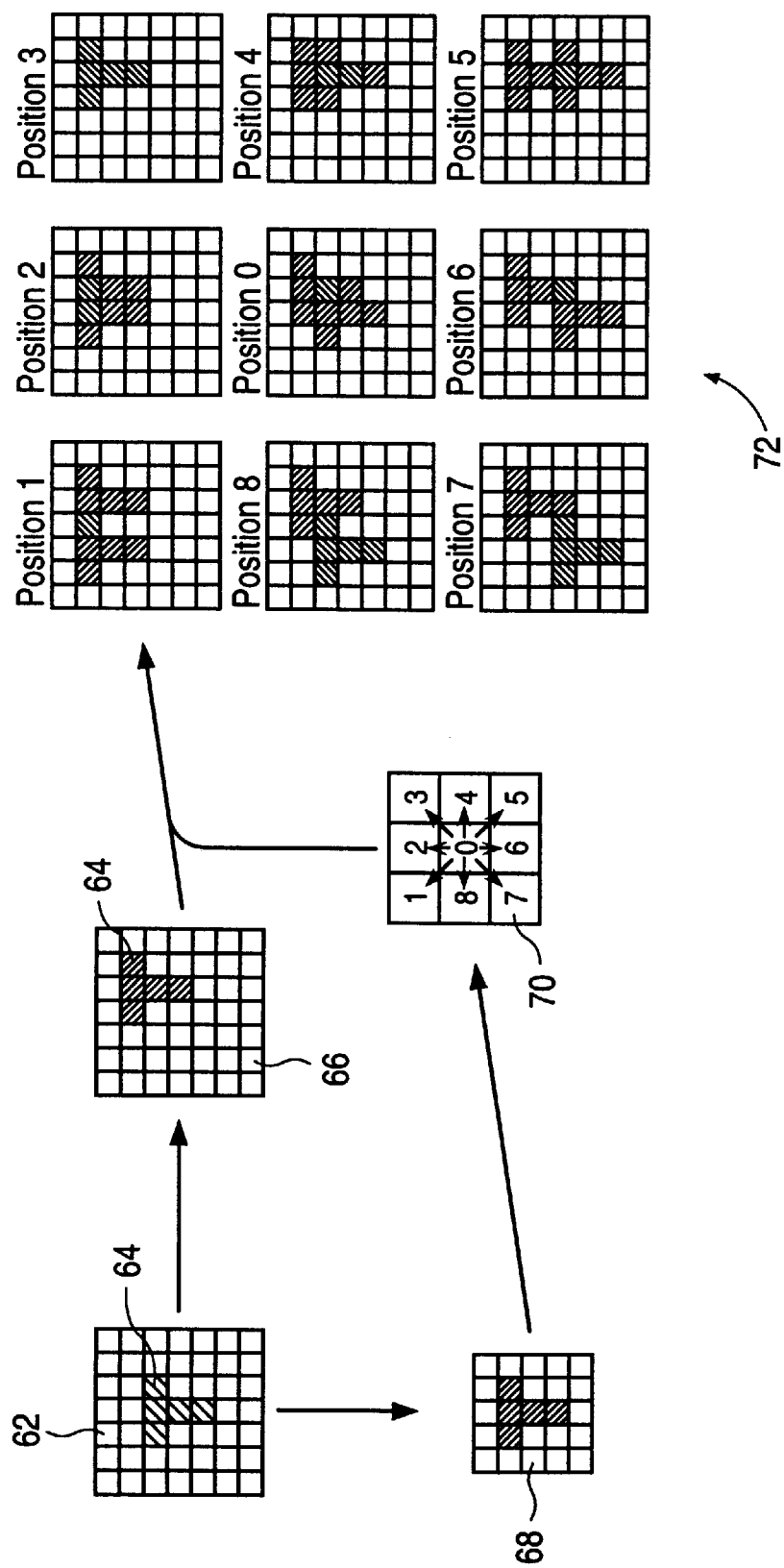
FIG. 8 is a schematical view of selected steps of FIG. 7.

Element 70 in FIG. 8 represents a sequential shifting of the pixel values of frame 68 into the eight nearest-neighbor pixels. That is, step "0" does not include a shift, step "1" is a diagonal shift upward and to the left, step "2" is an upward shift, etc. In this manner, the pixel-shifted frames can be combined with the sample frame 66 to produce the array 72 of position frames. The position frame designated as "Position 0" does not include a shift, so that the result is merely a combination of frames 66 and 68. "Position 3" has the minimum number of shaded pixels, and therefore is the frame with the highest correlation. Based upon the correlation results, the position of the T-shaped feature 64 is the sample frame 66 is determined to be a diagonal rightward and upward shift relative to the position of the same feature in earlier-acquired reference frame 62, which implies that the scanning device has moved leftwardly and downwardly during time dt.

While other correlation approaches may be employed, an acceptable approach is a "sum of the squared differences" correlation. For the embodiment of FIG. 8, there are nine correlation coefficients ($C_k = C_0, C_1 \ldots C_8$) formed from the nine offsets at element 70, with the correlation coefficients being determined by equation:

$$C_k = \sum_i \sum_j (S_{ij} - R_{(ij)+k})^2$$

where $S_{ij}$ denotes the navigation sensor-measured value at the position ij of the sample frame 66 and $R_{ij}$ denotes the navigation sensor-measured value at the frame 68 as shifted at the element 70 in the k direction, with k being the identifier of the shift at element 70. In FIG. 8, k=3 provides the correlation coefficient with the lowest value.

Correlations are used to find the locations of identical features in successive frames in order to determine the displacements of the features from frame-to-frame. Summing or integrating these displacements and correcting for scale factors introduced through the design of the relevant optics determine the displacements of the imaging sensor as a scanning procedure progresses.

As previously noted, the frame-to-frame correlations are referred to as "microsteps," since frame rates are chosen to be sufficiently high to ensure that the displacements do not exceed the dimension of a single pixel. Oversampling can provide sub-pixel displacement precision. Referring to FIG. 7, a determination 74 of whether a microstep is to be taken is made following each computation 64 of the correlations. If a microstep is required, the reference frame is shifted at 76. In this step, the sample frame 66 of FIG. 8 becomes the reference frame and a new sample frame is acquired. The correlation computation is then repeated.

While the process provides a high degree of correlation match, any errors that do occur will accumulate with each successive shift 76 of a sample frame 66 to the reference frame designation. In order to place a restriction on the growth rate of the "random walk" error, a sample frame is stored in a separate buffer memory. This separately stored sample frame becomes a new reference frame for a subsequent series of correlation computations. The latter correlation is referred to as a "macrostep."

By using macrosteps, a more precise determination of scanner displacement across a distance of m image frame displacements, i.e. m microsteps, can be obtained. The error in one macrostep is a result of a single correlation calculation, whereas the equivalent error of m microsteps $m^{1/2}$ times the error in a single microstep. Although the average of errors in a m microsteps approaches zero as m increases, the standard deviation in the average of errors grows as $m^{1/2}$. Thus, it is advantageous to reduce the standard deviation of accumulated error by using macrosteps having m as large as practical, as long as the two frames that define a macrostep are not so far spaced from one another that they have no significant region of common image content.

The sampling period dt does not have to be constant. The sampling period may be determined as a function of a previous measurements. One method that employs a variable dt is to improve the accuracy of displacement calculation by keeping the relative displacement between successive reference frames within certain bounds. For example, the upper bound may be one-pixel displacement, while the lower bound is determined by a numerical roundoff considerations in the processing of the navigation data.

Figure 9:
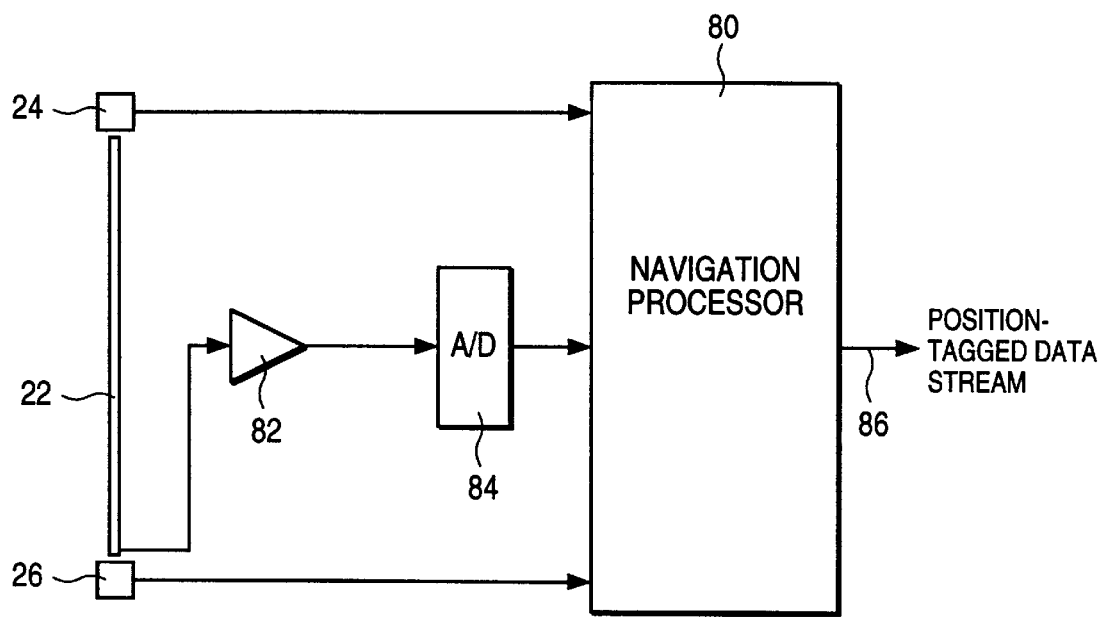
FIG. 9 is a block diagram of the components for carrying out the steps of FIG. 8.
Figure 10:
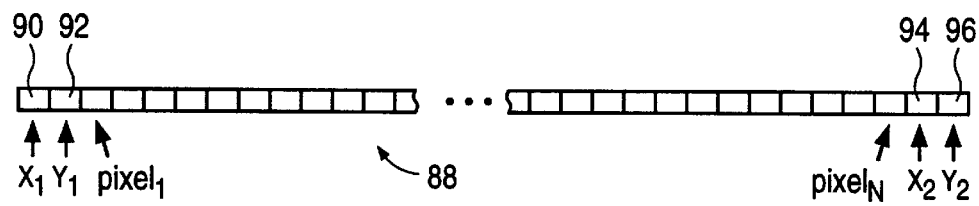
FIG. 10 is a representation of a position-tagged data stream typical of that output in FIG. 9.

Referring again to FIG. 9, the image signal generated at the imaging sensor 22 may then be "positioned-tagged" based upon the navigation data. In one embodiment, pixel values from the two navigation sensors 24 and 26 are received by a navigation processor 80 for performing the operations of FIGS. 7 and 8. Based upon the computed correlations, coordinates are determined for the current position of the first navigation sensor 24 ($X_1$, $Y_1$) and for the current position of the second navigation sensor 26 ($X_2$, $Y_2$). The navigation processor 80 also receives pixel values of the imaging sensor 22 via a pixel amplifier 82 and an analog-to-digital converter 84. Although FIG. 9 shows only a single tap from the image sensor 22 and a singled A/D converter 84, multiple taps, each with an A/D converter, are within the scope of the invention. The current position coordinates of the navigation sensors are "tagged" at the ends of a line of data that corresponds to the number of pixels within the imaging sensor. The output 86 of the navigation processor 80 is therefore a position-tagged data stream. In FIG. 10 an increment 88 of data stream is shown as having position coordinate cells, 90, 92, 94 and 96 at the opposite ends of N pixel cells, although this ordering is not essential.

The x and y components of the translation are computed by using a completely analytic navigation algorithm for paper-fiber position transducers that models an arbitrary correlation surface as the general second-order two-dimensional Taylor-series expansion $f(x,y) = a_{00} + a_{01}y + a_{20}x^2 + a_{11}xy + a_{02}y^2$. This choice is motivated by investigating the application of a general affine transformation (such as an arbitrary composition of rotations, shears, and reflections) in the {x,y} plane, followed by a three-dimensional translation, to an elliptic paraboloid embedded in three-dimensional space. The general linear least-squares problem is formulated by comparing the data stored in the 3×3 correlation grid with the expected values computed using the second-order six-parameter model. The optimum values of these six parameters are computed by minimizing analytically the corresponding sum of the squared errors, obtaining a solution set consisting of simple linear combinations of the correlation data values. Given this known set of optimum model parameters, the two-dimensional translation of the correlation surface in the {x,y} plane is calculated. The algorithm is efficient, and a validity test for the displacement solution can be performed at negligible computational cost. Although the current navigator nonzero-mean difference-detection correlation surface is of particular interest, this algorithm can be applied to any approximately second-order surface with a global extremum at the translation point.

In principle, this algorithm can be executed after each paper-fiber image has been captured and loaded into the comparison frame. In practice, however, if the two-dimensional translation becomes large enough, the quadratic approximation of the correlation surface may fail, and the computed displacement may become inaccurate. Navigation errors can be linearized by fixing the shape of the surface immediately after autocorrelating each new reference paper-fiber image. Three independent methods are described for reducing the magnitude of these errors: the use of a cubic correlation function; correlation surface reshaping; and post-process linear correction. A collection of modified algorithms which require only four-cell and six-cell subsets of the data stored in the 3×3 correlation grid, are also described for possible use near pixel edges and corners.

The need for precise and accurate position prediction prior to execution of the fundamental navigation algorithm makes it desirable to use a class of numerically efficient position predictors that can be used by the navigator microstep algorithm to ensure that the experimental domain will be restricted to a one-square-pixel boundary centered on the origin.

A class of "smoothing" algorithms can be applied to further reduce statistical errors in stored macrostep coordinates.

The Elliptic Paraboloid as a Model of the Correlation Surface

Paper-Fiber Image Correlation

Figure 14:
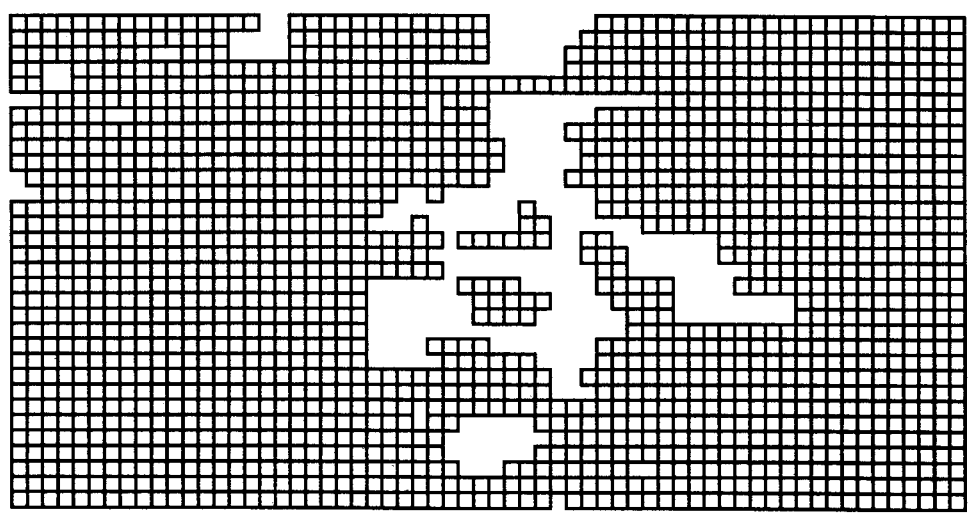
FIG. 14 is a diagram representing a paper-fiber image set imaged via a sensor array.

The ultraportable scanner navigation transducer (navigator) initially captures an image of the illuminated paper fibers directly under the photosensor array, as shown in FIG. 14. The navigator subsequently performs real-time correlation processing using a nonzero-mean difference-detection function with the form.

$$C_{i,j}^k = \sum_{m=1}^{M} \sum_{n=1}^{N} |r_{m,n} - c_{m-i,n-j}|^k, \qquad (1)$$

where $r_{m,n}$ ($c_{m,n}$) is the digitized value of the reference (comparison) image at pixel {m,n}, and i, j ∈ Z represent the shift of the comparison frame relative to the reference frame, measured in units of pixels. Typically, k∈N, although in principle we can have k∈R>1.

Application of (1) to a collection of relatively displaced images of the same geoo graphic region of paper fibers yields a "bowl-shaped" correlation surface like that shown in FIG. 15. Any successful navigation scheme must first build an accurate numerical model of this correlation surface. Although the complexity of the model must be constrained by requirements of the real-time navigation system, the scope of the model itself limits the ultimate accuracy with which the navigator can estimate the relative position of the sensor. With this compromise in mind, we attempt to represent the correlation bowl with an elliptic paraboloid; this quadratic model directs our intuition of the behavior of the navigation algorithm, and then allows us to place the navigation problem on a firm mathematical foundation.

Figure 15A:
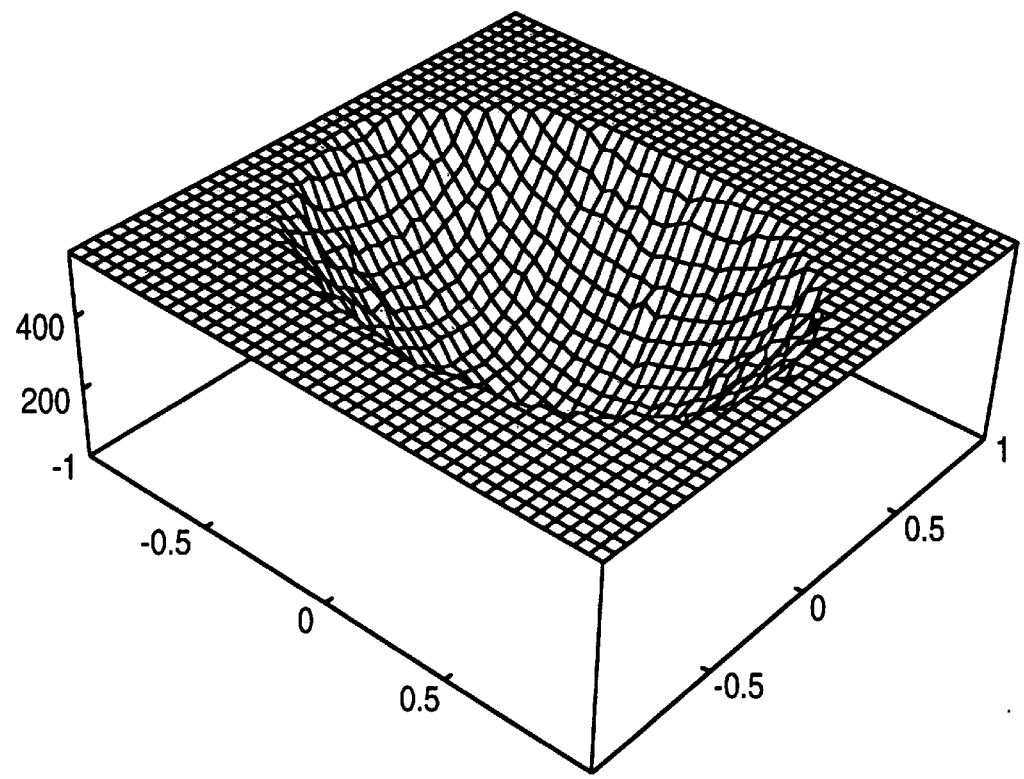
FIGS. 15A and 15B are diagrams of a correlation surface computed by applying the "sum-of-differences-squared" correlation function $C_{0,0}{}^2$, defined by (1), to the paper-fiber image data set of FIG. 14.
Figure 15B:
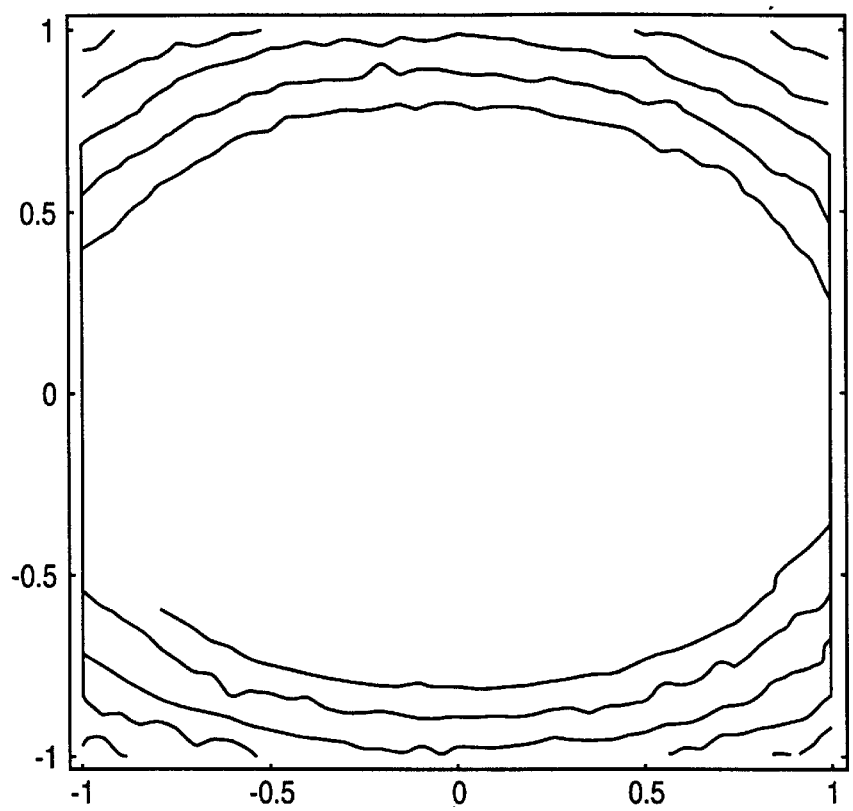

FIGS. 15A and 15B are diagrams of a correlation surface computed by applying the "sum-of-differences-squared" correlation function $C_{0,0}{}^2$, defined by (1), to the Magellan paper-fiber image data set of FIG. 14.

Affine Transformations and the Elliptic Paraboloid

We motivate our choice of a second-order function of x and y as an initial idealized three-dimensional model representation of the navigator correlation surface by considering a simple elliptic paraboloid described by $z'=f'(x', y')$, where $$z'=f'(x',y')=q_{20}x'^2+q_{02}y'^2. \tag{2}$$

If $q_{20}, q_{02} > 0$, then the surface has a unique minimum $z'=0$ at $\{x', y'\}=\{0, 0\}$. In this case, the major and minor axes of the ellipse formed by the intersection of $f'(x', y')$ with a particular contour plane $z'=z_0$ constant are given by $\sqrt{z_0/q_{20}}$ and $\sqrt{z_0/q_{02}}$, respectively.

By applying a general two-dimensional affine transformation in the $\{x', y'\}$ plane to the surface $z'=f'(x', y')$, the inverse of that transformation is represented in the cartesian basis by the matrix $$c = \begin{bmatrix} c_{11} & c_{12} \\ c_{21} & c_{22} \end{bmatrix}. \tag{3}$$

In the case of a rotation about the z' axis by an angle $\phi$, c, has the form $$c \equiv R(\phi) = \begin{bmatrix} \cos\phi & \sin\phi \\ -\sin\phi & \cos\phi \end{bmatrix}. \tag{4}$$

Note, however, that (3) also represents 2D transformations such as shears and reflections, as well as arbitrary compositions of subsequent rotations, shears, and reflections.

The application of the 2D affine transformation is followed by a general 3D translation by the vector $\{x_0, y_0, z_0\}$, fitting within the laboratory reference frame specified by the coordinates $\{x, y, z\}$. By inverting both the translation and the affine transformation (in order), the original (primed) coordinates of the unperturbed correlation surface can be expressed in terms of the laboratory coordinates as $$x'=c_{11}(x-x_0)+c_{12}(y-y_0), \tag{5a}$$

$$y'=c_{21}(x-x_0)+c_{22}(y-y_0), \tag{5b}$$

and $$z'=z-z_0. \tag{5c}$$

Figure 16:
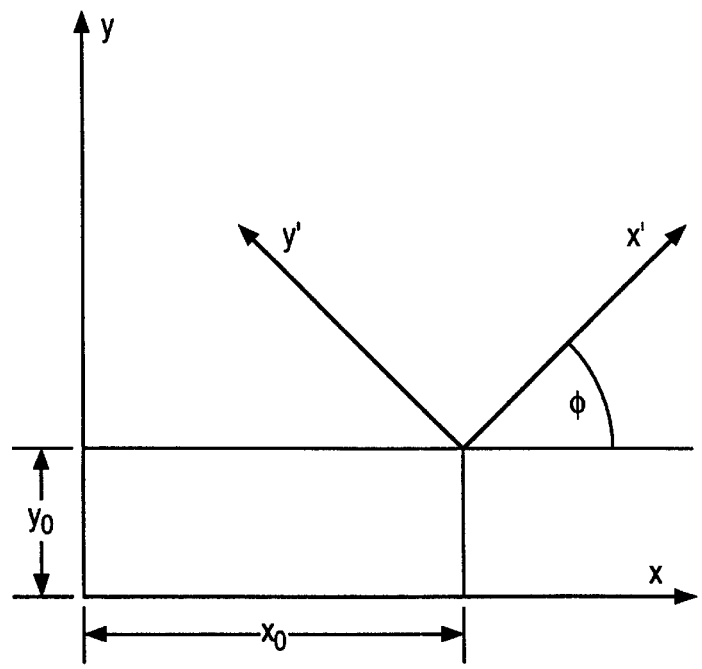
FIG. 16 is a schematic diagram illustrating the 2D affine transformation given by (5a) and (5b), in the special case of a rotation about the z'-axis by an angle $\phi$, and a subsequent translation by the vector $\{x_0, y_0\}$.

FIG. 16 is a schematic diagram of the 2D affine transformation given by (5a) and (5b), in the special case of a rotation about the z'-axis by an angle $\phi$, and a subsequent translation by the vector $\{x_0, y_0\}$ A functional form for the transformed model surface in the laboratory coordinate system $\{x, y, z\}$ is obtained by substituting equations (5a)–(5c) into (2), namely $z=f(x, y)$, where $$f(x,y)=a_{00}+a_{10}x+a_{01}y+a_{20}x^2+a_{11}xy+a_{02}y^2 \tag{6}$$

and $$a_{20}=q_{20}c_{11}{}^2+q_{02}c_{21}{}^2, \tag{7a}$$

$$a_{02}=q_{20}c_{12}{}^2+q_{02}c_{22}{}^2, \tag{7b}$$

$$a_{11}=2(q_{20}c_{11}c_{12}+q_{02}c_{21}c_{22}), \tag{7c}$$

$$a_{10}=-(a_{11}y_0+2a_{20}x_0), \tag{7d}$$

$$a_{01}=1(a_{11}x_0+2a_{02}y_0), \tag{7e}$$

and $$a_{00}=z_0+a_{11}x_0y_0+a_{20}s_0{}^2+a_{02}y_0{}^2 \tag{7f}$$

Note that the transformed surface in the laboratory coordinate system has six terms of the form $a_{mn}x^m y^n$, where $\{m,n\}\epsilon\{0,1,2\}$ and $0 \leq m+n \leq 2$. Furthermore, the two coefficients $a_{10}$ and $a_{01}$ can be uniquely expressed in terms of the displacements $\{x_0, y_0\}$, allowing us to invert (7d) and (7e) to find $$x_0 = \frac{a_{01}a_{11} - 2a_{10}a_{02}}{4a_{20}a_{02} - a_{11}^2} \tag{8a}$$

$$y_0 = \frac{a_{10}a_{11} - 2a_{10}a_{02}}{4a_{20}a_{02} - a_{11}^2} \tag{8b}$$

In other words, once the five coefficients $a_{10}, a_{01}, a_{20}, a_{11}$, and $\{x_0, y_0\}$ are numerically determined, the components of the translation vector $\{x_0, y_0\}$ can be computed without explicitly finding either the elements of the inverse transformation matrix c or the two coefficients $q_{2,0}$ and $q_{0,2}$.

Figure 17A:
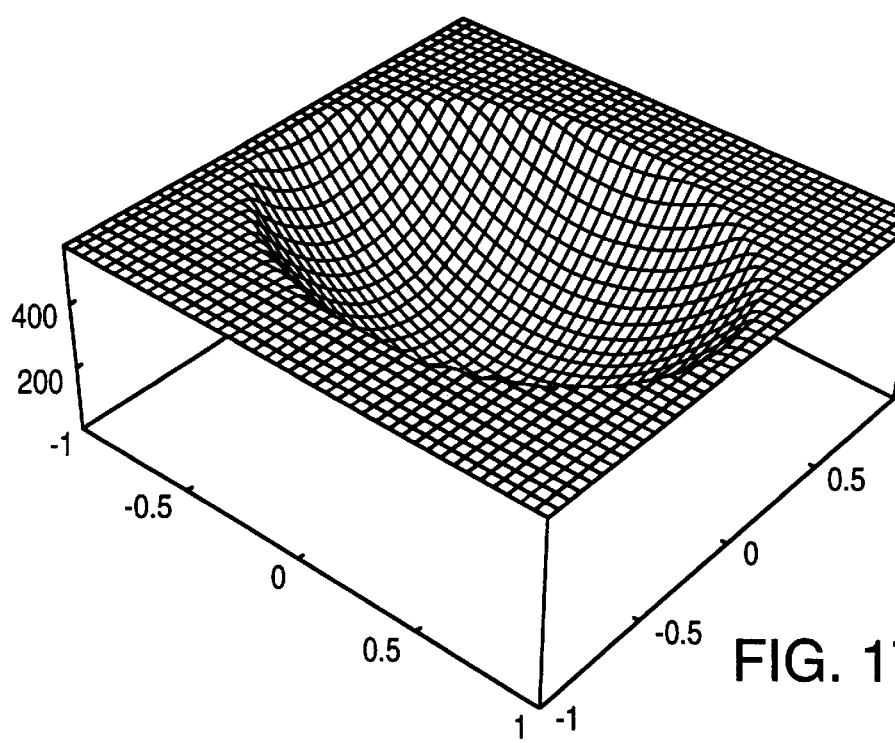
FIGS. 17A and 17B are diagrams illustrating the best numerical least squares fit of (6) to the data shown in FIGS. 15A and 15B.
Figure 17B:
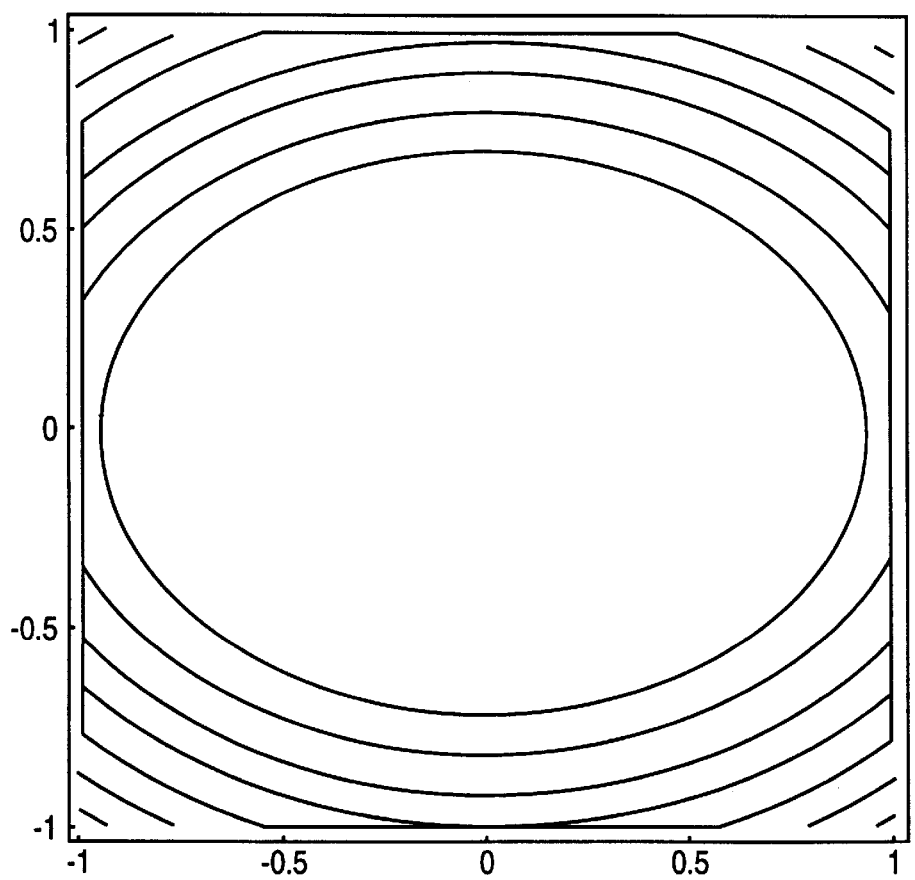

FIGS. 17A and 17B are diagrams illustrating a best least-squares fit surface obtained by applying the model function $f(x,y)=a_{00}+a_{10}x+a_{01}y+a_{20}x^2+a_{11}xy+a_{02}y^2$ to the data shown in FIG. 15A and 15B, where $a_{00}=132, a_{10}=8, a_{01}=12, a_{20}=526, a_{11}=24$, and $a_{02}=934$.

FIG. 18 is a schematic diagram of the mapping between the 3×3 navigator pixel-shift correlation grid and the corresponding values of $f(x, y)$ as defined by (6). Note that the correlation values have been labelled according to the original Magellan scheme (were $C_0 \equiv C_{0,0}{}^k, C_1 \equiv C_{-1,0}{}^k$, etc.)

An Efficient Analytic Solution to the Navigation Problem
The General Linear Least-Squares Solution In practice, a numerical least-squares fit to a high-resolution correlation surface cannot be performed in real time. Instead, after each paper-fiber comparison image has been captured by the navigator, the correlation bowl is sampled by computing the correlation function $C_{i,j}{}^k$ (relative to some previously acquired reference image) on some regularly defined grid. For example, $i,j\epsilon\{-1,0,1\}$ yields a square 3×3 grid containing nine correlation numbers, with $C_{0,0}{}^k$ located in the center cell. Consider then the general problem of finding the "best" second-order model capable of representing this limited set of pixel-shift correlation data generated by the navigator. That is, as represented schematically by FIG. 18 for the case of the 3×3 correlation grid (using the original Magellan labelling scheme, where $C_0 \equiv C_{0,0}{}^k, C_1 \equiv C_{-1,0}{}^k$, etc., values for the coefficients $\{a_{mn}\}$ must be found that allow f(x, y) to model the sum-of-squared-differences correlation data as accurately as possible.

Since there are six coefficients and nine correlation values, a purely algebraic approach to the navigation problem would require choosing among the nine data points in the grid to obtain a solution. Instead, we propose to use the well-known method of least-squares fitting, which is identical to the method of maximum likelihood estimation of the fitted parameters if the instrumental and statistical errors in the correlation data are both independent and follow the normal distribution. In principle, the correlation data values satisfy these assumptions, if care is taken to ensure that only calibrated pixel intensity measurements are used, thereby minimizing the impact of systematic errors on the computation of the correlation numbers. In practice, it is difficult to measure these errors (which, on the average, should be the same for each correlation cell), and in any case it is not clear that they would be useful in the short time allocated for position determination in the navigation system. Hence, we neglect these errors by implicitly rescaling $x^2$ to represent simply the sum of the squared deviations between the correlation values and the corresponding model estimates made using f(x, y):

$$x^2=[C_0-f(0,0)]^2+[C_1-f(-1,0)]^2+[C_2-f(-1,1)]^2$$
$$+[C_3-f(0,1)]^2+[C_4-f(1,1)]^2+[C_5-f(1,0)]^2$$
$$+[C_6-f(1,-1)]^2+[C_7-f(0,-1)]^2+[C_8-f(-1,-1)]^2 \quad (9)$$

Because f(x, y) is a linear function of the coefficients $\{a_{mn}\}$, $x^2$, is a nonlinear function of these variable parameters.

A numerical fit of f(x, y) to the nine correlation values $\{C_0 \ldots C_8\}$ is also not practical in a real-time system. At the minimum of $x^2$, the gradient with respect to the members of the parameter set $\{a_{mn}\}$ must vanish identically:

$$\frac{\partial}{\partial a_{mn}} x^2 = 0 \quad (10)$$

Hence, six independent equations in the six unknown parameters are obtained. This procedure is straightforward to follow using a computer algebra package such as Mathematica®. For the specific case of the 3×3 navigator grid we obtain $$a_{00}=\tfrac{1}{9}[5C_0+2(C_1+C_3+C_5+C_7)-(C_2+C_4+C_6+C_8)] \quad (11a)$$

$$a_{00}\tfrac{1}{6}[(C_4+C_5+C_6)-(C_1+C_2+C_8)] \quad (11b)$$

$$a_{01}=\tfrac{1}{6}[(C_2+C_3+C_4)-(C_6+C_7+C_8)] \quad (11c)$$

$$a_{11}=\tfrac{1}{4}[(C_4+C_8)-(C_2+C_6)] \quad (11d)$$

$$a_{20}=\tfrac{1}{6}[(C_1+C_2+C_8+C_4+C_5+C_6)-2(C_0+C_3+C_7)] \quad (11e)$$

$$a_{02}=\tfrac{1}{6}[(C_2+C_3+C_4+C_6+C_7C_8)-2(C_0+C_1+C_5)] \quad (11f)$$

Note that each coefficient $a_{mn}$ is expressed as a simple, unique linear combination of the nine correlation values $\{C_0, \ldots, C_8\}$. Since $x^2$ is positive definite by definition, this solution must represent a unique minimum. For verification, the eigenvalues of the Hessian matrix (discussed below) are $\{2, 4, 8, 12, 12, 36\}$; since they are all positive constants, the value obtained is indeed found a unique minimum.

We have already learned that the coefficients computed using equations (11b)–(11f) can be substituted into (8a) and (8b) to obtain the translations $x_0$ and $y_0$. However, by proceeding somewhat more formally, a useful validity test can be developed. As before, a minimum of f(x, y) is sought by asserting that the gradient with respect to the Cartesian coordinates $\{x, y\}$ vanishes at $\{x_0, y_0\}$:

$$\frac{\partial}{\partial x} f(x,y)\Big|_{\{x,y\}\to\{x0,y0\}} = \frac{\partial}{\partial y} f(x,y)\Big|_{\{x,y\}\to\{x0,y0\}} = 0. \quad (12)$$

Here two equations in the two unknowns $\{x_0, y_0\}$ are obtained, that when solved yield (8a) and (8b) directly as the position of the candidate minimum. In the elliptic paraboloid model, since the minimum of f'(x', y') occurs at the origin, the minimum of f(x, y) is located at $\{x_0, y_0\}$.

This point can be further investigated by computing the elements of the Hessian matrix as $$H(x,y) = \begin{bmatrix} \frac{\partial^2}{\partial x^2}f(x,y) & \frac{\partial^2}{\partial x \partial y^2}f(x,y) \\ \frac{\partial^2}{\partial x \partial y^2}f(x,y) & \frac{\partial^2}{\partial x^2}f(x,y) \end{bmatrix} = \begin{bmatrix} 2a_{20} & a_{11} \\ a_{11} & 2a_{02} \end{bmatrix}. \quad (13)$$

The eigenvalues of H are $$\lambda_\pm = a_{20}+a_{02} \pm \sqrt{(a_{20-a_{02})^2+a_{11}}}. \quad (14)$$

If both eigenvalues are positive (negative), then f($x_0$, $y_0$) is a minimum (maximum); if the eigenvalues have opposite signs, the surface is saddle-shaped. Hence, $$a_{20}+a_{02} > \sqrt{(a_{20-a_{02})^2+a_{11}}} \text{ for a minimum; or} \quad (15a)$$

$$a_{20}+a_{02} > -\sqrt{(a_{20-a_{02})^2+a_{11}}} \text{ for maximum.} \quad (15b)$$

But these constraints are identical to the computationally simpler condition $$Det(H)=\lambda_+\lambda_-=(a_{20}+a_{02})^2-[(a_{20}-a_{02})^2+a_{11}^2]=4a_{20}a_{02}=a_{11}^2>0, \quad (16)$$

followed by one of the tests $$a_{20}+a_{02}>0 \text{ for a minimum; or} \quad (17a)$$

$$a_{20}+a_{02}>0 \text{ for a maximum.} \quad (17b)$$

Since f(x, y) is required to be a minimum at $\{x_0, y_0\}$, the diagnostic conditions (16) and (17a) are embedded in the run-time navigation system. If these tests fail, then the correlation surface deviates grossly from the ideal elliptic paraboloid shape, and a member of the class of predictors described in below are used to provide a position measurement.

Figure 19A:
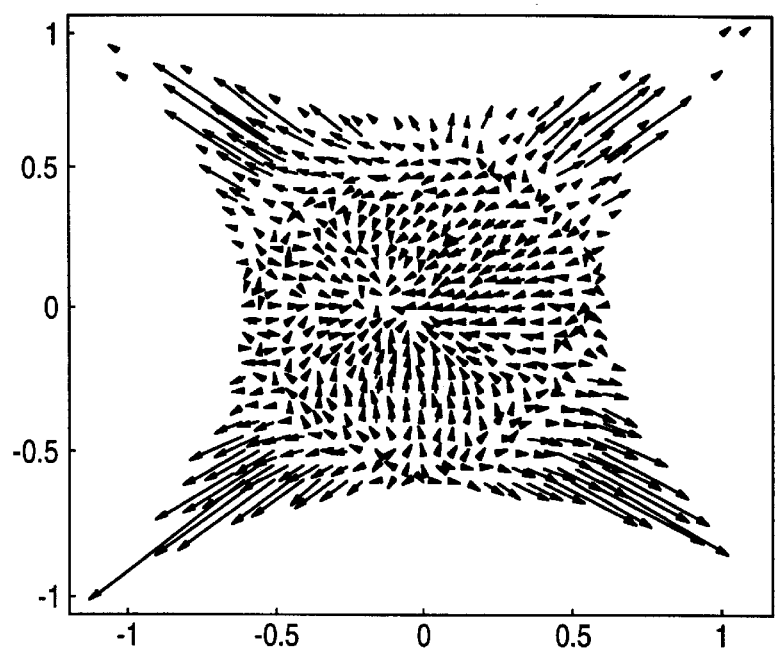
FIGS. 19A and 19B illustrate navigation errors resulting from the application of algorithm 9A to the correlation numbers $\{C_0, \ldots, C_8\}$ obtained using a quadratic correlation function (k=2) and the paper sample of FIG. 14.
Figure 19B:
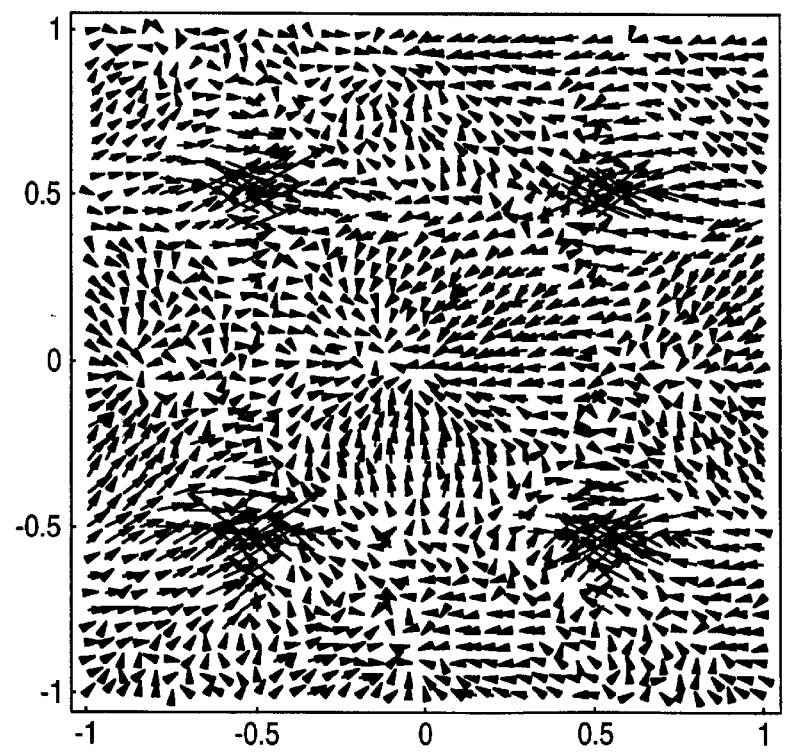

FIG. 19A displays the navigation errors resulting from the application of equations (8a), (8b), and (11b)–(11f) (hereafter known as algorithm "9A") to the correlation numbers $\{C_0, \ldots, C_8\}$ obtained for each data coordinate using a quadratic correlation function and the paper sample of FIG. 14. Each error vector points from the known true position to the computed position using the algorithm. While the performance of the algorithm near the origin is quite good, the navigation errors increase nonlinearly with distance from the origin, until they grow to lengths of hundreds of pixels as the distance approaches one pixel. Numerically, this problem is caused by the denominator $4A_{20}A_{02}-A_{11}^2$ in (8a) and (8b), which decreases significantly as the distance from the origin increases, until at distances exceeding one pixel, the validity condition (16) fails. This degradation in performance can be partially mitigated by first computing $C_{i,j}{}^k$ on the square 25-cell grid defined by i,j $\in \{-2,1,0,1,2\}$. Then, using an appropriate member of the class of predictors derived below, the cell containing the surface minimum can be identified, and the nine correlation numbers centered on this cell can be passed as input to the algorithm. FIG. 19B shows the improvement realized assuming that this technique has been used. Although this results are encouraging, there is no way of knowing yet whether different paper samples will produce finite navigation errors using algorithm 9A within the central square pixel, and it is not clear whether nonlinear errors will permit effective real-time correction, as described below. In addition, modifications to algorithm 9A are discussed which allow linearization of these errors.

FIGS. 19A and 19B illustrate navigation errors resulting from the application of algorithm 9A to the correlation numbers $\{C_0, \ldots C_8\}$ obtained using a quadratic correlation function (k=2) and the paper sample of FIG. 14. Each error vector points from the known true position to the computed position. In FIG. 19A, the error vectors grow to lengths of hundreds of pixels as the distance from the origin approaches one pixel. In FIG. 19B, the use of prediction techniques, as described below, has been assumed.

Taylor-Series Representation of the Correlation Surface

Although the choice of the second-order form of f(x, y) was motivated by considering the effects of affine transformations on an elliptic paraboloid, the same approach can be generalized to apply to any correlation function in the neighborhood of a minimum (or maximum). Consider an arbitrary two-dimensional function which has the value $g(x_0,y_0)$ at the point $r_0 \equiv \{x_0,y_0\}$. In the neighborhood of that point, the effect of the small displacement vector $$r = \begin{bmatrix} x \\ y \end{bmatrix}$$

on the value $g(x_0,y_0)$ is formally given by the Taylor series expansion [1]

$$g(x_0 + x, y_0 + y) \equiv \exp[d_{r_0}(r)] f(x_0, y_0) \quad (18)$$

$$= f(x_0, y_0) + d f_{r_0}(r) + \frac{1}{2} d^2 f_{r_0}(r) + 0(|r|^2)$$

$$= f(x_0, y_0) + d f_{r_0}(r) + \frac{1}{2} r^T H(x_0, y_0) r + \ldots$$

$$= f(x_0, y_0) + x \frac{\partial}{\partial x_0} f(x_0, y_0) +$$

$$y \frac{\partial}{\partial y_0} f(x_0, y_0) + \frac{1}{2} x^2 \frac{\partial^2}{\partial x_0^2} f(x_0, y_0) +$$

$$xy \frac{\partial^2}{\partial x_0 \partial y_0} f(x_0, y_0) +$$

$$\frac{1}{2} y^2 \frac{\partial^2}{\partial x_0^2} f(x_0, y_0) + \ldots$$

$$\equiv a_{00} + a_{10} x + a_{01} y + a_{20} x^2 + a_{11} xy + a_{02} y^2.$$

Figure 20A:
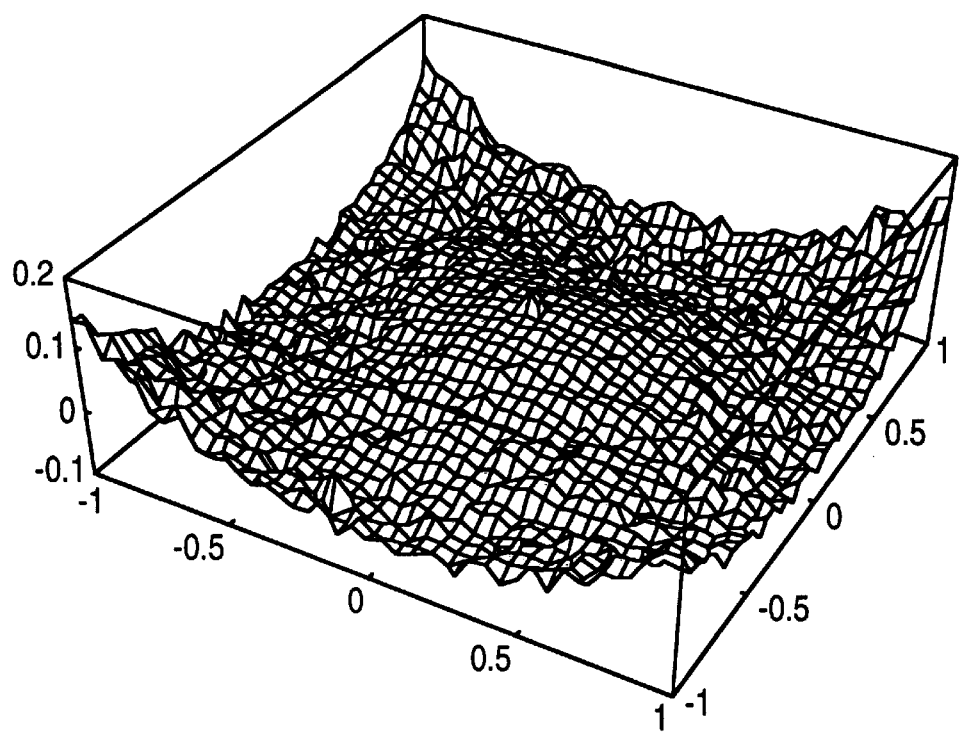
FIGS. 20A and 20B are diagrams of the difference between the best fit second-order surface and the true correlation surface computed using a quadratic correlation function (k=2) and the data set of FIG. 14.
Figure 20B:
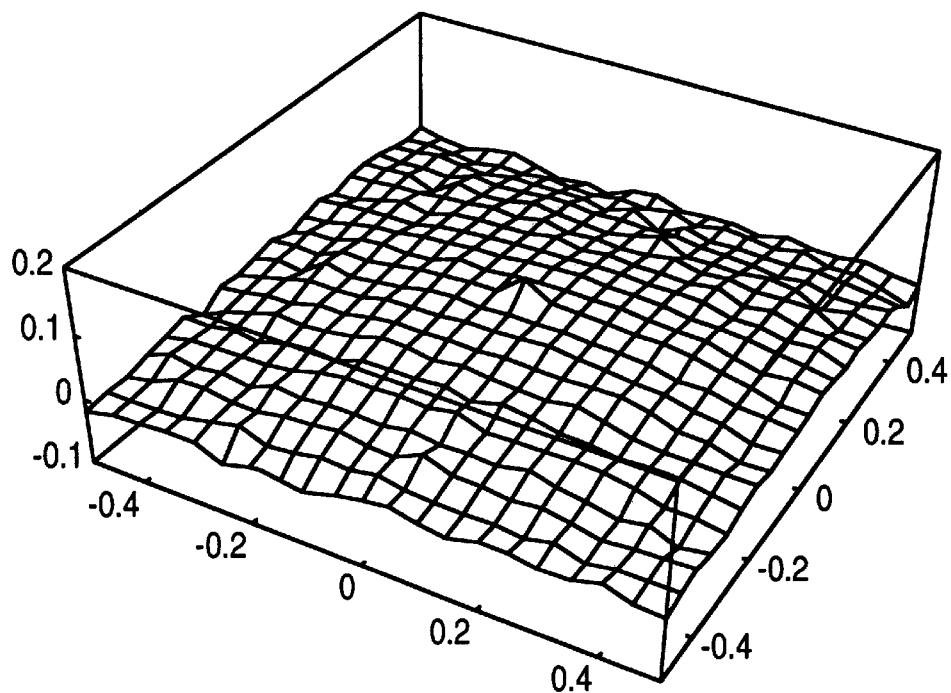

Hence, the choice of the second-order model function (6) is equivalent to the assumption that in the region of interest the "true" correlation surface can be accurately represented by a Taylor series expansion. If this assumption is significantly violated by a large displacement, then the translation vector computed by the algorithm above will not be reliable. Therefore, the cause of the nonlinear increase in navigation error with distance from the origin shown in FIGS. 19A and 19B arises because the correlation surface begins to deviate significantly from the second-order surface described by $f(x,y) \equiv g(x_0+x, y_0+y)$. In fact, as shown in FIGS. 20A and 20B, while the agreement near the origin is reasonable, at large distances the true surface begins to diverge significantly from the second-order approximation given by (18).

The Fundamental Second-Order Navigation Algorithm

Nevertheless, the model of the correlation surface as an elliptic paraboloid is not without merit, as it can provide insight into modifications to the basic navigation algorithm that may improve its accuracy in the case of a large displacement. For example, the analysis leading to equations (7a)–(7f) show that in the case of the elliptic paraboloid, the coefficients which determine the second-order shape of the correlation surface ($a_{11}, a_{20}$, and $a_{02}$) are not dependent on the components of the translation vector $\{x_0, y_0\}$. Therefore, the validity domain of the algorithm may be extended by first determining the shape of the correlation surface prior to translation, and then retaining that shape after translation has occurred. Formally, this method would consist of the following steps:

1. Compute ($a_{11}, a_{20}$, and $a_{02}$) by applying equations (11d)–(11f) to autocorrelation data obtained immediately after a reference frame has been acquired.
2. After each subsequent paper-fiber image has been captured and loaded into the comparison frame, compute $a_{10}$ and $a_{01}$ by applying (11b) and (11c) to the data obtained by cross-correlating the comparison and reference frames.
3. Substitute these values of $a_{10}$ and $a_{01}$ and the values of ($a_{11}, a_{20}$, and $a_{02}$) computed from the autocorrelation data, into (8a) and (8b) to obtain the translation coordinates of the current image.
4. Repeat this process after each new reference frame has been acquired.

For numerical convenience, parameters $\{b_{mn}\}$ are used, which are related to the coefficients of (6) by the simple transformations $$b_{10} = 6 a_{10}, \quad (19a)$$

$$b_{01} = 6 a_{01}, \quad (19b)$$

$$b_{11} = 6 a_{11}, \quad (19c)$$

$$b_{20} = 12 a_{20}, \quad (19d)$$

and $$b_{02} = 12 a_{20} \quad (19e)$$

FIGS. 20A and 20B are diagrams of the difference between the best fit second-order surface and the true correlation surface computed using a quadratic correlation function (k=2) and the data set of FIG. 14. The differences have been scaled downward by the maximum value of the correlation surface in the data set. In most cases, use of $\{b_{mn}\}$ rather than $\{a_{mn}\}$ will yield simpler expressions with fewer extraneous numerical constants.

Figure 21A:
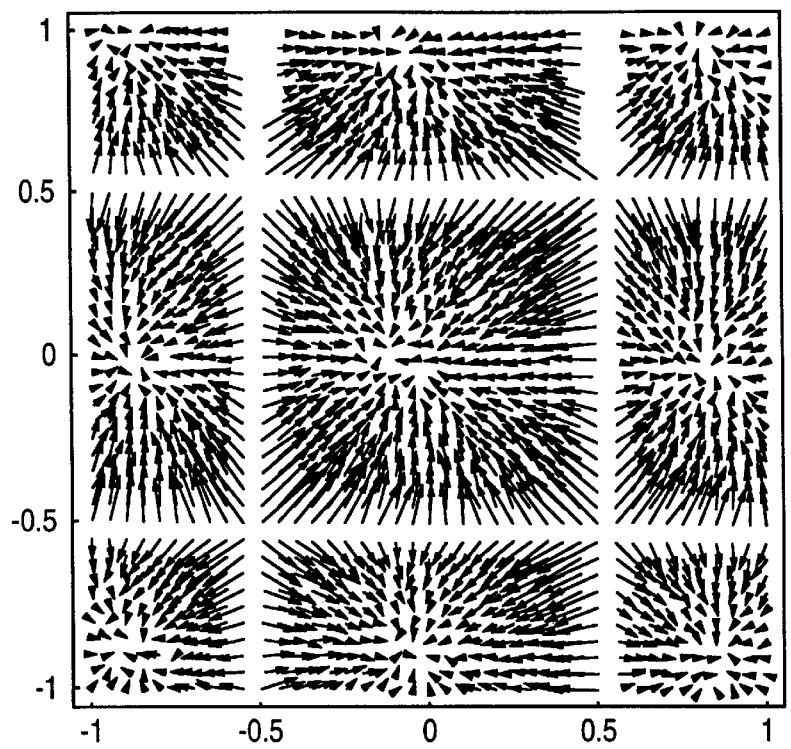
FIGS. 21A and 21B are diagrams illustrating the navigation errors resulting from the application of algorithm 9B to the correlation numbers $\{C_0, \ldots, C_8\}$ obtained using a quadratic correlation function and the paper sample of FIG. 14.
Figure 21B:
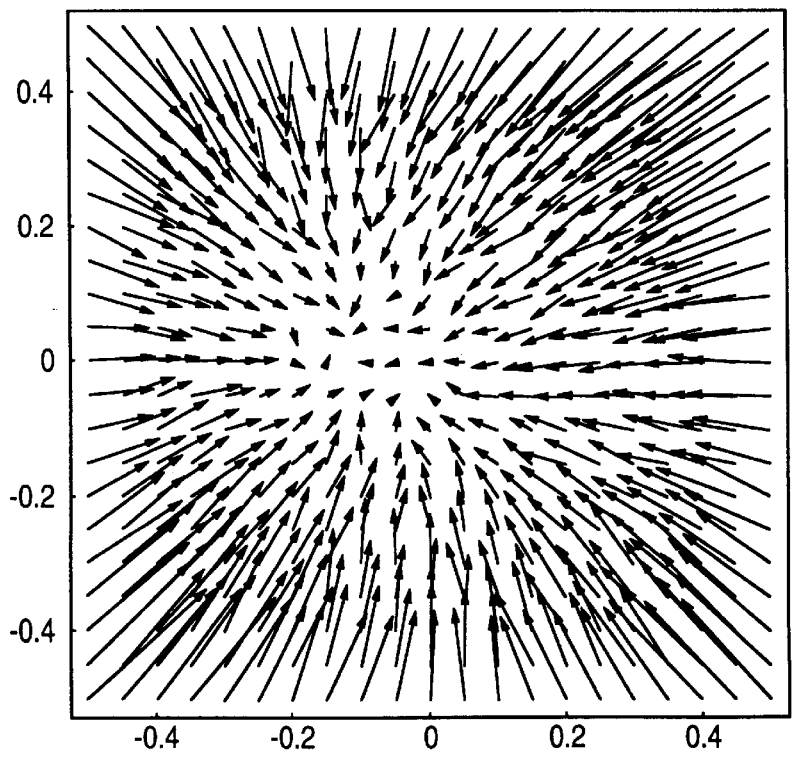

FIGS. 21A and 21B are diagrams illustrating the navigation errors resulting from the application of algorithm 9B to the correlation numbers $\{C_0, \ldots, C_8\}$ obtained using a quadratic correlation function and the paper sample of FIG. 14. As in FIGS. 19A and 19B, each error vector points from the known true position to the computed position, and the use of prediction techniques, as described below, has been assumed. Once again, the performance of the algorithm near the origin is quite good, and—because the denominator in equations (8a) and (8b) has been frozen—the errors do not grow nonlinearly with distance from the origin. Nevertheless, algorithm 9B apparently underestimates the cartesian components of the true position vector by amounts that increase slowly as the navigator moves away from the origin. Because of the gradual nature of this error growth, three modifications of algorithm 9B provide dramatic improvements in the performance of the algorithm.

Methods for Improved Navigation Performance

There are two classes of methods for improvement of the performance of the fundamental navigation algorithm. First, and more generally, the correlation surface (i.e., the nine correlation numbers $\{C_0, \ldots, C_8\}$) can be modified prior to computing the best-fit coefficients $\{b_{mn}\}$ and then the displacement $\{x_0, y_0\}$. In this case, a new correlation function is chosen for real-time computation of the correlation data, and/or the data is reshaped after it has been generated by the correlator. The goal is to modify the shape of the correlation surface directly so that a second-order Taylor-series approximation will serve as a more effective representation. Second, and more specifically, the position estimates produced by the algorithm at run time can be used to build a correction function (or lookup table) allowing the bulk of the error to be removed prior to reporting a position estimate to the navigation system. This technique requires a method for real-time construction of the correction function/table.

Cubic Correlation Function

Figure 22A:
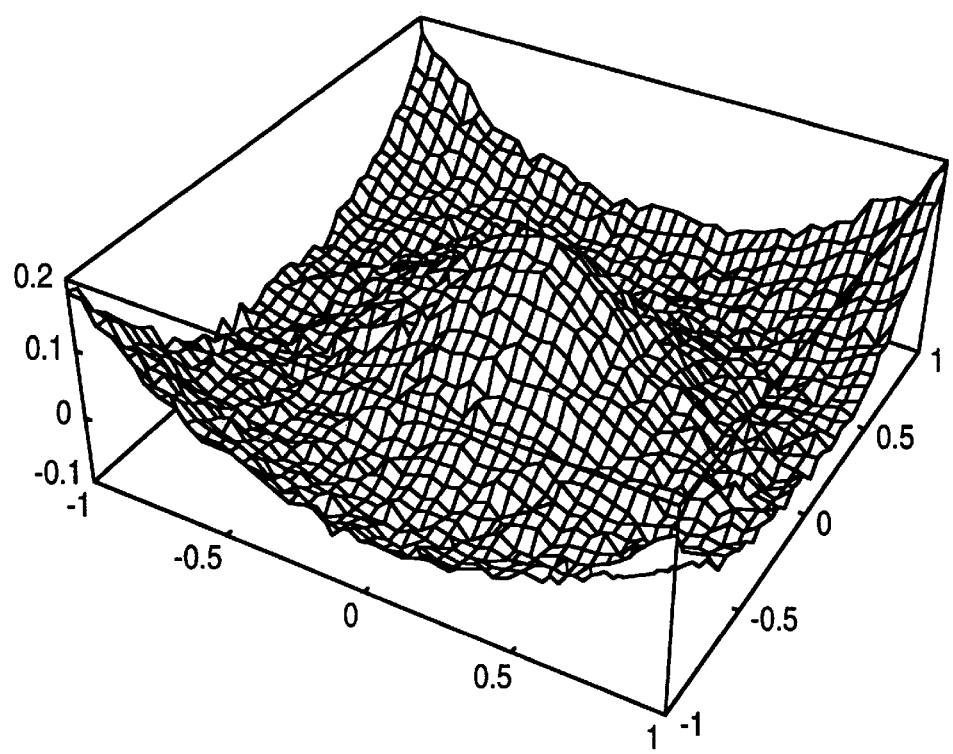
FIGS. 22A and 22B are diagrams illustrating the difference between the best-fit second-order surface and the true correlation surface computed using a linear correlation function (k=1) and the data set of FIG. 14. The differences have been scaled downward by the maximum value of the correlation surface in the data set.
Figure 22B:
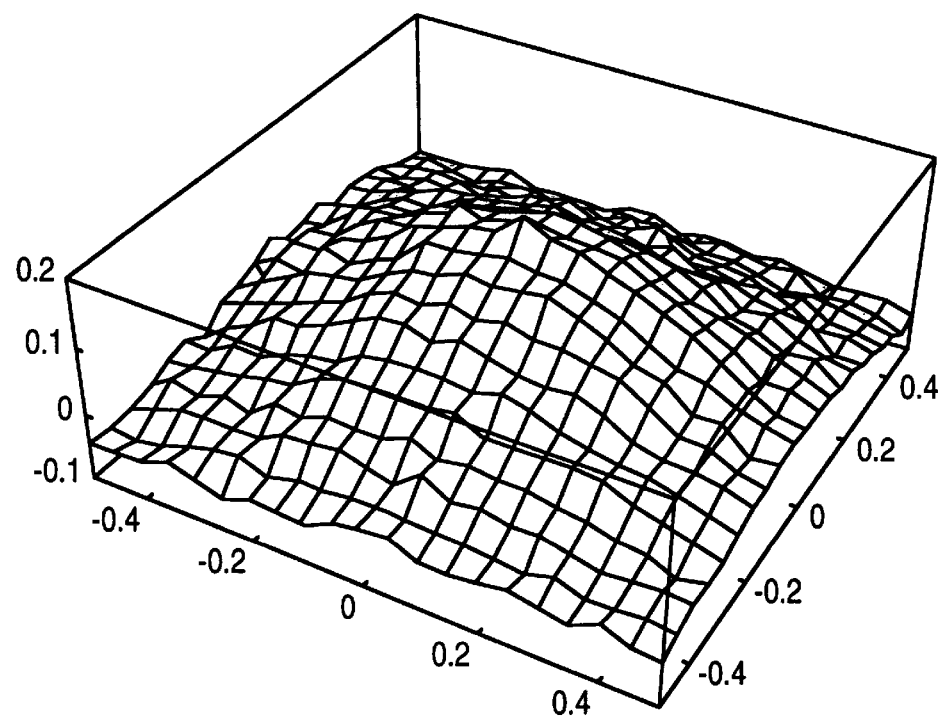
Figure 23A:
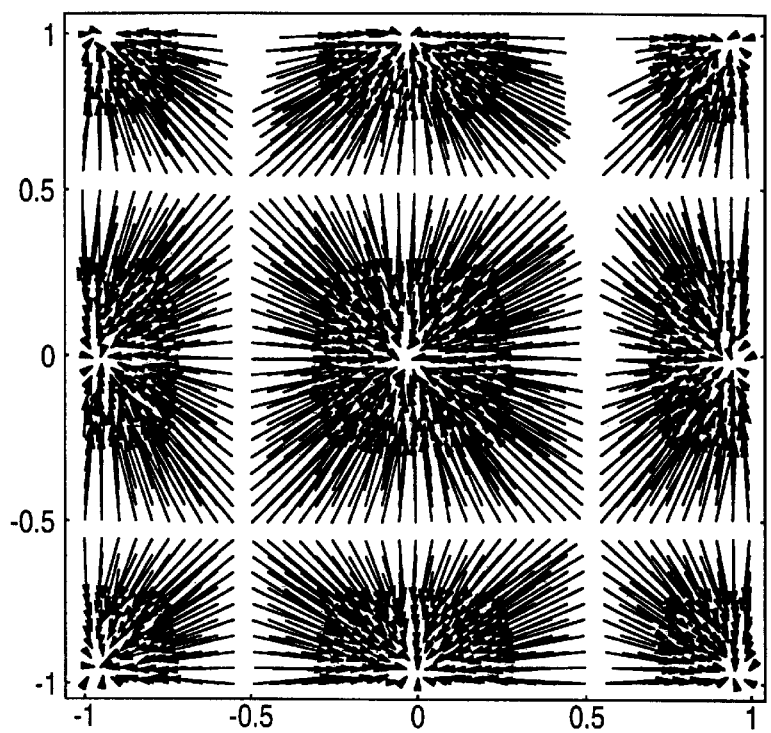
FIGS. 23A and 23B are diagrams illustrating navigation errors resulting from the application of algoritm 9B to the correlation numbers $\{C_0, \ldots, C_8\}$ obtained using a linear correlation function (k=2) and the paper sample of FIG. 14. Each error vector points from the known true position to the computed position. The use of prediction techniques is assumed.
Figure 23B:
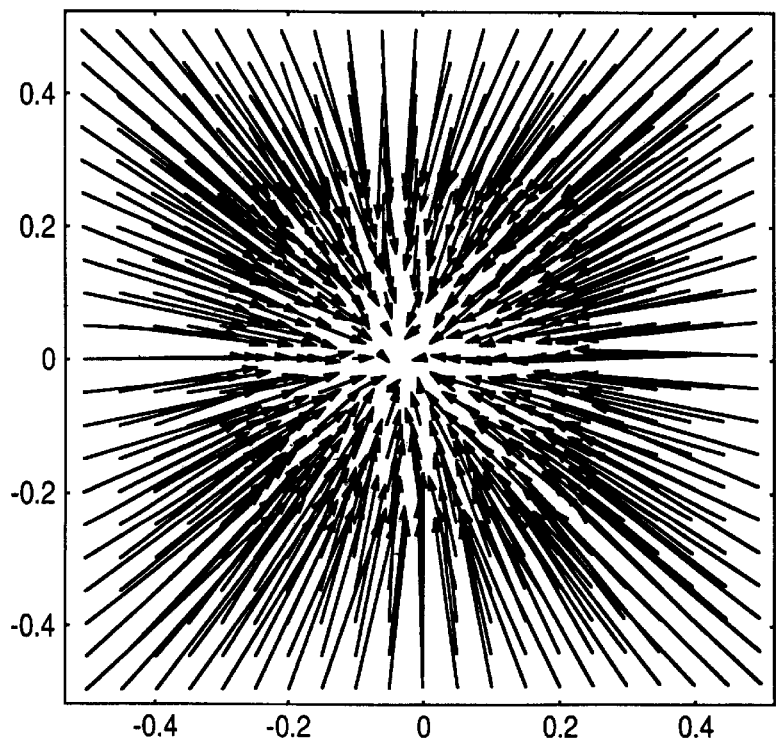

First a correlation function which produces a more closely second-order surface is needed. For example, a linear correlation function (given by (1) with k=1) will be embedded in Pathfinder ROM. However, as shown in FIGS. 22A and 22B, a linear correlation function actually generates a surface which is more difficult to represent with a second-order approximation than that of the quadratic correlation function illustrated in FIGS. 20A and 20B. Therefore, the navigation errors resulting from the application of algorithm 9B to this correlation surface are larger than those displayed in FIG. 21A and 21B as shown in FIGS. 23A and 23B: the navigator now underestimates the true distance from the origin by an amount that is significantly greater than was the case with a quadratic correlation function.

Figure 25A:
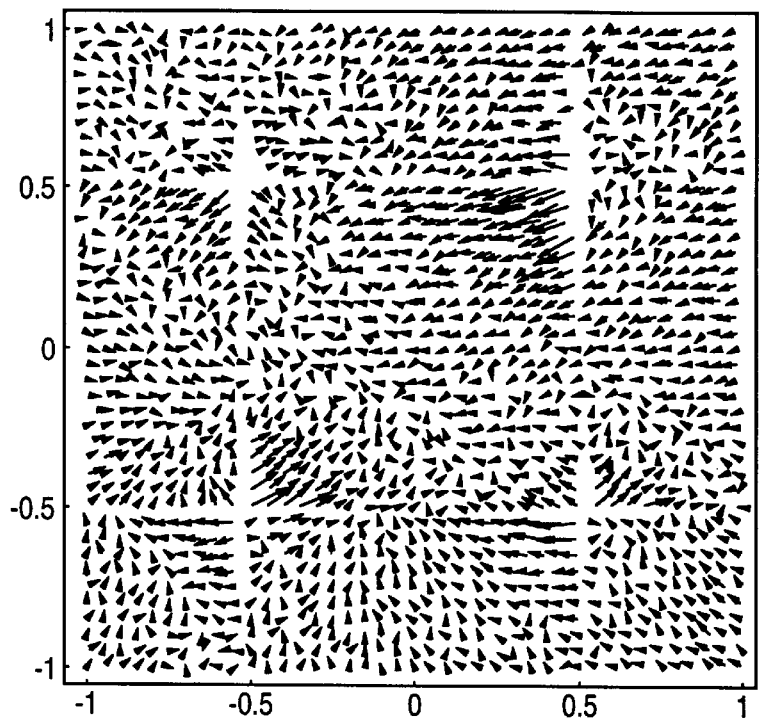
FIGS. 25A and 25B are diagrams showing the navigation errors resulting from the application of algorithm 9B to the correlation numbers $\{C_0, \ldots, C_8\}$ obtained using a cubic correlation function (k=3 and the paper sample of FIG. 14. Each error vector points from the known true position to the computed position. The use of predict techniques is assumed.
Figure 25B:
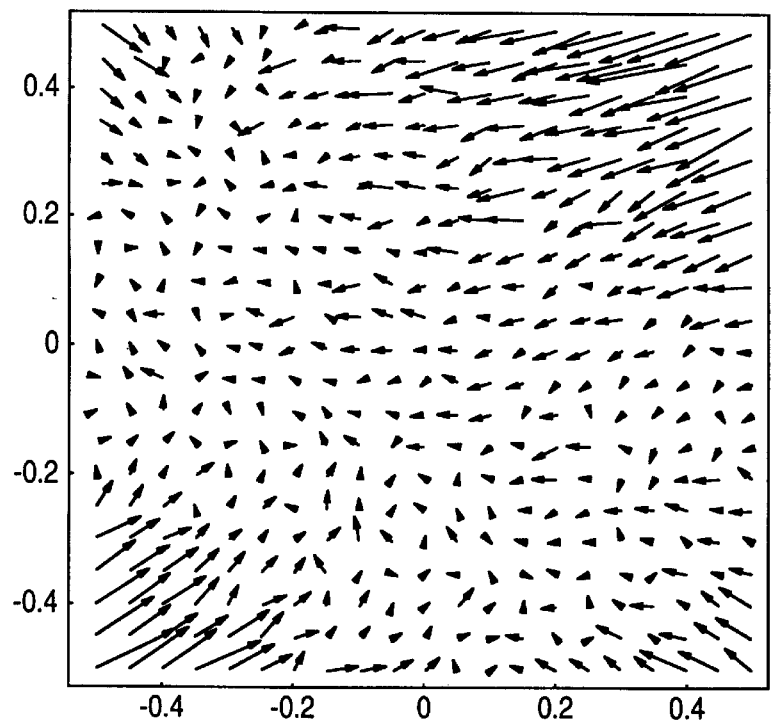

Thus, the cubic correlation function generates smaller errors than those produced by a quadratic function. A close comparison of FIGS. 25A and 25B with FIGS. 21A and 21B shows that the cubic can be much more accurately represented by the second-order Taylor-series approximation (18) for the data set of FIG. 14. Indeed, the corresponding reduction of navigation errors shown in FIGS. 25A and 25B is dramatic: the only significant residual errors occur at the boundaries between pixels. This trend does not continue with a quartic correlation function; in this case, the navigation algorithm begins to overestimate the Cartesian components of the position. Slight reductions in the lengths of the error vectors at the pixel boundaries can be obtained by making small adjustments in the precise value of k, but the final value of k obtained in this way will not differ significantly from three, and is likely to depend critically on the specific paper sample under test. Thus, an embedded cubic correlation function provides a substantial improvement in real-time navigation performance.

Correlation Surface Reshaping

Figure 26A:
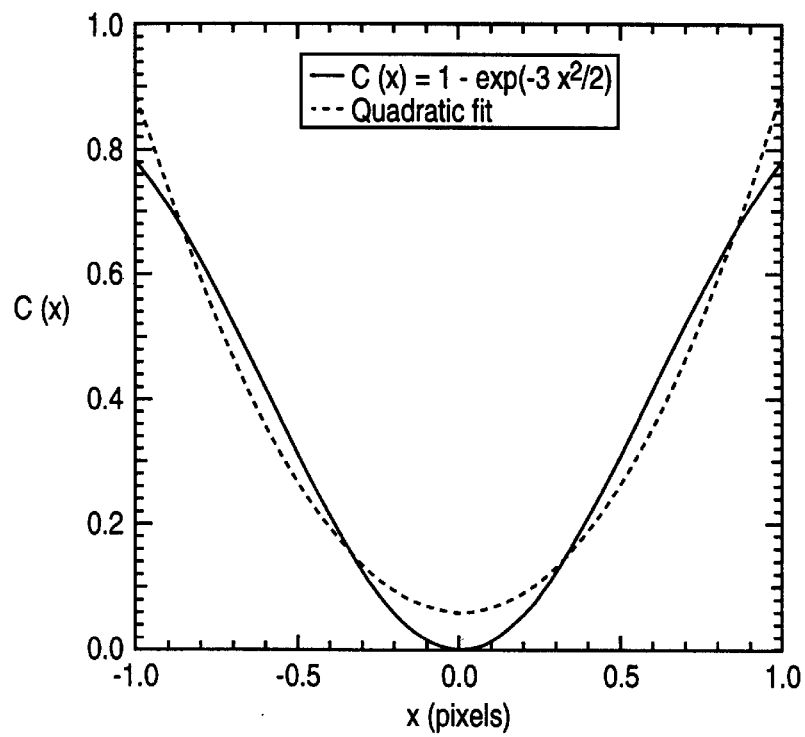
FIGS. 26A and 26B are diagrams illustrating an example of improved linear least-squares fit to a quadratic function by reshaping the artificially generated correlation data using the mapping $C \to C^{3/2}$.
Figure 26B:
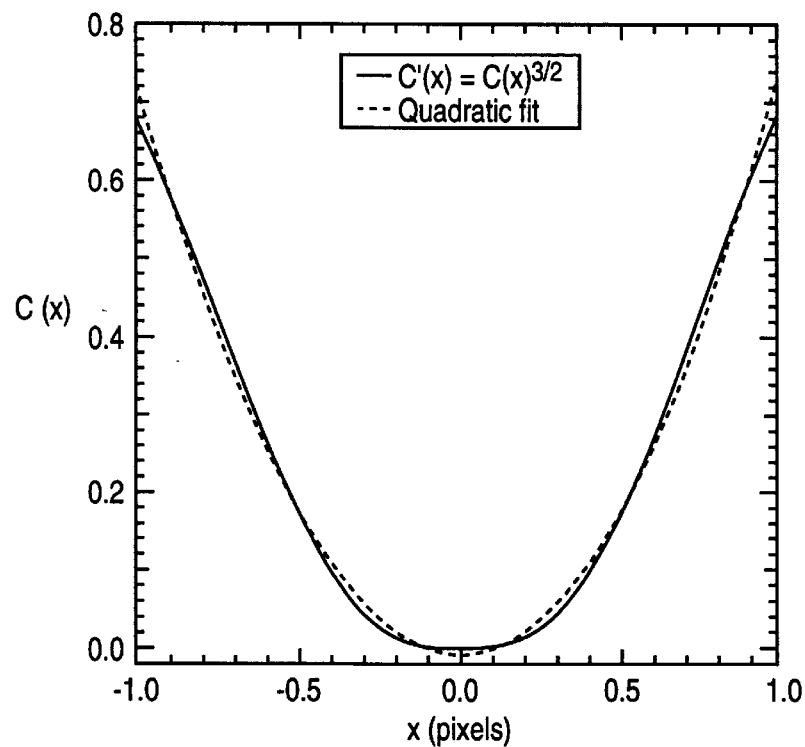

Given a collection of 25 (or 9) numbers output by the correlator at run time, a coordinate-dependent nonlinear mapping function can be applied to these data to change the surface shape to be more accurately represented by the second-order Taylor-series approximation (18). The choice of this technique is motivated by examining the effect such a nonlinear mapping has on a one-dimensional function that deviates significantly from a quadratic with increasing distance from the origin. In FIGS. 26A and 26B, a planar slice through the correlation bowl is approximated by the function $$C(x)=1-\exp(-3x^2)/2).$$

Figure 24A:
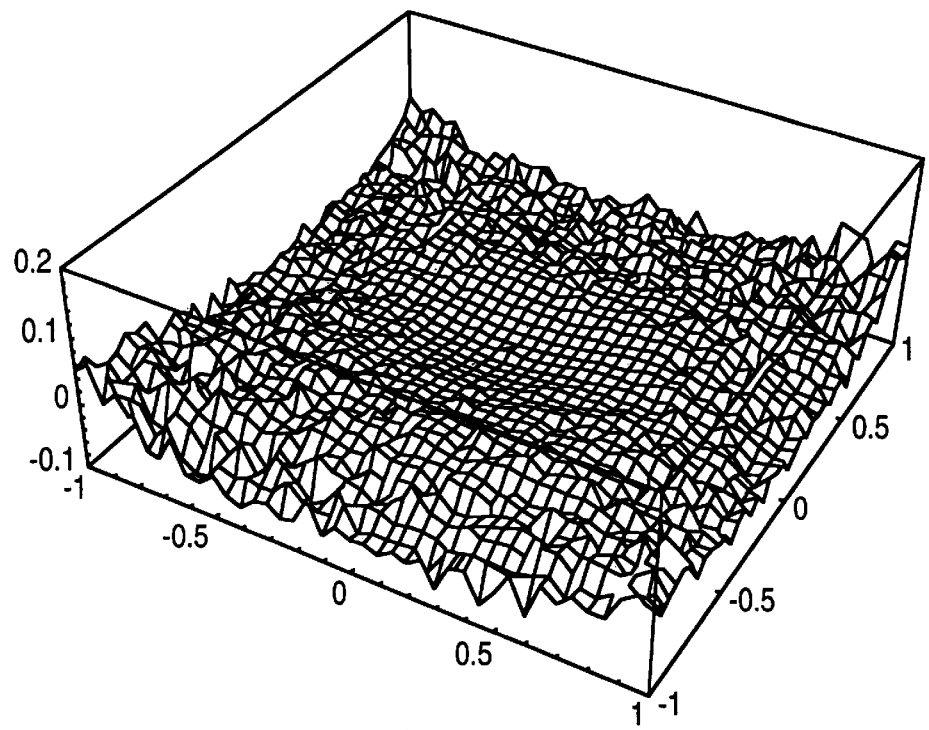
FIGS. 24A and 24B are diagrams showing the difference between the best-fit second-order surface and the true correlation surface computed using a cubic correlation function (k=3) and the data set of FIG. 14. The differences have been scaled downward by the maximum value of the correlation surface in the data set.
Figure 24B:
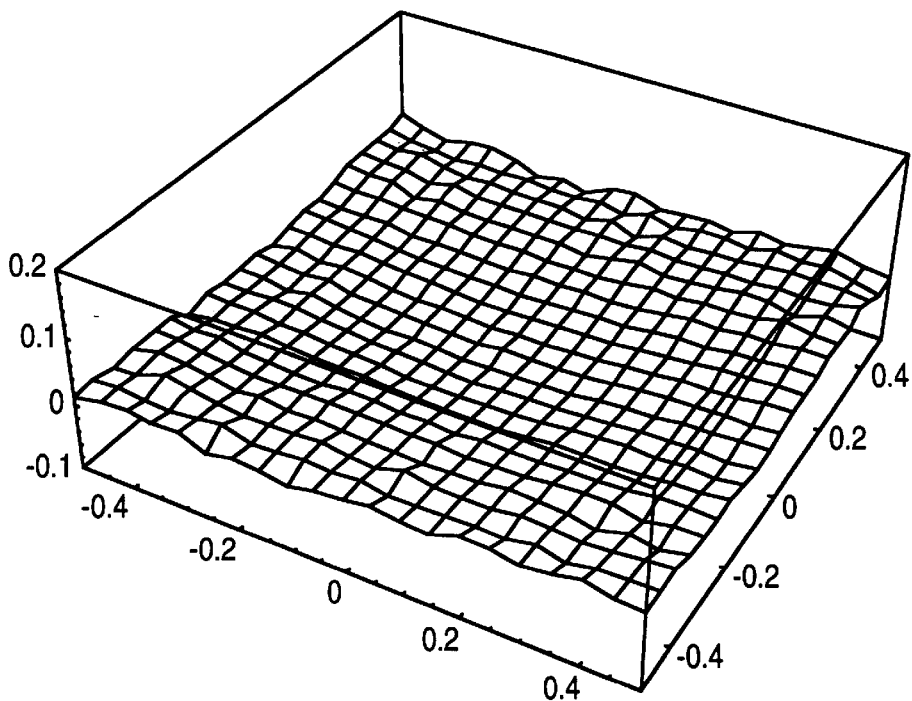
Figure 27A:
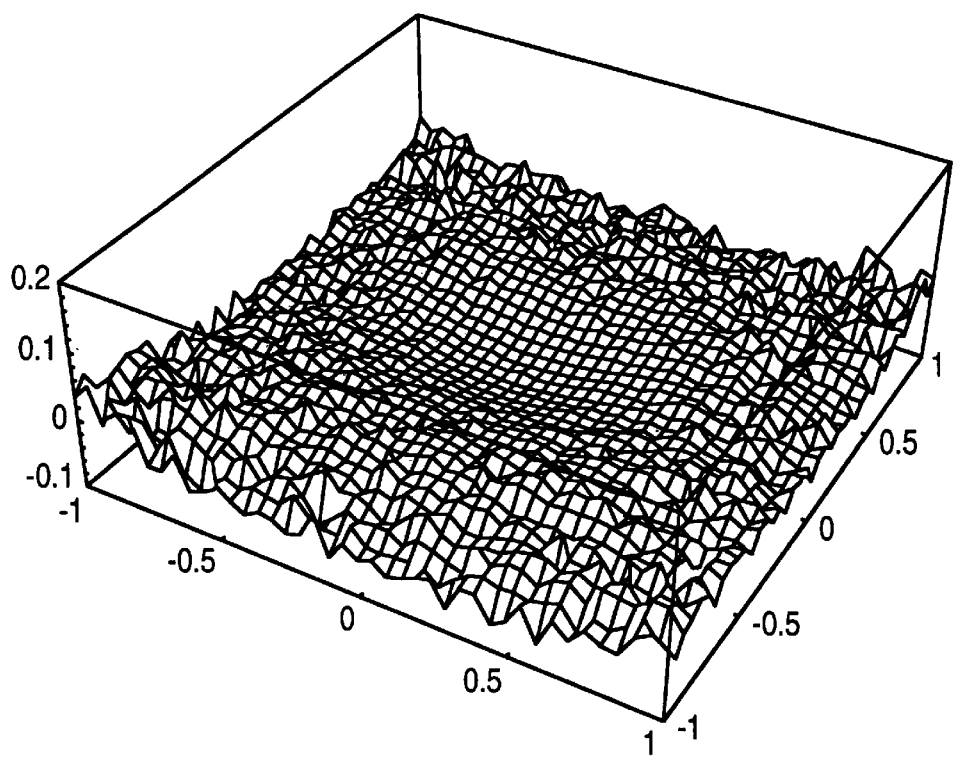
FIGS. 27A and 27B are diagrams illustrating the difference between the best-fit second-order model function (18) and the true correlation surface computed first by using the 0sl0 data set and a quadratic correlation function (k=2), and then reshaped by applying the mapping $C \to C^{3/2}$.
Figure 27B:
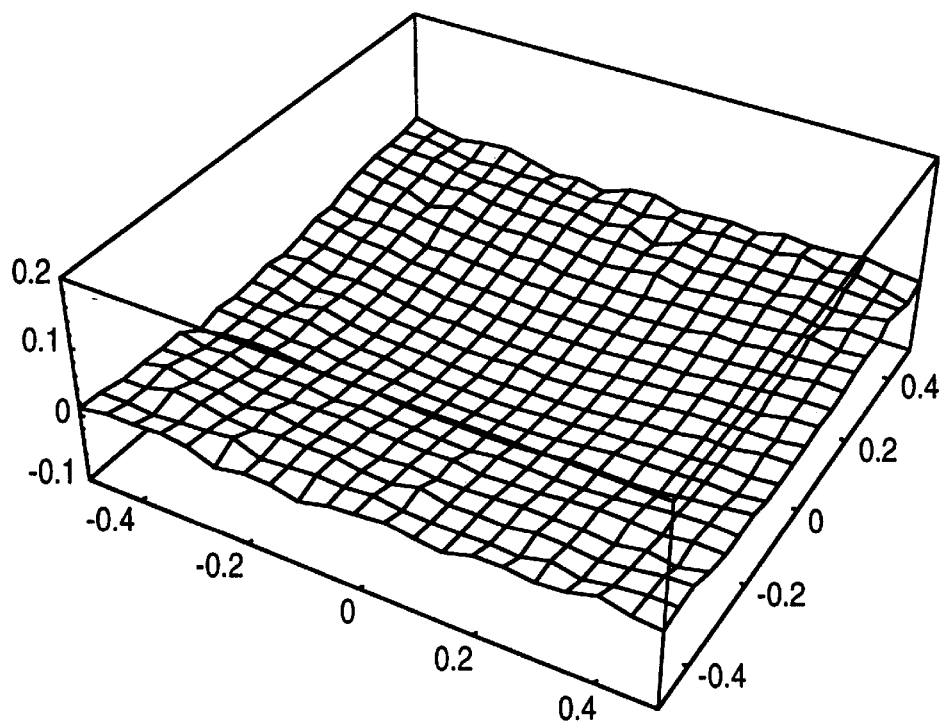

The function $C(x)$ behaves similarly to the true surface produced by a quadratic correlation function, in that it increases more slowly than a quadratic with distance from the origin. As shown in FIG. 27A, the best-fit quadratic function to this simulated "data" is a rather poor representation of $C(x)$, and it shares the specific numerical deficiencies of the second-order model function shown in FIGS. 20A and 20B; in particular, it is too large near the origin, and it fails to mimic the asymptotic behavior of the data as x increases. However, in FIG. 26B, the agreement between the simulated data and the second-order model function (in the range $-1<x<1$) is significantly improved by changing the shape of the data using the simple nonlinear mapping $C'(x)=C(x)^{3/2}$. (Note the small negative deviation of the best-fit quadratic function near the origin, similar to that of the second-order model function shown in FIGS. 24A and 24B for the case k=3.)

The simple real nonlinear mapping given by $$C_{umh}^k \to [C_{i,j}^k]^k, K \in R > 1, \tag{20}$$

can alter the shape of the correlation surface sufficiently to allow the second-order Taylor-series approximation (18) to represent the data more accurately.

Figure 11:
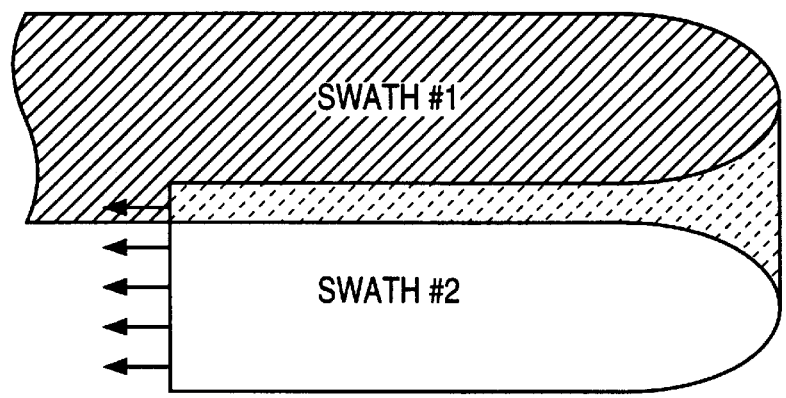
FIGS. 11 and 12 are representations of swaths by the scanning device of FIG. 1.

Note the similarity of FIG. 27A to the deviation resulting from the use of a cubic correlation function, shown in FIG. 11(a). It is not surprising, then, that the corresponding navigation errors displayed in FIGS. 29A and 29B exhibit a dramatic improvement similar to that of the cubic correlation function, as shown in FIGS. 25A and 25B. Again, the agreement is exceptional everywhere except at the pixel boundaries. At these boundaries, the lengths of the residual error vectors can be reduced by making minute adjustments to the value of K, but the resulting final value of K is unlikely to apply to a wide variety of paper samples.

In principle, even the surface arising from the cubic correlation function could be reshaped. In practice, however, K does not differ appreciably from unity in this case, and the performance improvement is barely discernible. Therefore, bowl reshaping using the simple real nonlinear mapping (20) with K≡3/2 is an acceptable alternative to the use of a cubic correlation function, albeit a less general one since it is applied later in the navigation process and may therefore be more dependent on the paper fiber sample under test.

Post-Process Linear Correction

In algorithm 9B, the bowl shape, as represented by the three coefficients $b_{20}$, $b_{02}$, and $b_{11}$, is determined immediately after the reference frame is first acquired, and then held fixed for subsequent comparison frames. In this case, then, the denominator $b_{20}b_{02}-b_{11}^2$ is held constant, and $\{x_0, y_0\}$ depend linearly on the 9 correlation numbers through $b_{10}$ and $b_{01}$. Therefore, the navigation errors arising from the use of algorithm 9B are linear in the computed values of $\{x_0, y_0\}$, as shown in FIGS. 21A and 21B. Consequently correction functions which are linear in $\{x_0, y_0\}$ can be found and applied after the position has already been computed using algorithm 9B. By definition, these linear functions have the form $$\Delta x(x_0,y_0)=p_{00}+p_{10}x_0+p_{01}y_0, \tag{21a}$$

$$\Delta y(x_0,y_0)=q_{00}+q_{10}x_0+q_{01}y_0, \tag{21a}$$

By performing a linear least-squares fit of the model functions (21a) and (21b) to the central navigation errors displayed in FIG. 21B, $$\Delta x(x_0, y_0) = -0.021 - 0.332 x_0 - 0.080 y_0, \quad (22a)$$

and $$\Delta y(x_0, y_0) = 0.004 - 0.028 x_0 - 0.348 y_0. \quad (22b)$$

are obtained.

Figure 28A:
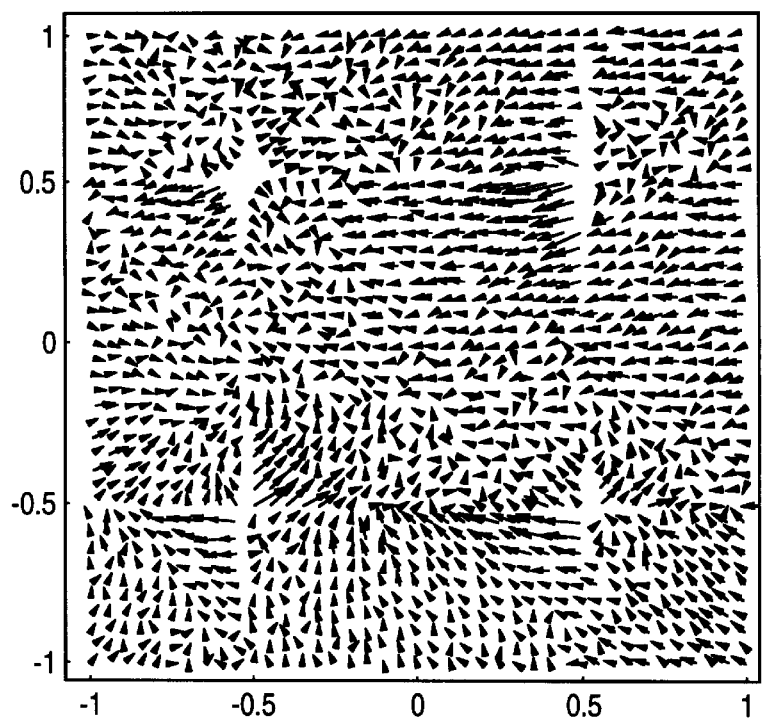
FIGS. 28A and 28B is a diagram showing the result of applying correction functions to each corresponding position estimate $\{x_0, y_0\}$ shown in FIG. 21A.
Figure 28B:
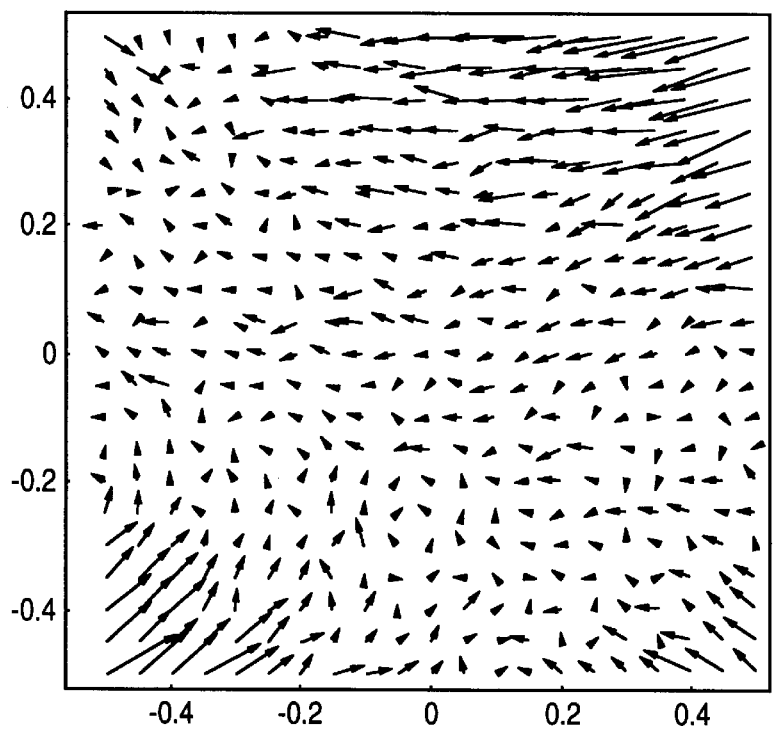

FIGS. 28A and 28B show the result of the application of these correction functions to each corresponding position estimate $\{x_0, y_0\}$ shown in FIG. 21A using the mapping $$x_0 \rightarrow x_0 + \Delta x(x_0, y_0),$$

and $$y_0 \rightarrow y_0 + \Delta y(x_0, y_0).$$

Note the significant reduction in both the root-mean-square and maximum navigation errors.

Figure 30A:
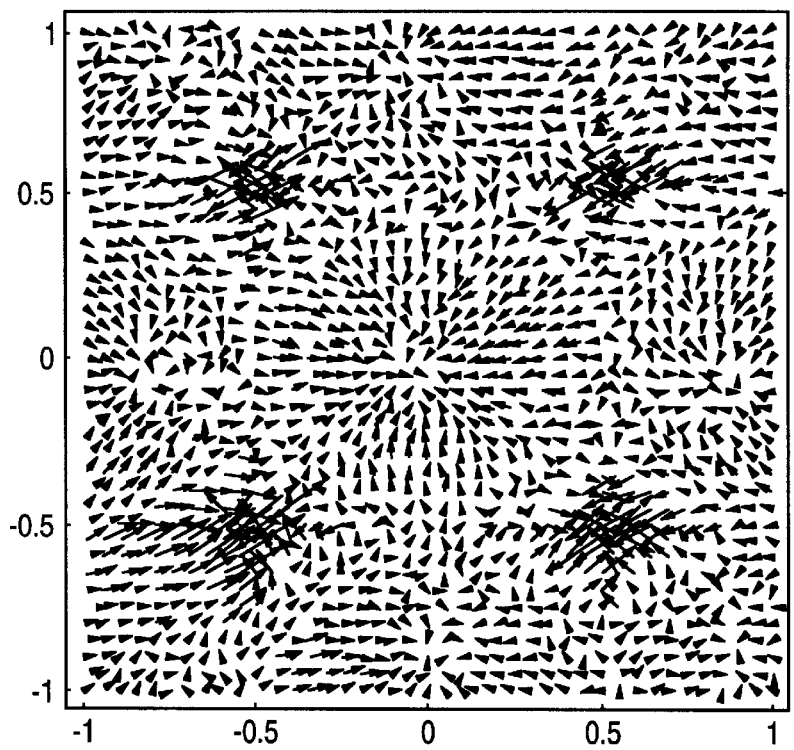
FIGS. 30A and 30B are diagrams showing the navigation errors shown in of FIGS. 19A and 19B after best-fit linear correction, obtained by applying the model given by (21a) and (21b) to the central pixel errors displayed in FIG. 19B.
Figure 30B:
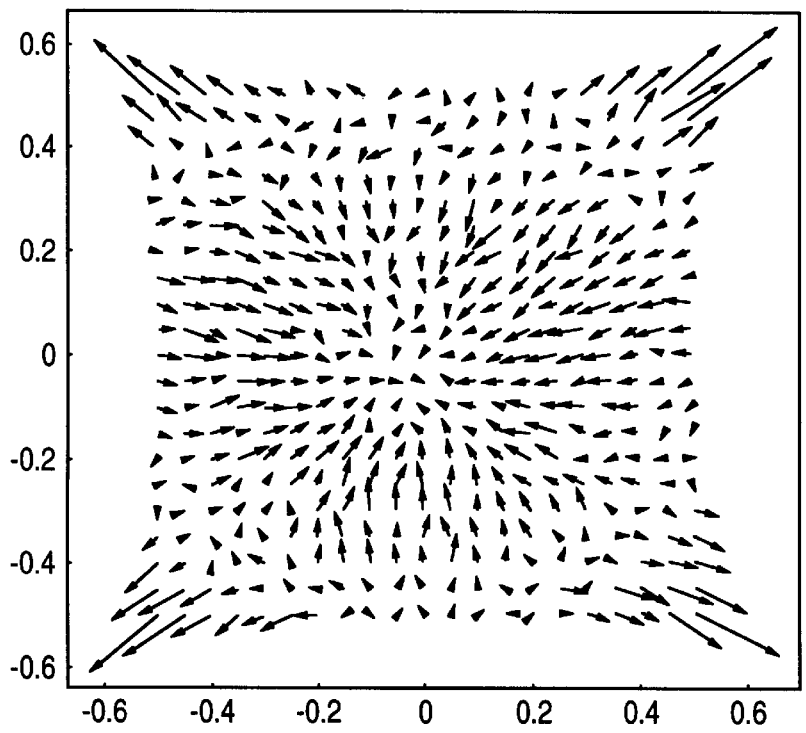

The linearity of algorithm 9B in the correlation coefficients $\{C_0, \ldots, C_8\}$ that allows useful linear correction functions to be constructed—can further be tested by applying this technique to the output of algorithm 9A, which uses a variable denominator $b_{20}b_{02} - b_{11}^2$ when computing $\{x_0, y_0\}$. A comparison of the result shown in FIGS. 30A and 30B with the original navigation errors displayed in FIGS. 19A and 19B demonstrates that this correction is not effective in this case.

Figure 29A:
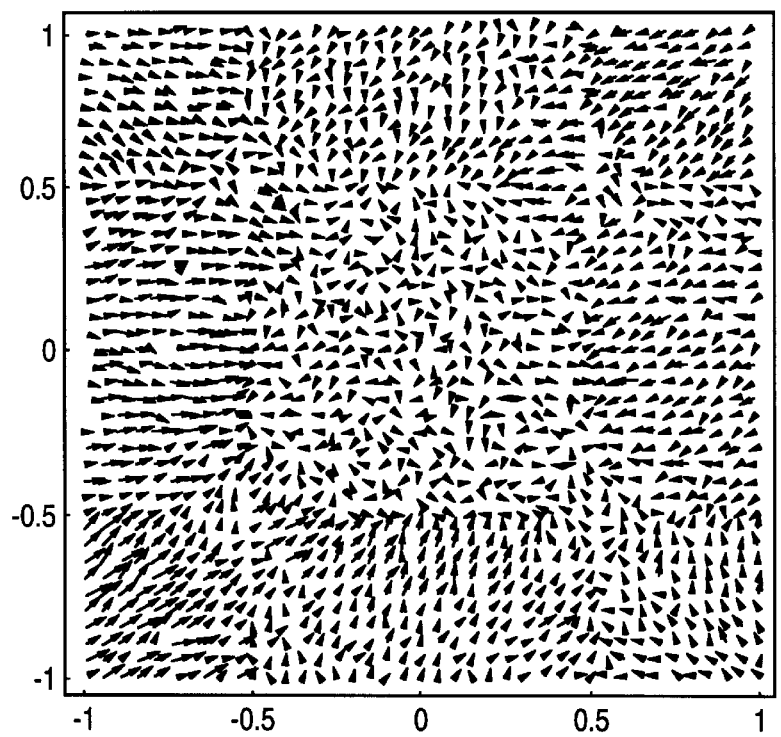
FIGS. 29A and 29B are diagrams showing the navigation errors of FIGS. 21A and 21B after best-fit linear correction, obtained by applying the model given by (21a) and (21b) to the central pixel errors displayed in FIG. 21B.
Figure 29B:
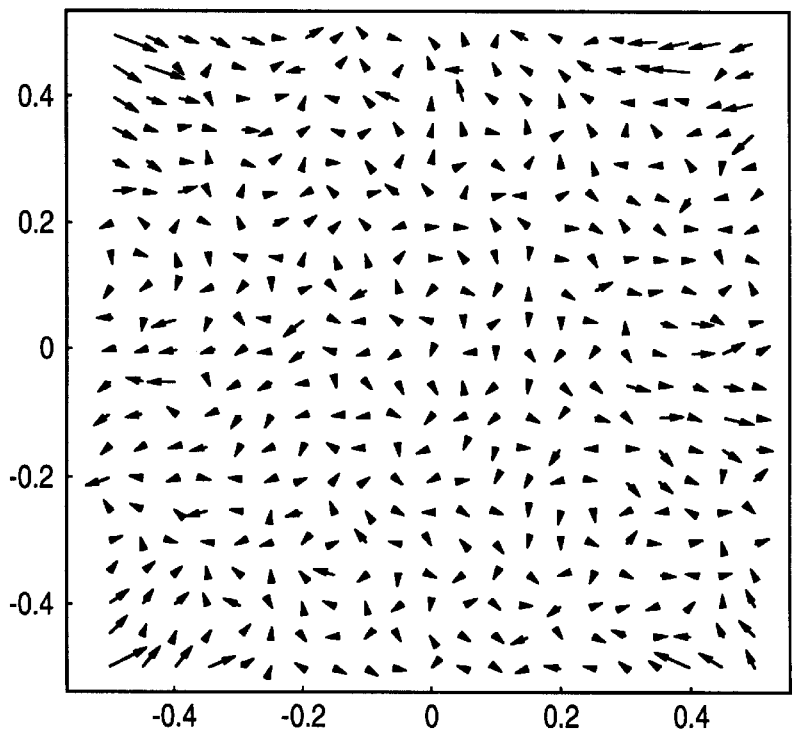

For completeness, post-process linear correction is applied to the navigation errors output by algorithm 9B using both a cubic correlation function and a reshaped correlation surface, but the results are not significantly better then those shown in FIGS. 29A and 29B. Initially, this may seem to indicate that these other performance improvement techniques are unnecessary. However, it is extremely unlikely that the specific correction functions (22a) and (22b) obtained for the paper sample of FIG. 14 can be used equally successfully with other paper samples. The correction coefficients $\{p_{mn}\}$ and $\{q_{mn}\}$ will depend on the second-order bowl shape coefficients $b_{20}$, $b_{11}$, and $b_{20}$ through well-defined functional forms. The most general solution to the navigation problem is to apply algorithm 9B to either a cubic correlation function or a reshaped bowl, and then apply a linear correction function with coefficients that can be determined at run time using the second-order surface shape coefficients computed after the reference frame has been acquired.

Translation Computations Using Reduced Data Sets

Figure 31:
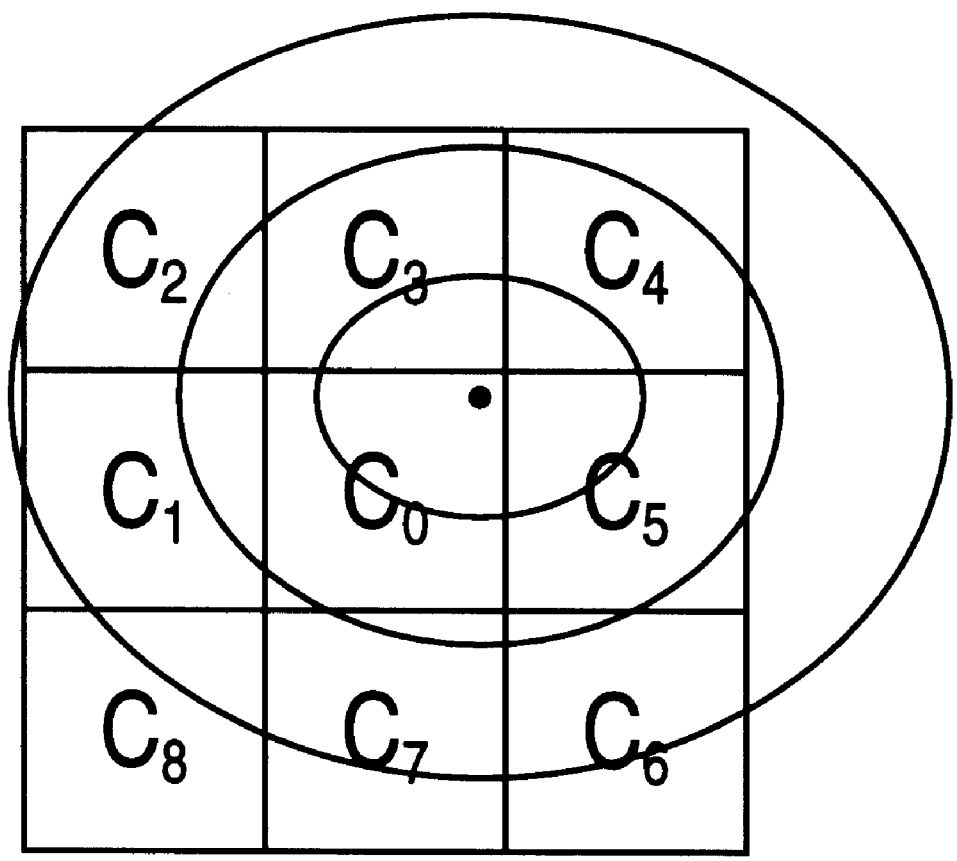
FIG. 31 is a block diagram illustrating the net displacement of the contours of the correlation surface by nearly {0.5 px, 0.5 px}. While the correlation data in cells O, 3, 4, and 5 may permit accurate representation by the quadratic approximation (6), the other five cells in the 3×3 array may not.

A detailed derivation of a set of reduced-range alternatives to the modifications above requires examination of the translation shown schematically in FIG. 31. Although the displacement is confined within the boundary of a square pixel centered on the origin of the most recent microstep, it is large enough that the second-order Taylor series approximation (18) is at risk. While the correlation data in cells 0, 3, 4, and may permit accurate representation by (18), the other five cells in the 3×3 array may not. There are two families of extensions to algorithm 9B: 6-cell algorithms for use with large displacements close to the x and y axes, and 4-cell methods for excursions into the corners of the square pixel boundary.

Six-Cell Navigation Algorithms

Figure 32A:
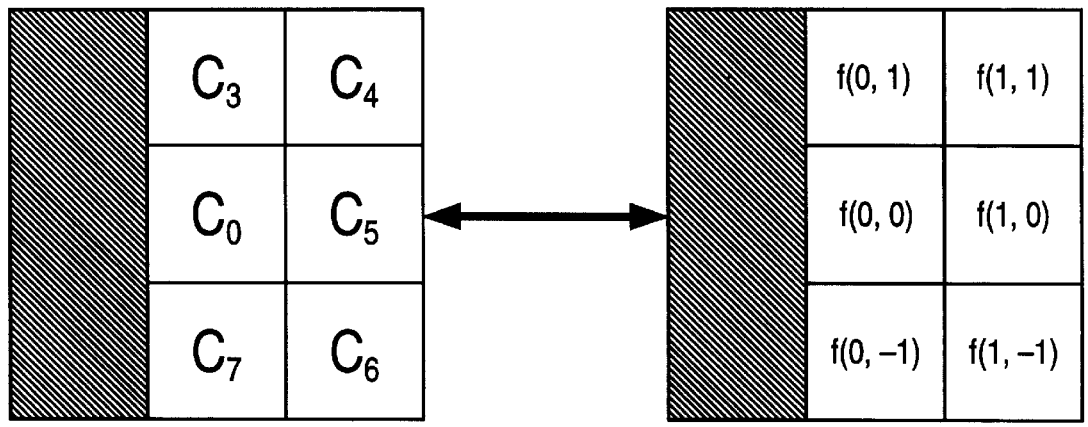
FIGS. 32A and 32B are diagrams illustrating a mapping of correlation coefficients to function values for the 6-cell and 4-cell case, respectively.

Our approach to translation computations using reduced-range data sets is essentially the same as for the full 9-cell algorithm, in that it is based on the least-squares method. However, as shown in FIG. 32A for the 6-cell case of large translations within the central cell near the positive x axis, $X^2$ is obtained by summing the squared deviations over only those correlation cells that are most likely to satisfy the quadratic approximation.

Furthermore, the shape of the bowl is constant, and the values of $b_{11}$, $b_{20}$, and $b_{02}$ computed from the autocorrelation data gathered immediately after the most recent microstep are retained, and only the values of $b_{10}$ and $b_{01}$ are allowed to vary. In the case illustrated in FIG. 32A

$$b_{10} = 2[(C_4 + C_5 + C_6) - (C_0 + C_3 + C_7)] - \tfrac{1}{2} b_{20} \quad (23a)$$

$$b_{01} = 3/2[(C_3 + C_4) - (C_6 + C_7)] - \tfrac{1}{2} b_{11} \quad (23b)$$

These coefficients are then substituted directly into (8a) and (8b) to give the displacement vector $\{X_0, Y_0\}$. Calculations for three other 6-cell data subsets are listed in FIGS. 42A, 42B, 43A and 43B.

Four-Cell Navigation Algorithms

Figure 32B:
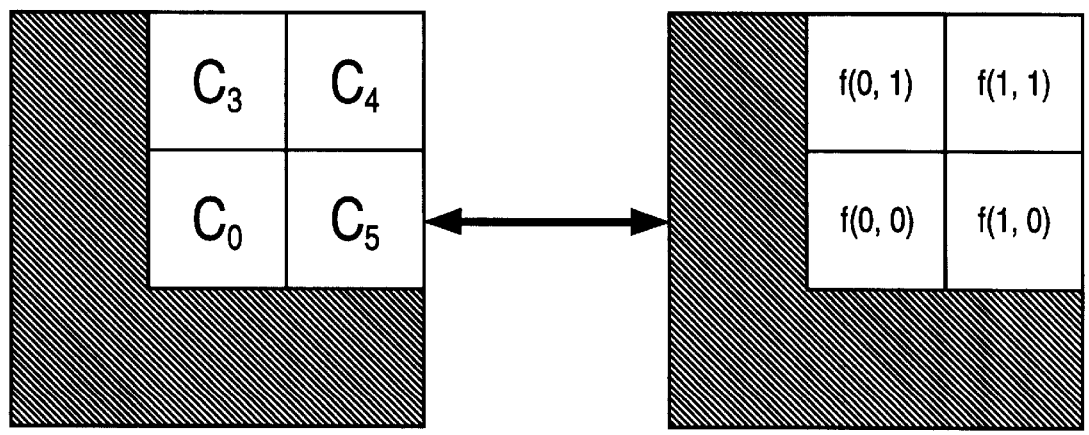

A similar calculation for the 4-cell case shown in FIG. 32B, where a large translation occurs within the central cell near the upper right quadrant, yields the linear coefficients $$b_{10} = +3[(C_4 + C_0) + (C_5 - C_3)] - \tfrac{1}{2}(b_{20} + b_{11}) \quad (24a)$$

$$b_{01} = +3[(C_4 + C_0) - (C_5 - C_3)] - \tfrac{1}{2}(b_{02} + b_{11}) \quad (24b)$$

FIGS. 32A and 32B show examples of two reduced data set cell mappings. FIG. 32A shows a 6-cell reduction of the 9-cell mapping shown in FIG. 18 for large translations within the central cell near the positive x axis. $X^2$ is computed by summing over only the 6 right-hand cells shown. FIG. 32B shows a 4-cell reduction of the 9-cell mapping shown in FIG. 18 for large translations within the central cell near the upper right quadrant, such as that shown in FIG. 31. $X^2$ is computed by summing over only the 4 upper right cells shown.

When substituted into (8a) and (8b), we obtain the translation components $$x_0 = \tfrac{1}{2} - 3\frac{(b_{02} - b_{11})(C_4 - C_0) + (b_{02} + b_{11})(C_5 - C_3)}{b_{20}b_{02} - b_{11}^2} \quad (25a)$$

$$y_0 = +\tfrac{1}{2} - 3\frac{(b_{20} - b_{11})(C_4 - C_0) + (b_{20} + b_{11})(C_5 - C_3)}{b_{20}b_{02} - b_{11}^2} \quad (25b)$$

Calculations for the other three quadrants are listed in FIGS. 42A, 42B, 43A and 43B.

A Class of Efficient Position Predictors

Figure 33A:
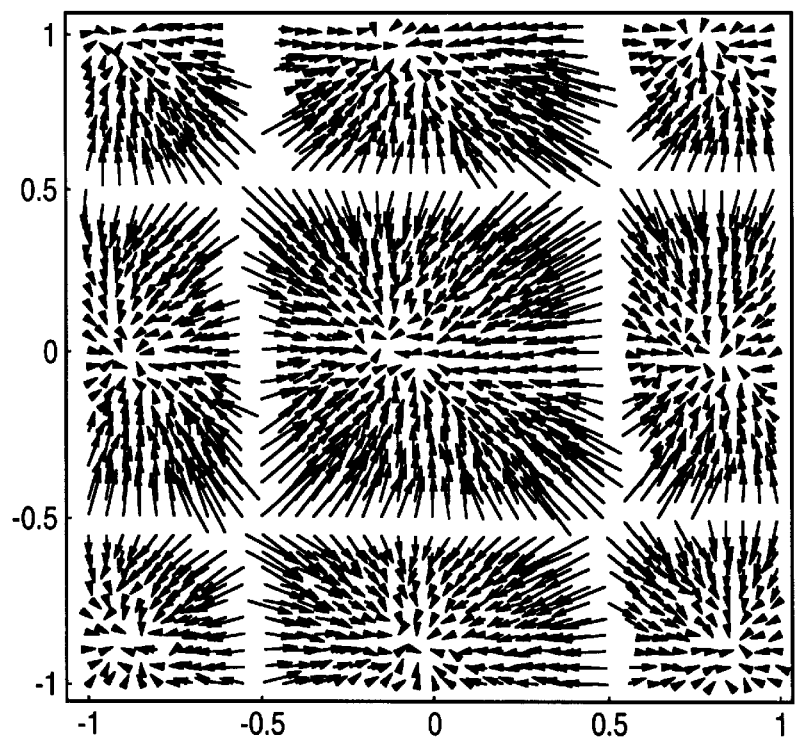
FIGS. 33A and 33B are diagrams illustrating the navigation errors resulting from the application of algorithm 9B to the correlation numbers $\{C_0, \ldots, C_8\}$ obtained using a quadratic correlation function (k=2) and the paper sample of FIG. 14. Each error vector points from the known true position to the computed position. A "minimum-cell" predictor in a 25-cell grid has been used.
Figure 33B:
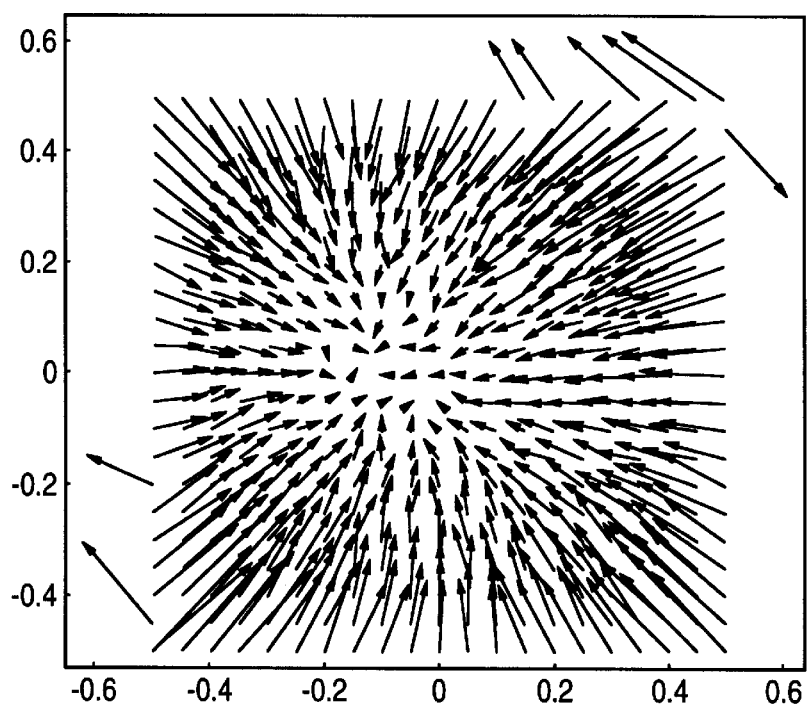

As demonstrated first in FIGS. 19A and 19B, the navigation algorithms presented above will be most accurate if the displacement can be confined within the boundaries of a square pixel centered on the origin of a particular microstep. In other words, it is desirable to predict in advance the position of the minimum of the correlation surface with sufficient accuracy that the cell (in a 5×5 cell grid) that contains that minimum can be identified, and then select the nine correlation numbers centered on this cell as input to the navigation algorithm. In principle, the cell containing the minimum correlation value in the 25-cell grid can be identified and the surface minimum is can be presumed to be located in this cell. FIGS. 33A and 33B display the navigation errors resulting from the application of algorithm 9B to the correlation numbers obtained using a quadratic correlation function (k=2) and the paper sample of FIG. 14, and this "minimum-cell" predictor. Note that there are frequent spurious position computations near the pixel boundaries, arising from fluctuations in correlation values caused by electronic noise.

Linear Least-Squares Solution

Instead, a class of simple linear prediction algorithms, based on the least-squares method introduced above, are designed to estimate the displacement coordinates of the next frame using the known coordinates of previous frames. Given m past position measurements $\{r(t_{-m}), \ldots, r(t_{-1})\}$ sharing a common spatial origin and sampled uniformly in time (i.e., $t_k = k\Delta t$, $k \in \{-m, \ldots, -1\}$), an estimate is sought for the position at time $t_0 = 0$. The functional dependence of the x and y coordinates on time is modeled as the polynomial $$p_n(t_k) = \sum_{j=0}^{n} \gamma_j t_k^j = \sum_{j=0}^{n} [\gamma_j \Delta t^j] k^j \qquad (26)$$

$$\equiv \sum_{j=0}^{n} \alpha_j k^j,$$

where n<m. The order n of the polynomial determines the accuracy with which the true motion of the navigator can be predicted; for example, choosing n=2 is equivalent to the assumption that $|\dddot{r}(t)| \ll |\ddot{r}(t)|/\Delta t$. In the absence of noise, increasing n always increases the fidelity with which (26) predicts r(0).

Each position measurement is limited by a statistical error characterized by the same standard deviation $\sigma_0$, and $X^2$ is defined for each choice of m and n as $$x_{m,n}^2 = \sum_{k=-m}^{-1} [x_k - p_n(t_k)]^2 \qquad (27)$$

At the minimum of $X_{m,n}^2$, the gradient with respect to the members of the parameter set $\{\alpha_j\}$ must vanish identically:

$$\frac{\partial}{\partial \alpha_j} x_{m,n}^2 = 0, \quad j \in \{0, \ldots, n\}. \qquad (28)$$

Hence, n+1 independent equations are obtained in the n+1 unknown parameters, which can be solved algebraically to obtain $p_n(0) = \alpha_0$. Each such solution is a linear combination of the m past position measurements, so that the predicted position at time $t_0 = 0$ has the form $$r_{m,n} = \sum_{k=-m}^{-1} \beta_k r_k, \qquad (29)$$

where the constants $\{\beta_k\}$ are simply read from the solution for $\alpha_0$.

Simulation Results and the Precision/Accuracy Compromise

For example, in the specific case where four past position measurements ("taps") are used to derive a second-order polynomial which minimizes the sum of the squared deviations between these measurements and the position predicted by the polynomial $$r_{4,2} = \tfrac{1}{4}(3r_{-4} - 5r_{-3} - 3r_{-2} + 9r_{-1}) \qquad (30)$$

Figure 34A:
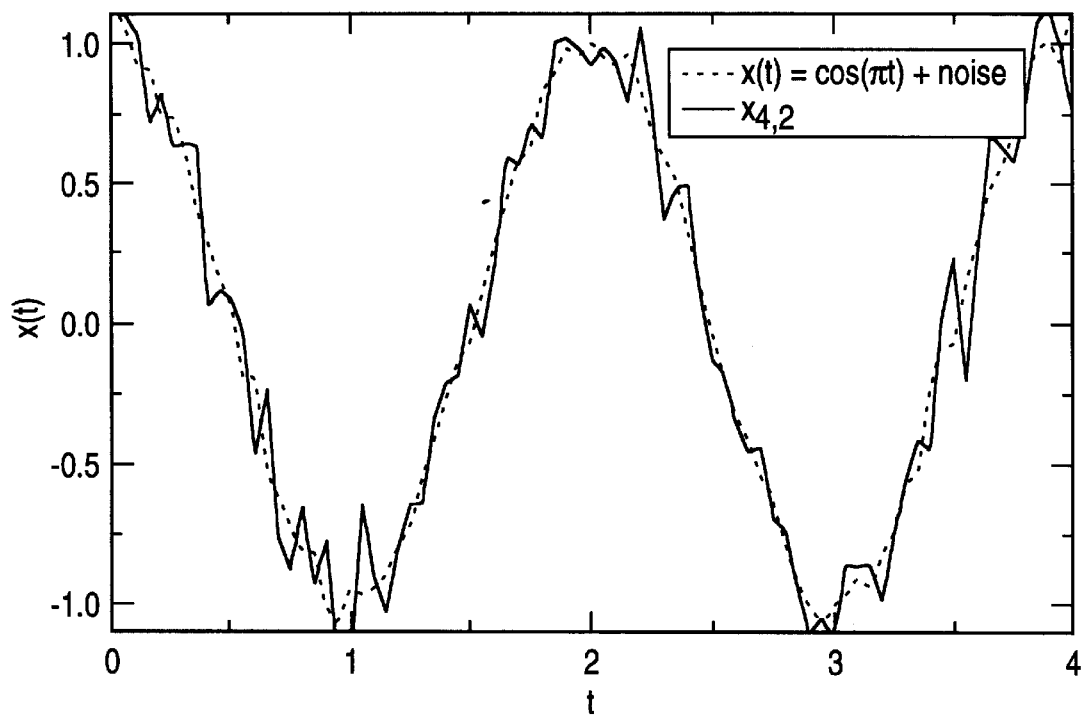
FIGS. 34A and 34B are diagrams showing a comparison of simulated position data and the corresponding output of the predictor $x_{4,2}$ given by the x component of (30). The simulated data was generated by adding Gaussian noise with zero mean and a standard deviation of 0.05 to the function cos ($\pi$t), and then sampling that function at the time interval $\Delta t=0.05$.
Figure 34B:
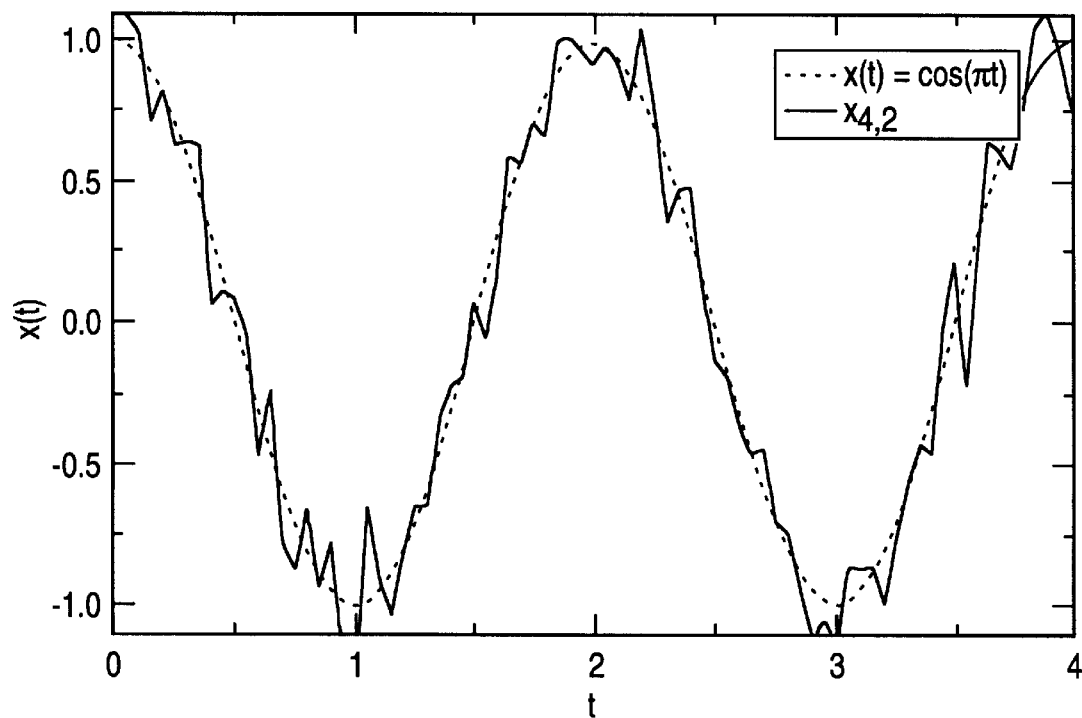
Figure 35A:
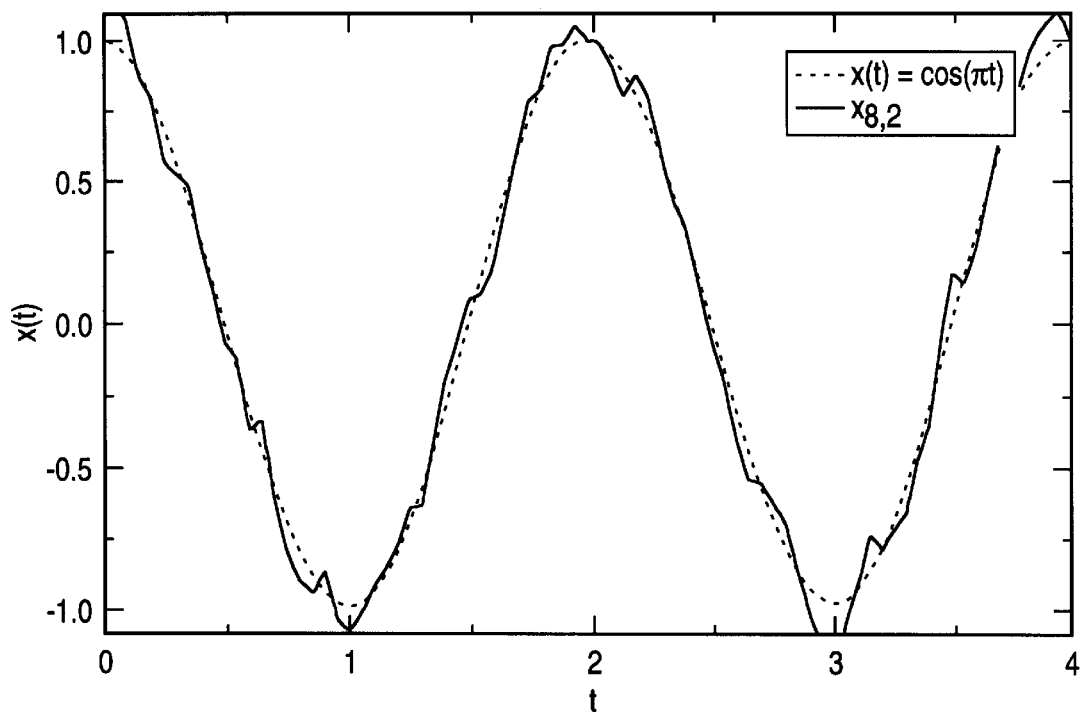
FIGS. 35A and 35B are diagrams showing a comparison of simulated position data and the corresponding output of two 8-tap predictors. The simulated data was generated by adding Gaussian noise with zero mean and a standard deviation of 0.05 to the function cos ($\pi$t), and then sampling that function at the time interval $\Delta t=0.05$.
Figure 35B:
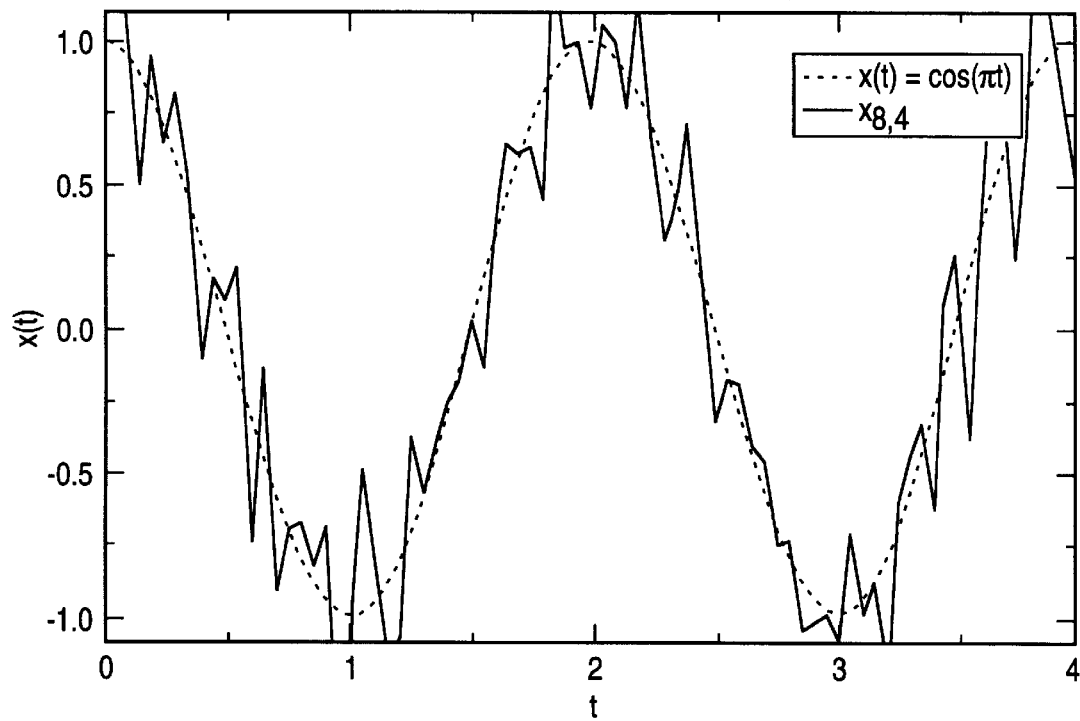

The graphs in FIGS. 34A and 34B compare simulated position data and the corresponding output of the predictor $x_{4,2} \equiv \hat{x} \cdot r_{4,2}$. The simulated data was generated by adding Gaussian noise with zero mean and a standard deviation of 0.05 to the function $\cos(\pi t)$, and then sampling that function at the time interval $\Delta t = 0.05$ (giving 40 sample points per period). FIG. 34A shows how $x_{4,2}$ attempts to track the fluctuations in the noisy sample, and FIG. 34B shows the effect that this noise has on the discrepancy between the output of the predictor and the underlying "true" position. Considerably better performance is provided by the 8-tap predictor $X_{8,2}$, as shown in FIG. 35A. One might think that the precision of the predictor would be enhanced further by increasing the order of the model polynomial from two to four, but FIG. 35B shows that this is not the case for the 8-tap predictor $X_{8,4}$.

This counterintuitive result can be quantified by computing the standard deviation of the predictor output. The precision of the value of either $x_{m,n}$ or $y_{m,n}$ predicted by (29) is limited by the uncertainty caused by statistical errors in the past measurements. The statistical errors in consecutive measurements are assumed to be uncorrelated, allowing computation of the uncertain W in the prediction using the standard error propagation formula (2)

$$\sigma_{m,n}^2 = \sigma_0^2 \sum_{k=-m}^{-1} \left(\frac{\partial}{\partial x_k} x_{m,n}\right)^2 = \sigma_0^2 \sum_{k=-m}^{-1} \beta_k^2. \qquad (31)$$

For the predictor given by (30), $\sigma_{4,2} = \sqrt{31}\sigma_0/2 = 2.8\sigma_0$. As implied by FIG. 35A, this uncertainty can be further reduced by using a larger number of previous position measurements: for example, $\sigma_{8,2} = \sqrt{109/56}\sigma_0 = 1.4\sigma_0$. However, if we increase the order of the polynomial to n=4, the uncertainty increases, as implied by FIG. 35B:

$$\sigma_{8,4} = \sqrt{1231/56}\sigma_0 = 4.7\sigma_0.$$

Figure 36:
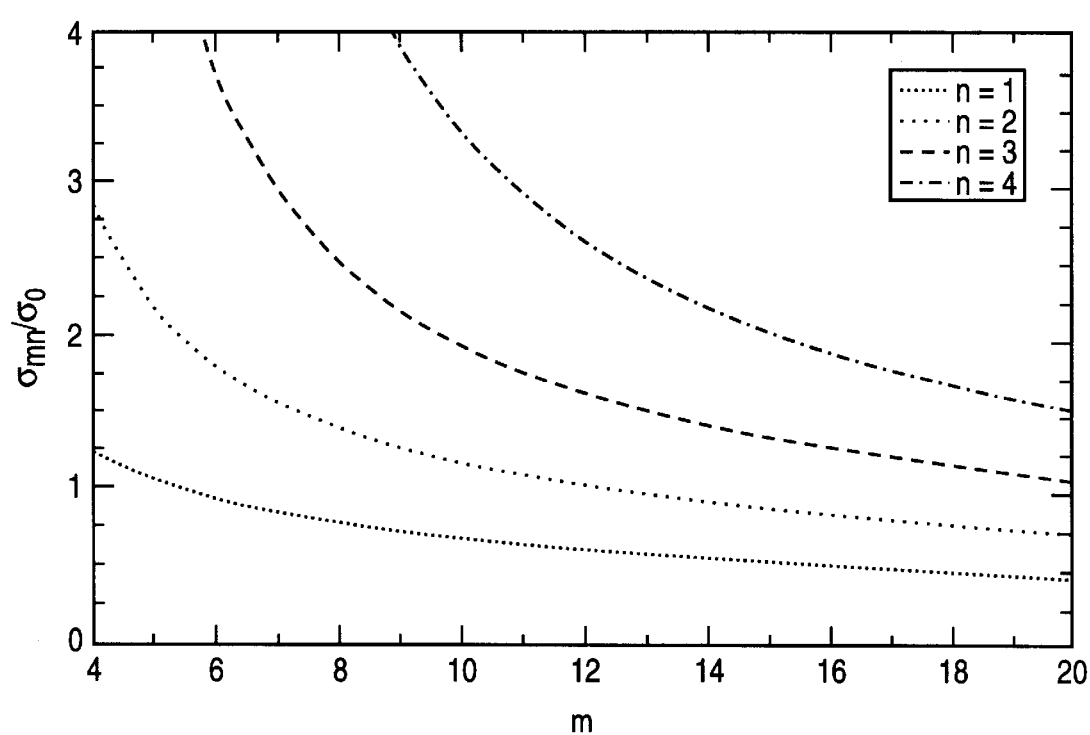
FIG. 36 is a diagram showing the ratio of the statistical uncertainty in the predicted value of $X_{m,n}$ (or $Y_{m,n}$) to the standard deviation of the statistical error in a single navigation position measurement.

This result is explined by the fact that higher-order model polynomials are chosen for a more accurate representation of rapidly changing data; therefore, they are necessarily more sensitive to spurious fluctuations in position caused by electronic noise. All of these trends are displayed clearly in FIG. 36.

Figure 37A:
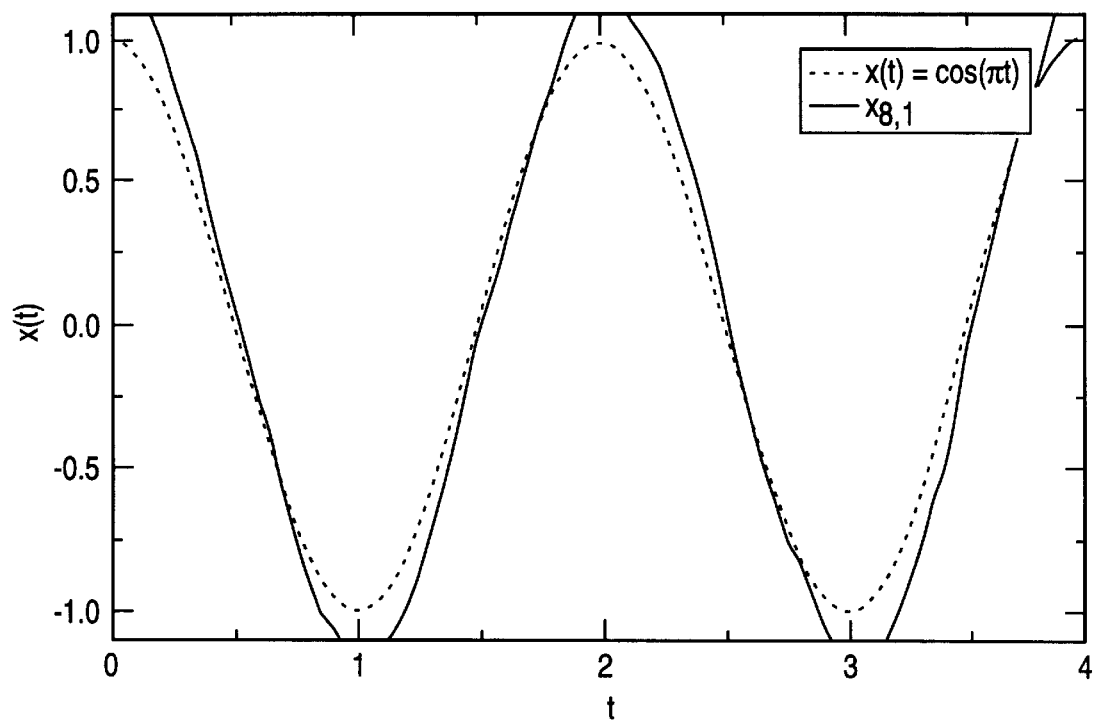
FIGS. 37A and 37B are diagrams illustrating comparisons of simulated position data and the corresponding output of two first-order (n=1) predictors. The simulated data was generated by adding Gaussian noise with zero mean and a standard deviation of 0.05 to the function cos($\pi$t), and then sampling that function at the time interval $\Delta t=0.05$.
Figure 37B:
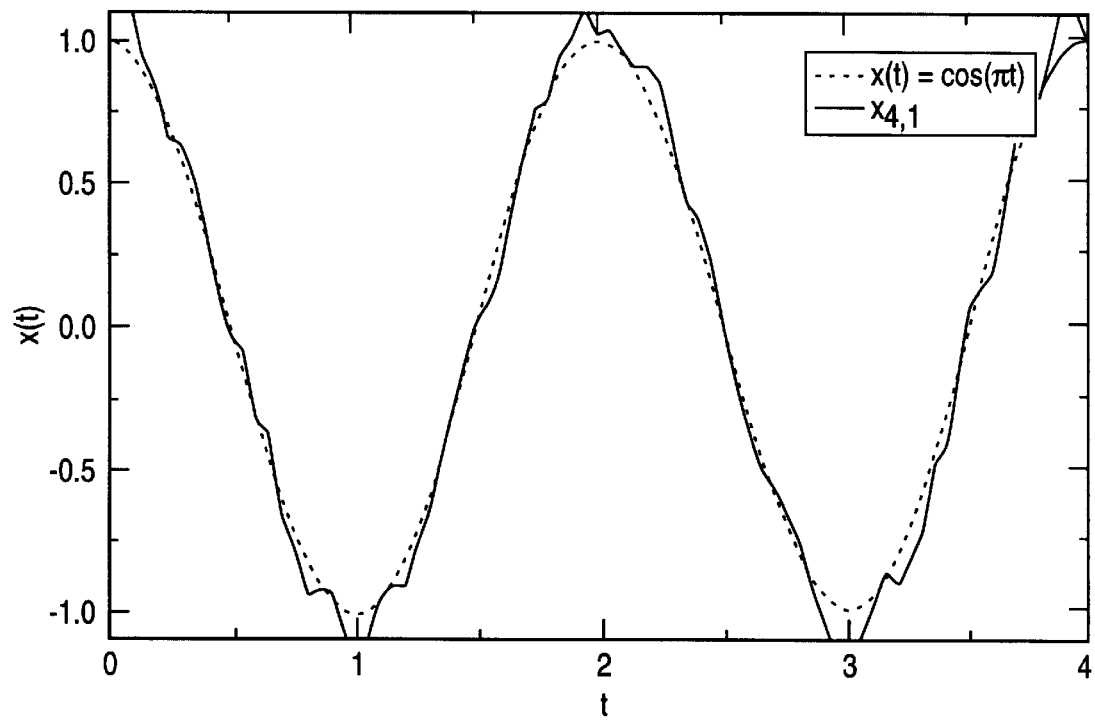

Although it would appear that even lower uncertainties could be achieved using a linear model polynomial, it is important to realize that low-order polynomials may not accurately predict genuine position changes even in low-noise environments. FIG. 37A compares the output of predictor $x_{8,1}$ with the "true" position. It is clear that the accuracy produced by this predictor is inferior to that of $x_{8,2}$, shown in FIG. 35A, because the linear model polynomial is a poor approximation for x(t) over the long time period covered by the eight previous measurements. Thus, accuracy can be improved by reducing the number of previous measurements to cover a shorter duration of time, as shown in FIG. 37B for the particular x(t) and noise model chosen for simulation.

Hence, the complex compromise between increased precision (i.e., lower noise sensitivity) and accuracy is summarized as follows:

Precision increases with increasing number of past data points (taps) m, and decreases with increasing model polynomial order n; and Accuracy increases with increasing model polynomial order n, and decreases with increasing number of past data points (taps) m.

A Class of Smoothing Algorithms for Macrostep Coordinates

Linear Least-Squares Solution

The accuracy with which the stored coordinates of a macrostep are known can be substantially improved by systematically using the coordinates of neighboring points (sampled uniformly at a multiple of the 80 microsecond capture interval) to "smooth" the macrostep coordinates. The approach to smoothing is similar to the approach to prediction, detailed above. Given a set consisting of 2m+i position measurements $\{r(t_{-m}), \ldots, r(0), \ldots, r(t_m)\}$ sharing a common spatial origin and sampled uniformly in time (i.e., $t_k=k\Delta t$, $k \in \{-m, \ldots, 0, \ldots, m\}$), a refined value for r(0), the position at time to =0, is sought. Once again, the functional dependence of the x and y coordinates on time is modeled as the polynomial of order n<2m+1 given by (26), and each position measurement is assumed to be limited by a statistical error characterized by the same standard deviation $\sigma_0$. $X^2$ for each choice of m and n is defined as $$x_{m,n}^2 = \sum_{k=-m}^{m} [x_k - p_n(t_k)]^2 \quad (32)$$

the gradient of $x_{m,n}^2$ with respect to the polynomial coefficients $\{\alpha_j\}$ is required to vanish identically. Once again, n+1 independent equations in the n+1 unknown parameters are obtained, which can be solved algebraically to obtain $p_n(0)=\alpha_0$. Each such solution is a linear combination of the 2m+1 recorded position measurements, so that the smoothed value of the position at time $t_0=0$ has the form $$r_{m,n} = \sum_{k=-m}^{m} \beta_k r_k. \quad (33)$$

In practice, the symmetric placement of past measurements about t=0 eliminates the contributions to $r_{m,n}$ (i.e., to $\alpha_0$) made by terms in (26) with odd powers. Hence, for example, $r_{m,2l+1}$, $=r_{m,2l}$, where $\iota\epsilon Z>0$. However, higher-order coefficients $\alpha_j$, where $j \epsilon Z>0$, are generally unique.

Simulation Results and the Precision/Accuracy Compromise

For example, in the specific case where nine position measurements are used to derive a second-order polynomial which minimizes the sum of the squared deviations between these measurements and the smoothed position computed using the polynomial, $$r_{4,2}=\tfrac{1}{231}[59r_0+54(r_1+r_{-1})+39(r_2+r_{-2})+14(r_3+r_{-3})-21(r_4+r_{-1})]. \quad (34)$$

Figure 38A:
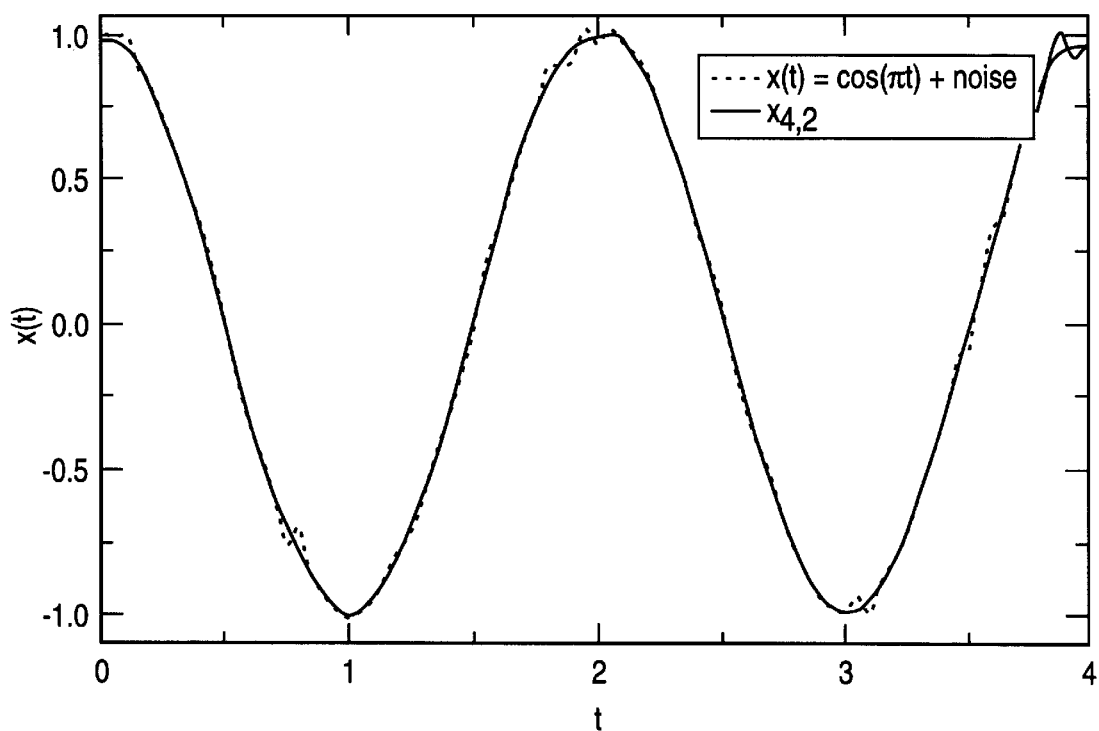
FIGS. 38A and 38B are diagrams showing the comparison of simulated position data and the corresponding output of the smoother $x_{4,2}$ given by the x component of (34). The simulated data was generated by adding Gaussian noise with zero mean and a standard deviation of 0.05 to the function cos($\pi$t) then sampling that function at the time interval $\Delta t=0.05$.
Figure 38B:
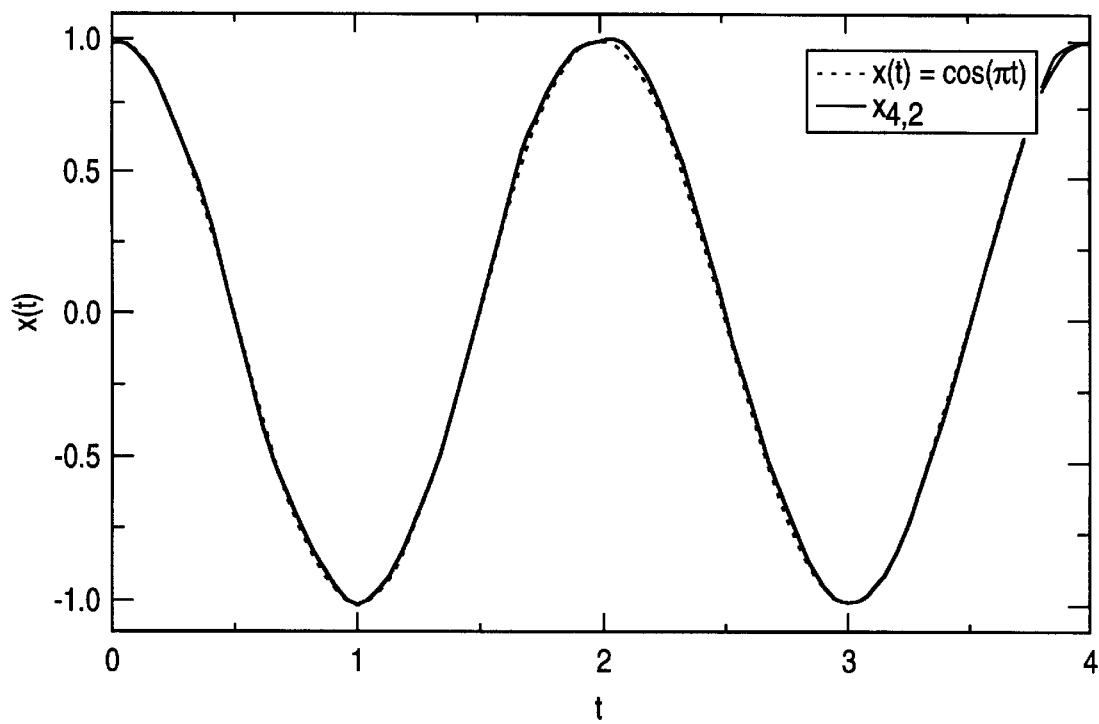
Figure 39A:
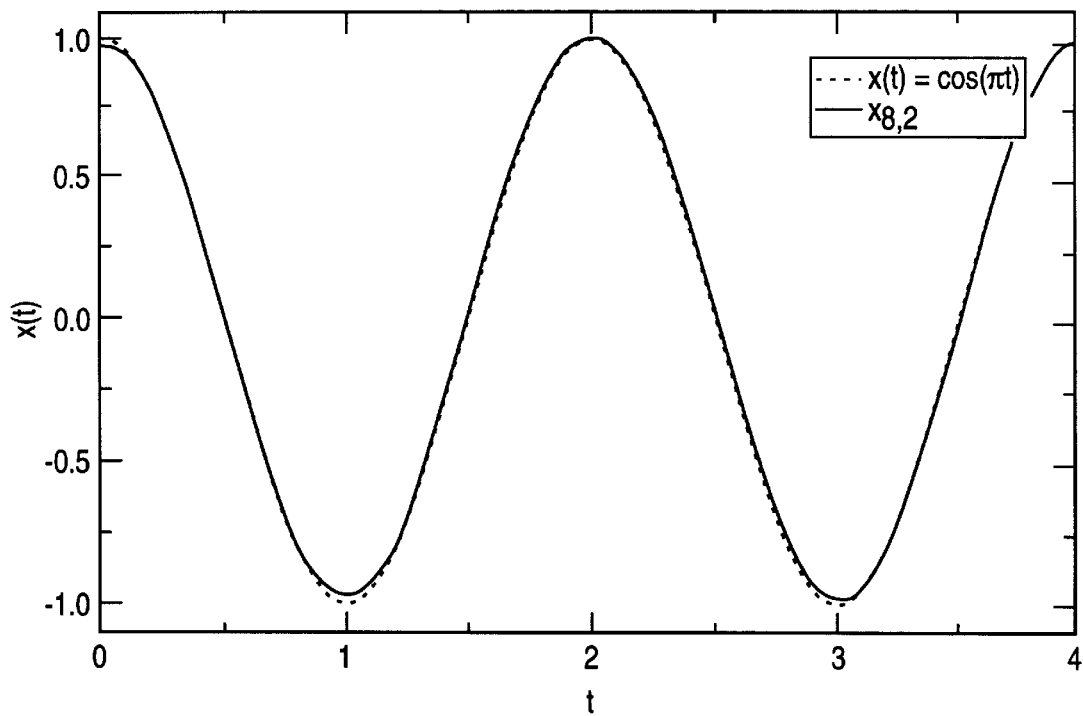
FIGS. 39A and 39B are diagrams showing a comparison of simulated position data and the corresponding output of two 17-tap smoothers. The simulated data was generated by adding Gaussian noise with zero mean and a standard deviation of 0.05 to the function cos($\pi$t), and then sampling that function at the time interval $\Delta t=0.05$.
Figure 39B:
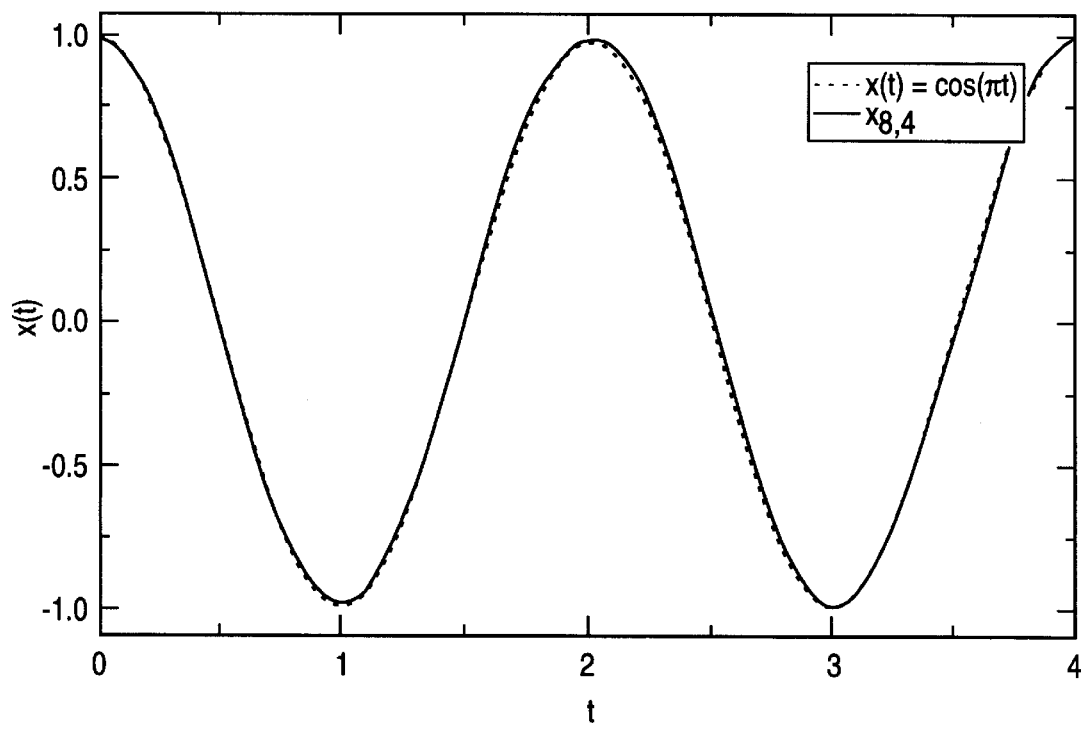

The graphs in FIGS. 38A and 38B compare simulated position data and the corresponding output of the smoother $x_{4,2}=\hat{x}\cdot r_{4,2}$. The simulated data was generated by adding Gaussian noise with zero mean and a standard deviation of 0.05 to the function cos ($\pi$t), and then sampling that function at the time interval $\Delta t=0.05$ (giving 40 sample points per period). FIG. 38A shows how the nine taps of $x_{4,2}$ has substantially reduced the typical size of the fluctuations in the noisy sample, and FIG. 38B shows that it has recovered the underlying "true" position reasonably. Still better performance is provided by the 17-tap smoother $x_{8,2}$, as shown in FIG. 39A. Then, unlike the case for the corresponding predictor, FIG. 39B shows that increasing the order of the model polynomial from two to four results in somewhat improved performance, due to the increased accuracy of the fourth-order model polynomial.

Finally, the uncertainty in the smoothed value of either $X_{m,n}$ or $Y_{m,n}$ caused by sensitivity to statistical errors is measured in the neighboring measurements. The statistical errors in consecutive measurements are assumed to be uncorrelated, allowing the standard error propagation formula (2) to be used $$\sigma_{m,n}^2 = \sigma_0^2 \sum_{k=-m}^{m} \left(\frac{\partial}{\partial x_k} x_{m,n}\right)^2 = \sigma_0^2 \sum_{k=-m}^{m} \beta_k^2. \quad (35)$$

Figure 40:
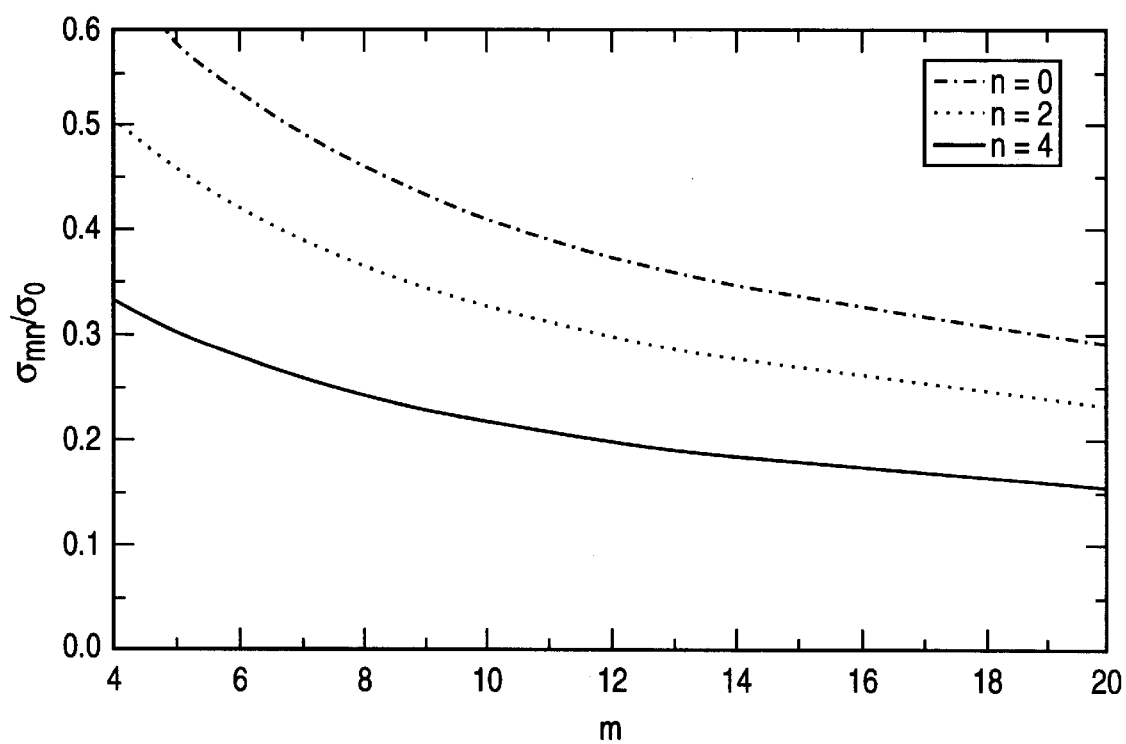
FIG. 40 is a diagram illustrating the ratio of the statistical uncertainty in the smoothed value of $x_{m,n}$ (or $y_{m,n}$) to the standard deviation of the statistical error in a single navigator position measurement.
Figure 41A:
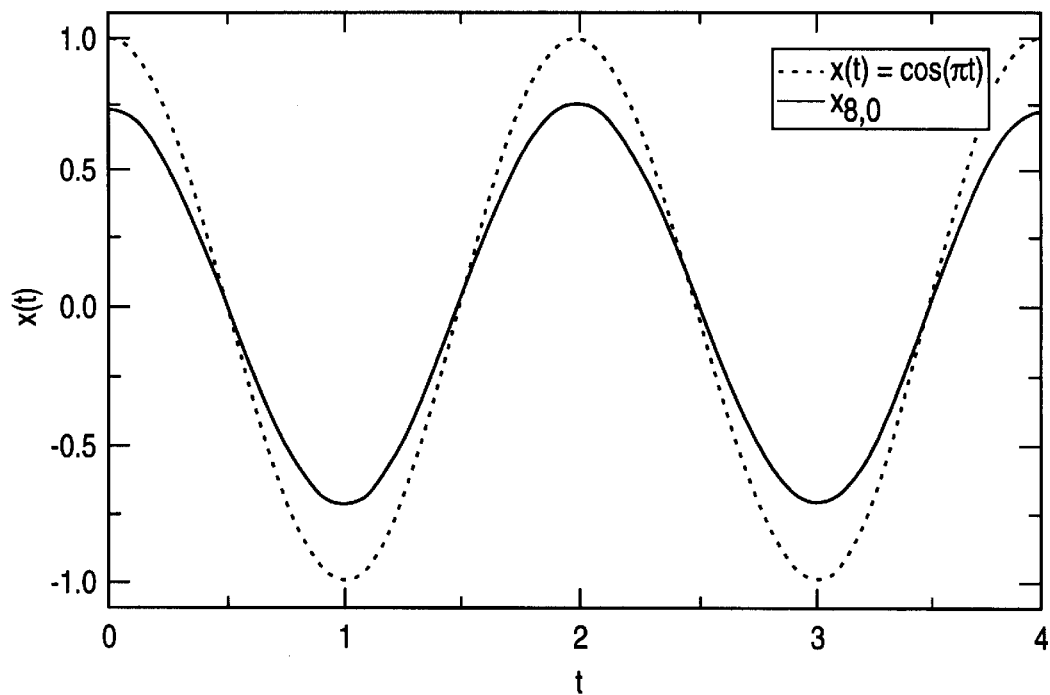
FIGS. 41A and 41B are diagrams showing a comparison of simulated position data and the corresponding output of two constant (i.e, simple averaging) smoothers. The simulated data was generated by adding Gaussian noise with zero mean and a standard deviation of 0.05 to the function cos($\pi$t), and then sampling that function at the time interval $\Delta t=0.05$.
Figure 41B:
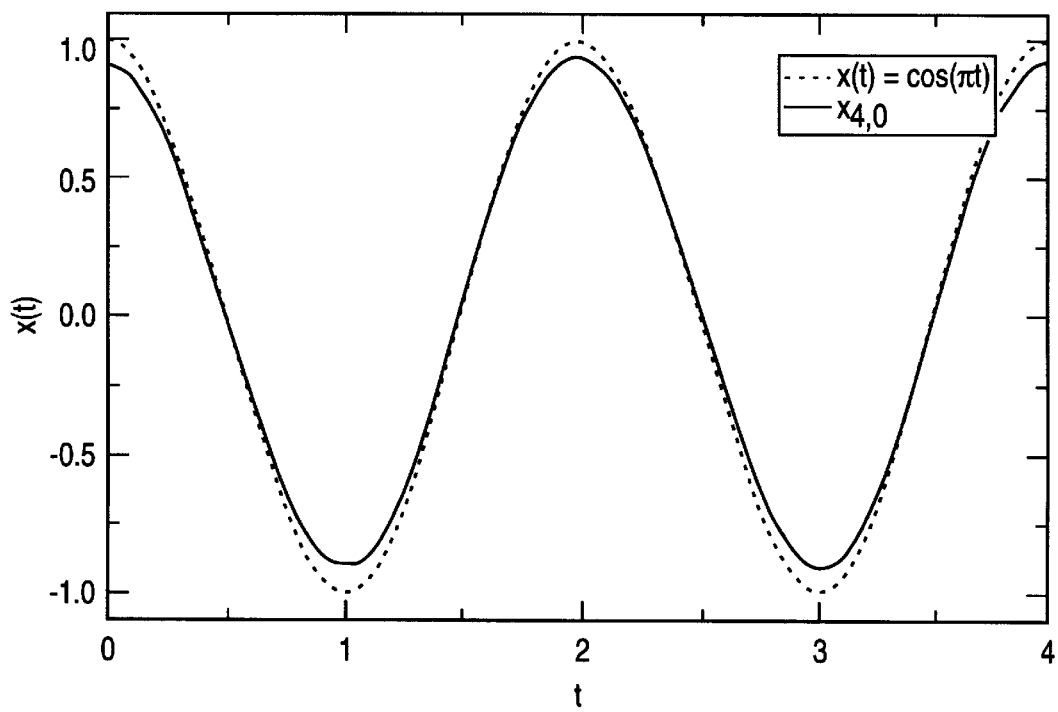
Figure 42A:
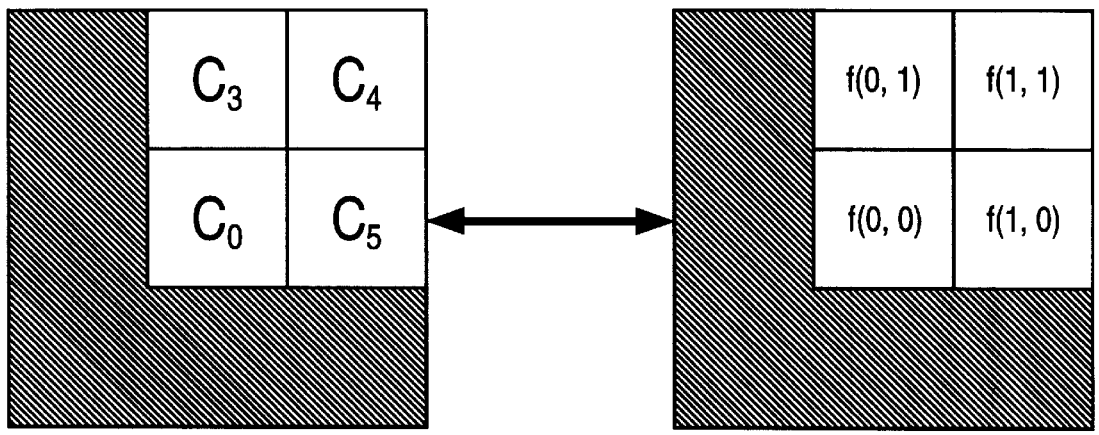
FIGS. 42A, 42B, 43A and 43B are diagrams illustrating alternative six-cell mappings of correlation coefficients to fucntion values.
Figure 42B:
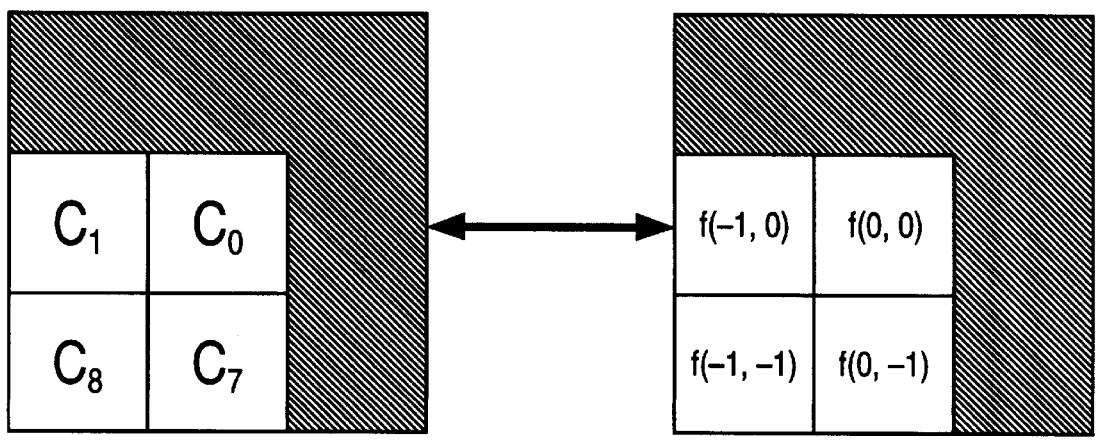
Figure 43A:
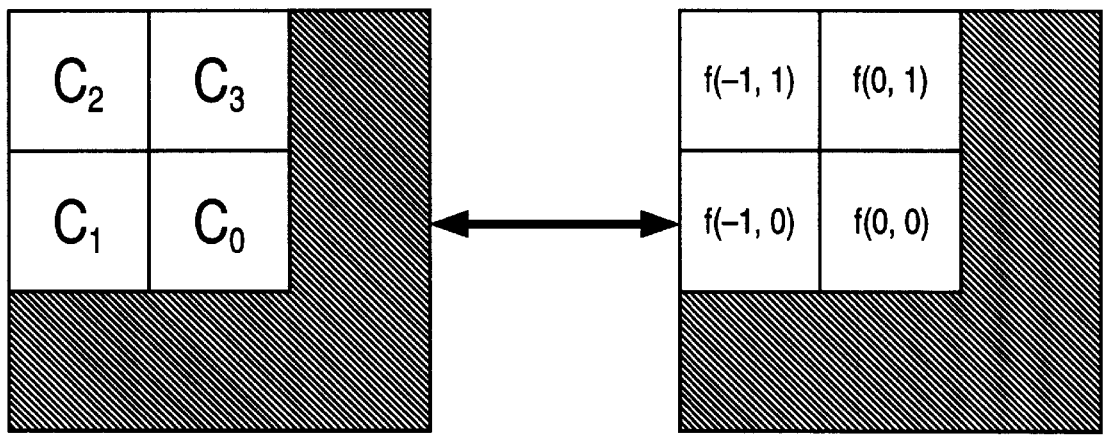
Figure 43B:
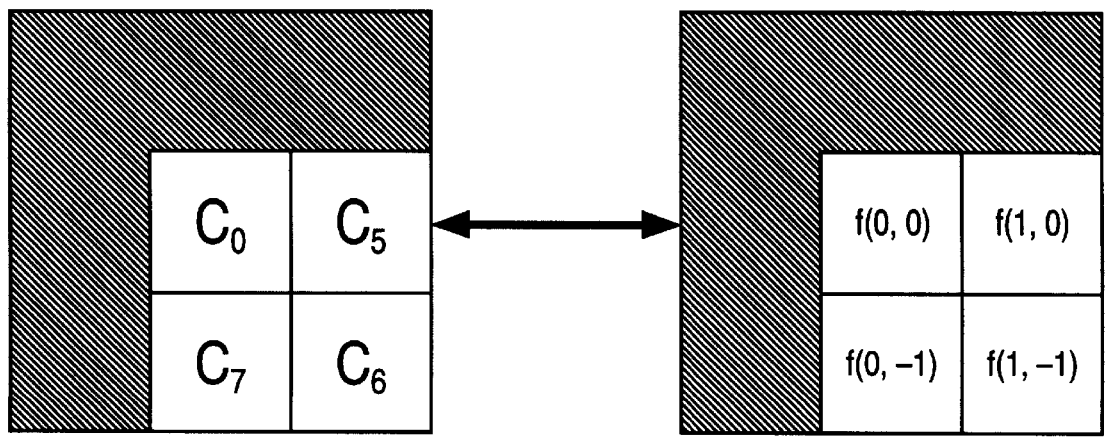
Figure 44A:
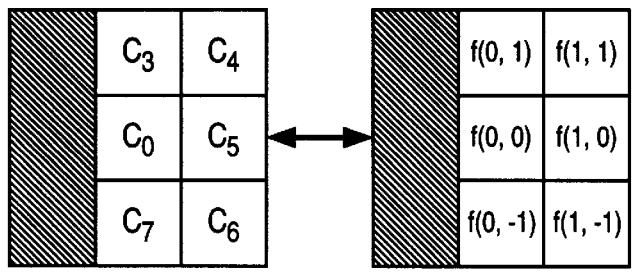
FIGS. 44A, 44B, 44C and 44D are schematic diagrams illustrating formulas for implementing the reduced second-order navigation algorithm for four 6-cell subarrays, where $b_{10}=6a_{10}$, $b_{01}=6a_{01}$, $b_{11}=6a_{11}$, $b_{20}=12a_{20}$, and $b_{02}=12a_{02}$.
Figure 44B:
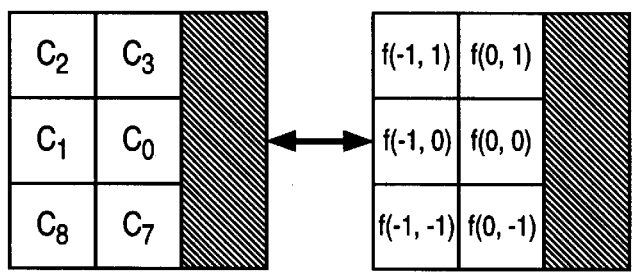
Figure 44C:
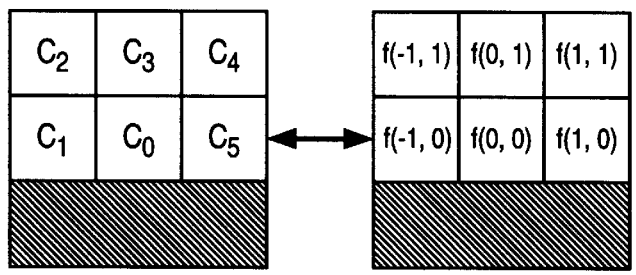
Figure 44D:
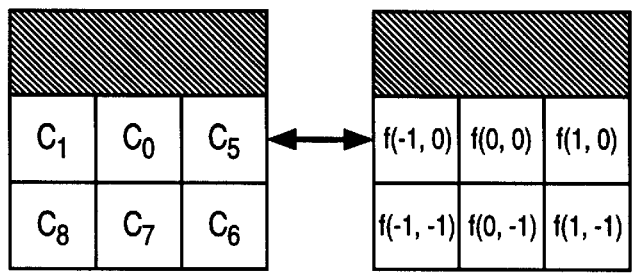

For the smoother given by (34), $\sigma_{4,2}=\sqrt{59/231}\sigma_0=0.51\sigma_0$. FIG. 40 extends this calculation to a wider range of examples. Note that the least sensitivity to statistical uncertainty is provided by the simple average n=0, where $\beta_k=1/(2m+1)$, $k \in \{-m, \ldots, 0, \ldots, m\}$. However, the accuracy of this smoother would be sufficient only in the extreme case where the velocity of the navigator is so small that the change in position from one measurement to the next could be ignored. For example, FIG. 41A shows the substantial degradation in accuracy resulting from the 17-tap averaging (i.e., zero th-order) smoother $x_{8,0}$. FIG. 41B displays the improved accuracy achieved by reducing the number of taps to nine, but (as quantified in FIG. 40 at the expense of increased sensitivity to noise.

The compromise between increased precision (i.e., lower noise sensitivity) and accuracy above applies equally well to the class of smoothing algorithms derived here.

Navigation Path Reconstruction

Description of the Reference Frames

There are four principal reference frames in the navigator/scanner system, of three distinct types:

1. The navigator reference frames. There are two navigator photodetector arrays, each with its own coordinate system. The origin of each navigator coordinate system is located at the center of the corresponding photodetector array. FIGS. 45A and 45B show the navigator coordinate systems embedded in the calibration reference frame. 2. The calibration reference frame. The calibration reference frame is essentially the scanner reference frame. In this frame, both navigators and the CIS array are frozen at specified coordinates with particular orientations. The calibration coordinate space is spanned by two left-handed unit vectors, $\{\hat{u}\hat{v}\}$, which are respectively perpendicular and parallel to the vector joining the origin of navigator1 to that of navigator2. Therefore, any vector can be represented in the calibration frame by $r=u\hat{u}+v\hat{v}$. The origin of the reference frame of navigator1 is located at r=0 (the origin of the calibration frame), while the origin of the navigator2 frame is located at $r=D\hat{v}$. The axes of the navigator1 coordinate system are oriented relative to those of the calibration frame by an angle $\theta_1$; the corresponding orientation angle for navigator2 is $\theta_2$. Note that both rotation angles $\theta_1$ and $\theta_2$ are shown as positive in FIGS. 45A and 45B; however, in FIGS. 46A and 46B, $\theta_2$ is shown as negative.

The paper reference frame.

Figure 47:
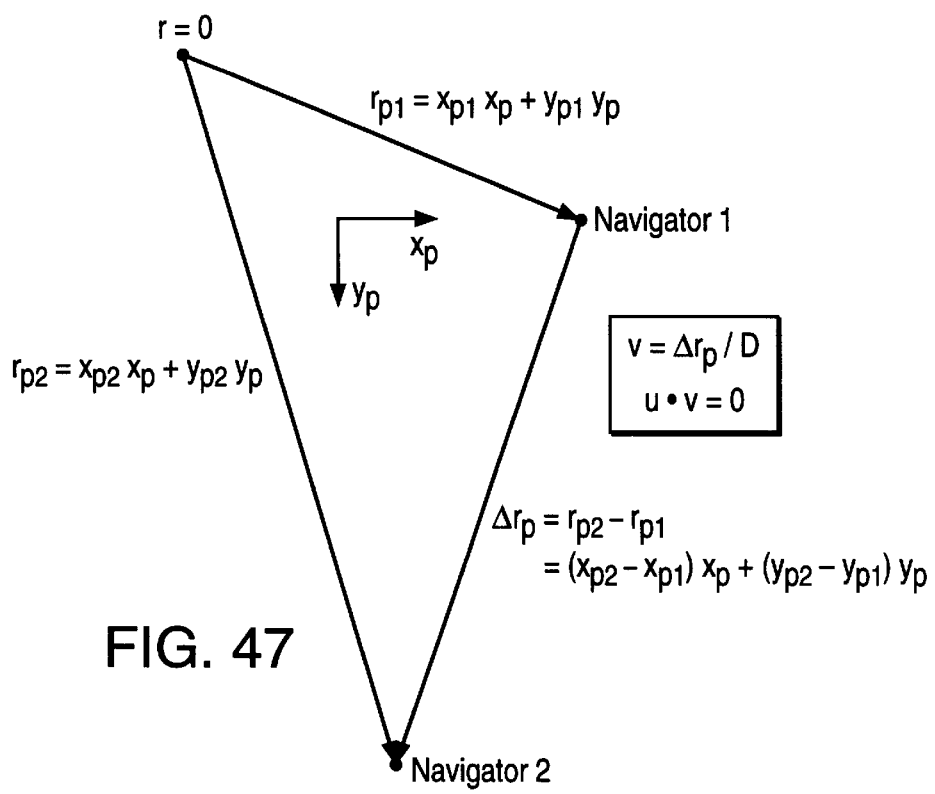
FIG. 47 is a schematic diagram showing geometric calculation of the calibration basis vector components in the paper frame, using the coordinates of the navigator photodetector array origins.

When the ultraportable scanner is first placed on the paper and activated, the calibration frame is coincident with the reference frame of the surface to be scanned. At this time, the coordinates of the origins of the first and second navigator photodetector arrays are $\{0, 0\}$ and $\{0, D\}$, respectively, in both the calibration and paper reference frames. However, as shown in FIG. 46B, at some later time during the scan the calibration frame will have translated and rotated with respect to the paper frame, which is spanned by the two constant left-handed unit vectors $\{\hat{x}_p\hat{y}_p\}$. The navigator1 and the navigator2 frame origins generally will be located at $\{x_{p1},y_{p1}\}$ and $\{x_{p2},y_{p2}\}$, respectively. Hence, as shown in FIG. 47, the components of the calibration unit vectors $\hat{u}$ and $\hat{v}$ in the paper reference frame can be computed by (a) computing the vector difference $\Delta r \equiv r_{p2} - r_{p2}$, and then dividing the result by D to obtain $\hat{v}$; and (b) finding the unit vector $\hat{u}$ which is orthogonal to $\hat{v}$, and is equal to $\hat{x}_p$ when $x_{p2} = x_{p1}$ and $y_{p2} - y_{p1} = D$.

Therefore, the transformation equations $$\hat{u} = \frac{y_{p2} - y_{p1}}{D}\hat{x}_p - \frac{x_{p2} - x_{p1}}{D}\hat{y}_p, \text{ and} \qquad (36a)$$

$$\hat{v} = \frac{x_{p2} - x_{p1}}{D}\hat{x}_p - \frac{y_{p2} - y_{p1}}{D}\hat{y}_p \qquad (36b)$$

are obtained.

Consequently, any vector represented in the calibration frame by $r = u\hat{u} + v\hat{v}$ can be rewritten without trigonometry in paper coordinates simply by using the known positions of the navigator arrays and (36a)–(36b) to represent both $\hat{u}$ and $\hat{v}$ in the paper frame.

Navigator Frames→Calibration Frame

In determining the transformations that express the displacements registered by each of the two navigators in terms of calibration frame coordinates, both the distinct magnifications of the two photodetector arrays, and the right-handed coordinate system of navigator2 must be taken into account. First, referring to FIG. 45A, the components of the translation vector $\{\Delta u_1, \Delta v_1\}$ of navigator1 in the calibration frame are computed in terms of the computed navigator displacement vector $\{\Delta x_1, \Delta y_1\}$. The rotation angle $\theta_1$ is constant, fixed at the time of manufacture; hence, the coordinate transformation from navigator frame 1 to the calibration frame can be performed using a constant two-dimensional rotation matrix. The result is then multiplied by the dimensionless constant magnification $m_1$ of navigator1 to obtain $$\Delta u_1 = m_1(c_1 \Delta x_1 + s_1 \Delta y_1), \qquad (37a)$$

and $$\Delta v_1 = m_1(-s_1 \Delta x_1 + c_1 \Delta y_1) \qquad (37b)$$

where $c_1 \equiv \cos \theta_1$ and $s_1 \equiv \theta_1$. Similarly, using figure 1(b) for navigator2, $$\Delta u_2 = m_2(c_2 \Delta x_2 + s_2 \Delta y_2) \qquad (38a)$$

$$\Delta u_2 = m_2(s_2 \Delta x_2 + c_2 \Delta y_2) \qquad (38b)$$

Here $m_2$ is the dimensionless magnification of navigator2, $c_2 \equiv \cos \theta_2$. Note that the inversion of navigator2 has been implicitly taken into consideration by changing the sign of $\Delta y_2$.

Note that $m_1, m_2, c_1, s_1, c_2$, and $s_2$, can be calibrated (i.e., either fixed or measured) at the time of manufacturing, and their suitably digitized values can be embedded in ROM. (37a)–(38b) can be further simplified by absorbing the magnification constants into the trigonometric constants, and absorbing another factor of 1/D into these constants to eliminate the explicit division in (36a)–(36b).

Calibration Frame→Paper Frame

Given the navigator translation vectors expressed in calibration frame coordinates, the positions of the origins of each navigator in the paper reference frame are updated using the technique discussed above. First, a useful constraint equation is developed that can be dynamically applied to the computed positions of the navigator origins in the calibration frame.

Figure 48:
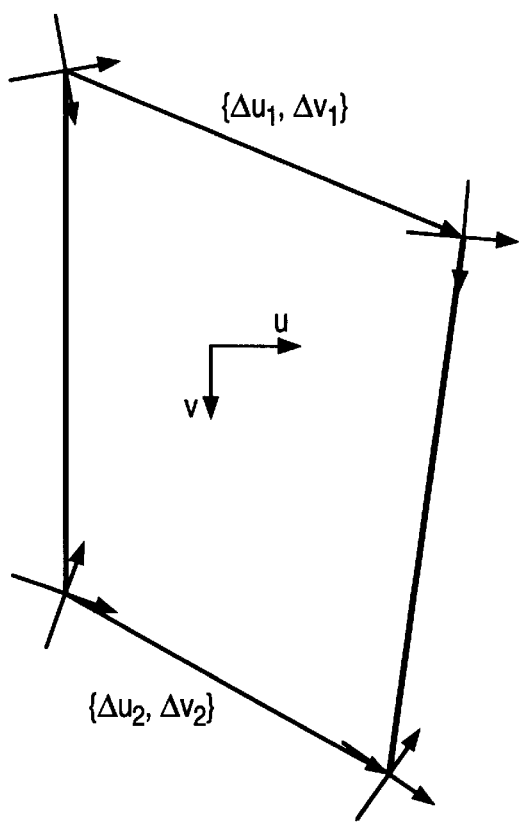
FIG. 48 shows translations of the two navigators in the calibration frame.

In the calibration frame that is shown schematically in FIG. 48, the coordinates of the translated origins of navigator frames 1 and 2 are $\{\Delta u_1, \Delta v_1\}$ and $\{\Delta u_2, D + \Delta v_2\}$, respectively. Since the distance between the two navigators remains constant, $$D^2 = \Delta u_2 - \Delta u_1)^2 + (D + \Delta v_2 - \Delta v_1)^2, \text{ or } (\Delta v_2 - \Delta v_1)^2 + 2D(\Delta v_2 - \Delta v_1) + (\Delta u_2 - \Delta u_1)^2 = 0 \qquad (39)$$

Solving (39) for $\Delta v_2 - \Delta v_1$ in the case where $(\Delta u_2 - \Delta u_1)^2 \ll D^2$, $$\frac{\Delta v_2 - \Delta v_1}{D} \approx -\frac{1}{2}\left(\frac{\Delta u_2 - \Delta u_1}{D}\right). \qquad (40)$$

In the extreme case of rapid relative rotation, it is possible to obtain values of $|\Delta u_2 - \Delta u_1|$ as large as 1/200 in. Then, for $D=3$ in., $|\Delta v_2 - \Delta v_1|/D \approx 10^{-6}$.

Therefore, the constraint that the distance separating the navigator arrays remain constant is approximately equivalent to the condition that $\Delta v_1 = \Delta v_2$. In one embodiment, the translation of each navigator is compared with the position predictor module of the navigation algorithm, and then a value of $\Delta v$ is chosen which is closest to the prediction. Alternatively, the motion of each navigator (e.g., compute the velocity and acceleration in real time), can be examined and then—based on full-motion experiments—the navigator which is most likely to give the correct displacement could be identified, and the corresponding $\Delta v$ adopted for both navigators.

After this adjustment has been made, and the criterion (40) satisfied, the navigator displacements in the paper frame are computed using the expressions $$\Delta r_{p1} = \{\Delta x_{p1}, \Delta y_{p1}\} = \Delta u_1 \hat{u} + \Delta v_1 \hat{v}; \qquad (41a)$$

and $$\Delta r_{p2} = \{\Delta x_{p2}, \Delta y_{p2}\} = \Delta u_2 \hat{u} + \Delta v_2 \hat{v} \qquad (41b)$$

where the unit vectors $\hat{u}$ and $\hat{v}$ are defined in the paper reference frame by (36a)–(36b). In other words, the equations giving the navigator displacements in the paper frame look identical to the corresponding formulas in the calibration frame. However, in (41a)–(41b), $\hat{u}$ and $\hat{v}$ are not constant unit vectors; in the paper frame, they translate and rotate with the scanner head according to (36a)–(36b).

The navigator origin coordinates are then updated by adding $\Delta r_{p1}$ and $\Delta r_{p2}$ to the previous navigator positions $r_{p1}$ and $r_{p2}$ respectively:

$$x'_{p1} = x_{p1} + \frac{\Delta u_1}{D}(y_{p2} - y_{p1}) + \frac{\Delta v_1}{D}(x_{p2} - x_{p1}), \qquad (42a)$$

$$y'_{p1} = y_{p1} + \frac{\Delta u_1}{D}(x_{p2} - x_{p1}) + \frac{\Delta v_1}{D}(y_{p2} - y_{p1}) \qquad (42b)$$

$$x'_{p2} = x_{p2} + \frac{\Delta u_2}{D}(y_{p2} - y_{p1}) + \frac{\Delta v_2}{D}(x_{p2} - x_{p1}), \text{ and} \qquad (42c)$$

$$y'_{p2} = y_{p2} + \frac{\Delta u_2}{D}(x_{p2} - x_{p1}) + \frac{\Delta v_2}{D}(y_{p2} - y_{p1}) \qquad (42d)$$

Equations (42a)–(42d) can be further simplified by absorbing the factor of 1/D into the trigonometric constants used in (37a)–(38b) to eliminate the explicit division.

Updating the CIS Endpoint Coordinates

From FIG. 46A, the coordinates of the endpoints of the CIS array after the navigator positions have been updated can be readily determined. (This process can be carried out offline if necessary, since the positions of the navigators do not depend on those of the CIS array endpoints.) In the calibration frame, CIS endpoints 1 and 2 are displaced from navigator1 and navogator2 by the signed vectors $\{a_1,b_1\}$ and $\{a_2,b_2\}$, respectively. In the paper frame, the positions of the CIS endpoints are given by $$r'_{c1}=r'_{p1}+a_1\hat{u}'+b_1\hat{v}', \qquad (43a)$$

and $$r'_{c2}=r'_{p2}+a_2\hat{u}'+b_2\hat{v}' \qquad (43b)$$

where $r'_{p1}\equiv\{x'_{p1}\}$, $r'_{p1}\equiv\{x'_{p2},y'_{p2}\}$, and $\hat{u}$ and $\hat{v}$ are given by (36a) and (36b), respectively, using the updated (primed) coordinates of the navigator origins previously computed using (42a)–(42d). Hence, $$x'_{c1} = x'_{p1} + \frac{a_1}{D}\left(y'_{p2} - y'_{p1} + \frac{b_1}{D}(x'_{p2} - x'_{p1})\right) \qquad (44a)$$

$$y'_{c1} = y'_{p1} + \frac{a_1}{D}\left(x'_{p2} - x'_{p1} + \frac{b_1}{D}(y'_{p2} - y'_{p1})\right) \qquad (44b)$$

$$x'_{c2} = x'_{p2} + \frac{a_2}{D}\left(y'_{p2} - y'_{p1} + \frac{b_2}{D}(x'_{p2} - x'_{p1})\right), \text{ and} \qquad (44c)$$

$$y'_{c2} = y'_{p2} + \frac{a_2}{D}\left(x'_{p2} - x'_{p1} + \frac{b_2}{D}(y'_{p2} - y'_{p1})\right) \qquad (44d)$$

(44a)–(44d) can be further simplified by absorbing the common factor of 1/D into the CIS displacement constants $a_1$, $b_1$, $a_2$ and $b_2$.

Computational Algorithm

FIG. 49 lists the sequence of formulas needed to completely implement the worst-case navigation path reconstruction algorithm. First, an optimized set of ROM-stored constants is defined, consisting entirely of quantities that can either be fixed or measured accurately at the time of manufacturing and which eliminate the need for an explicit division operator (or, equivalently, the need for multiplication by 1/D):

$$C_1 = \frac{m_1}{D}\cos\theta_1 \qquad C_2 = \frac{m_2}{D}\cos\theta_2$$

$$S_1 = \frac{m_1}{D}\sin\theta_1 \qquad S_2 = \frac{m_2}{D}\sin\theta_2$$

$$A_1 = \frac{a_1}{D} \qquad B_1 = \frac{b_1}{D}$$

$$A_2 = \frac{a_2}{D} \qquad B_2 = \frac{b_2}{D}$$

In addition, there are four temporary variables defined in FIG. 49 that simplify the computations by reducing the number of arithmetic operations needed.

In the best case, the navigator photodetector arrays are perfectly aligned, so that $S_1=S_2=0$, and $A_1=A_2=0$, so that the CIS array is not translated in the $\hat{u}$ direction relative to the navigator origins in the calibration frame. Examination of the sequence of steps shown in FIG. 49, and estimation of the number of binary arithmetic operations required for each step in both the worst and best cases has yielded the results shown in table 1. These results indicate that binary arithmetic operations can be reduced by more than 30% by carefully controlling the manufacturing process to minimize misalignments and translations. In any case, since neither division or multiplication is required, and the fourth step (computing the CIS array endpoint coordinates) can be carried out offline, the computational cost of real-time navigation path reconstruction is relatively small.

TABLE 1

| Step | Worst case | | | Best case | | |
| --- | --- | --- | --- | --- | --- | --- |
| | mul | add | sub | mul | add | sub |
| 2 | 8 | 2 | 2 | 4 | 0 | 0 |
| 3 | 8 | 6 | 4 | 8 | 6 | 4 |
| 4 | 8 | 4 | 6 | 4 | 2 | 4 |
| Total | 24 | 12 | 12 | 16 | 8 | 8 |

The position-tagged data stream at the output 86 of the navigation processor 80 may be first stored in image space that allows the image to fill memory locations which provide continuity in both the X and Y axes. Consequently, image acquisition is not restricted to scanning from an upper-left corner of an original to the lower-right corner. Because each image pixel is associated with a relative (X,Y) displacement from an arbitrary starting point, the image can expand in X and Y to the full size of the image memory.

The imaging sensor 22 is clocked as the scanning device moves across an original. The clocking ensures that the fastest moving element of the sensor samples at least once per pixel displacement. As previously noted with reference to FIG. 6, in the case of significant curvature of the scanning device 10 during image capture, one end of the imaging array will translate more rapidly than the other end, causing pixels at the slower end to be oversampled. This situation can be handled by either recording the most recent reading (for grayscales) or by recording in a logical OR mode (for binary images) at a specific pixel location in image space.

The next operation is to map the position-tagged increments. In one embodiment, the end points of the increments are joined by a line. Since the distance of each pixel of the imaging sensor 22 is fixed, the physical location of the pixels relative to the line can be calculated. One approach for determining the physical locations of each pixel is a modification of the Bresenhamn Raster Line Technique. The modification is that because the array of pixels in the imaging sensor is fixed, the line loop will be fixed at that same number. That is, the usual Bresenham algorithm is one in which the number of iterations in the line loop is the greater of delta_x and delta_y, i.e., max (delta_x, delta_y), but for the modified algorithm the number (N) of pixels along the array is used where max (delta_x, delta_y) is customarily used, so that the loop runs N times. The following program element describes this algorithm:

/*********************************************
** ***

Load pixel values with get_pixle( ) using location pairs (xa,ya) and (xb,yb) of the endpoints of an N-element array of pixel values using a modified Bresenham line draw algorithm

/*********************************************
** ***

```
delta_x=xb-xa;
delta_y=yb-ya;
inc_x=(delta_x>0)-(delta_x<0);  /* increments are +1 or -1*/
inc_y-(delta_y>0)-(delta_y<0);
delta_x *=inc_x;  /* take absolute values */ delta_y *=inc_y;
x=xa;
y=ya;
x_err-0;
y_err-0;
for (i=0; i<N; i++)
```

```
55 get_pixel (i/2, x/2, y/2);
x_err+=delta_x;
y_err+=delta_y;
if (x_err>=N)
{x_err-=N; x+=inc_x;
}
if (y_err>=N)
{y_err-=N;
y+=inc_y;}
}
}
```

Thus, given two points on a raster (xa,ya) and (xb, yb) which are the end points of an imaging sensor of N pixels, the purpose is to find successively the points (x, y) on the raster where each pixel is to be read. These points form the best approximation to a straight line connecting the end points at a and b. Take the differences in x and y. From the sign of the distances between a and b, determine whether x and y will be incremented or decrement as the line is traversed. Start at x=xa, y=ya, with two error registers x_err and y_err set to zero and begin the loop. Next, read the value at (x, y) and write it to the output raster using get_pixel ( ). Given a linear image sensor with half the resolution of the navigation, use i/2, x/2, y/2 for the pixel number in the sensor and the position in the output raster. Add delta_x and delt_y to the respective error registers, then test both error registers to see if they exceed N. If so, subtract N from them and change x and/or y by the increment. If an error register does not exceed the N, continue to use the current value of x or y. The process continues until the loop has run N times.

The next step is to stitch successive image swaths within their region of overlap. This must be done in such a way as to identify and correct most of the accumulated navigation error and to mask any residual error. This "masking" can be done in areas of black print on a white background, for example, by stitching only in white space areas, i.e. areas with intensity values above a pre-described or adaptive threshold. The following paragraphs describe how redundant data from areas of overlap is identified (to be discarded) and how the navigation error is measured and corrected.

Techniques for stitching image swaths are known in the scanning art. These techniques typically require a pair of complete image swaths and produce a single, global transformation which brings the two swaths into registration. In this case, however, continuous navigation data provides the registration information needed for stitching. Since the navigation signal tends to accumulate error, it is continually amended by feeding back a correction signal derived from analysis of feature offsets.

Figure 12:
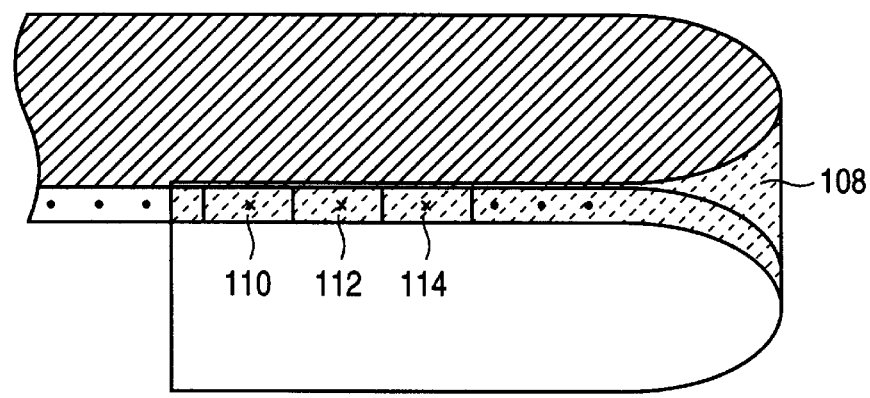

Some area of overlap is necessary in order to stitch two image swaths, since the navigation correction is calculated by correlating features within the area. Consider the situation portrayed in FIG. 11, where the Swath #1 is being resampled by the return pass, Swath #2. At time T, a partial swath has thus far been scanned. FIG. 12 highlights this overlap area 108. As shown in FIG. 12, during collection of Swath #1, quadrilateral image segments (henceforth called "registration tiles") are periodically labeled along the lower edge of the swath with the location of Tags 110, 112 and 114 that are described above. On a later pass (Swath #2) the "Surplus Overlap Area" 108 above the tagged areas of Swath #1 is clipped, using navigation information to determine where to clip. As each segment length in Swath #2 is acquired, the registration tile from Swath #1 is located in the top of what remains of Swatch #2, after the "surplus" has been clipped. If the navigation data is perfect, there will be no offset between the location of Tag #1 and the location of tile's rescanned image in Swath #2. More realistically, some navigation error will have accumulated since the last registration was performed. The offset between these two tiles produces a correction factor which is then used to update future navigation position-tags, associated with the data, in order to minimize the total accumulated error. In this way the total accumulated error in the navigation data is prevented from growing so large that it introduces an obvious distortion in the region of the swath overlap.

Since both Swath #1 and Swath #2 are combined to produced a single image, a buffer is used to temporarily store a copy of an original registration tile until Swath #2 has been located in it. The entire registration tile could be used for this correlation, but in the preferred embodiment a small area of high-frequency contrast (henceforth called "feature") consisting of a rectangular tile (e.g., 15×15 pixels) of grey scale image is located within the registration of Swath #1 and saved to buffer. When the location of this feature is crossed for a second time, the offset between the location of the saved feature and the same feature in Swath #2 produces a navigation correction signal, i.e. the translation required to bring the two features into close correspondence. While other correlation approaches could be employed, an acceptable approach is a "sum of squared difference" correlation. A small search area is defined around the original location of the feature and correlation coefficients are determined by equation:

$$C_{k,l} = \sum_i \sum_j (T_{i,j} - I_{i+k,j+1})^2$$

where $T_{i,j}$ denotes the grey scale values of the feature from Swath #1 and $I_{i+k,j+1}$ denotes the grey scale values of the newly acquired feature from Swath #2. Indices i and j specify locations within the features, while k and l specify the magnitude of the proposed translational offset (constrained to remain within the search space). The smallest element in the resulting correlation array denotes the offset between the two features. Sub-pixel positional accuracy may be obtained using interpolation to find the minimal of this bowl-shaped result.

Figure 13:
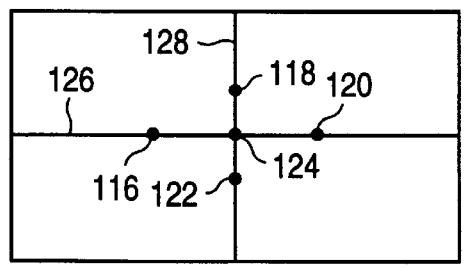
FIG. 13 is a representation of a registration tile that may be utilized to achieve stitching of successive swatches.

The feature within the registration tile is selected to maximize image variance, since this improves the accuracy of the correlation method. In one possible embodiment, only a subset of locations within the region is considered. These locations 116, 118, 120, 122 and 124 are shown in FIG. 13 as lying along the principal axes 126 and 128 of the registration tile (lines joining opposite midpoints of lines that define the region) and are sampled at the intersection and halfway between the intersection and each endpoint of the axis. For each location 116, 118, 120, 122 and 124, the variance $VAR_{k,l}$ is calculated using the equations:

$$SUM_{k,l} = \sum_i \sum_j I_{k+i,l+j}$$

$$SUM2_{k,l} = \sum_i \sum_j (I_{k+i,l+j})^2$$

$$VAR_{k,l} = SUM2_{k,l}/N - (SUM_{k,l})^2/N^2$$

In order to prevent obvious distortions in the final representative image, the error estimate is applied slowly; the "position-tags" are modified in small fixed magnitude steps as each new row of linear sensor data is loaded into memory, until there has been an accounting for the entire error.

In the preferred embodiment, the processing electronics for image reconstruction, stitching and image management is contained within the housing that defines the scanning device 10 of FIG. 1. Thus, the scanned image may be immediately presented at the image display 16. However, the scanning device may contain memory to store the position-tagged image data, but without processing and file management electronics and firmware.

As noted in reference to FIG. 3, the navigation and imaging sensors 22, 24 and 26 are preferably mounted on a pivoting member 20. In one embodiment, the pivoting member is connected to the remainder of the housing by at least one elastomer for which one end of the elastomer is connected to the stationary portion of the housing and the other end is connected to the pivoting member. The elastomer acts as a hinge. Thus, the pivoting portion is allowed to "float" without the use of frictional elements. Power, control and data signals may be conducted to the sensors via flex cables that are shielded in order to minimize electromagnetic interference. Other methods of pivotally attaching the pivoting member can be used. If the pivoting member is deleted and the sensors are in a fixed position on the housing, care must be taken not to tilt the scanning device 10 excessively during image capture. In this embodiment, the design of illumination and optical elements must be given increased attention.

Although particular embodiments of the present invention have been shown and described, it will be obvious to those skilled in the art that changes and modifications can be made without departing from the present invention in its broader aspects. For example, while a hand-held scanner is described, the navigation method of the present invention is not limited to hand-held scanners or even to scanners. In fact, the navigation scheme of the invention can be applied to any device employing a sensor or other detector as a navigation tool. Therefore, the appended claims are to encompass within their scope all such changes and modifications that fall within the true scope of the present invention.

We claim:

1. A method for obtaining a navigational position of a sensor array, the method comprising:
   acquiring a reference frame through said sensor array;
   acquiring a sample frame through said sensor array;
   generating correlation data representing a relationship between a reference feature of both the sample frame and the reference frame; and
   determining a displacement of the reference feature in the sample frame relative to the reference frame based on the correlation data, wherein a global extremum of a correlation surface of the correlation data modeled as a general two-dimensional Taylor series expansion is used to determine the relative displacement.

2. The method of claim 1, wherein the general two-dimensional Taylor series expansion is second order.

3. The method of claim 1, wherein the correlation data further comprises a plurality of correlation coefficients generated using a correlation function.

4. The method of claim 3, further comprising applying a linear mapping between the correlation coefficients and the two-dimensional Taylor series expansion.

5. The method of claim 3, wherein the correlation function is a first order function.

6. The method of claim 3, wherein the correlation function is a second order function.

7. The method of claim 3, wherein the correlation function is a third order function.

8. The method of claim 1, wherein determining the displacement of the reference feature further comprises determining values of coefficients of the two-dimensional Taylor-series expansion.

9. The method of claim 8, further comprising computing a statistical fit of the correlation data to obtain the coefficients of the two-dimensional Taylor series expansion.

10. The method of claim 8, wherein at least one of the coefficients of the two-dimensional Taylor-series expansion is generated by using the reference frame as the sample frame.

11. The method of claim 1, wherein determining the displacement of the reference feature further comprises determining components of the displacement based on the values of the coefficients of the two-dimensional Taylor-series expansion.

12. The method of claim 10, further comprising:
   determining whether a precision estimate of the displacement of the reference feature is within a predefined set of predicted values.

13. The method of claim 10, further comprising:
   applying a correction function to the generated values of the displacement between the sample and the reference frames.

14. A scanning device comprising:
   at least one sensor array;
   a processor; and
   a computer program controlling the processor, the computer program comprising instructions for:
      acquiring a reference frame through said sensor array;
      acquiring a sample frame through said sensor array;
      generating correlation data representing a relationship between the sample frame and the reference frame; and
      determining a displacement of the reference feature in the sample frame relative to the reference frame based on the correlation data, wherein a global extremum of a correlation surface of the correlation data modeled as a general two-dimensional Taylor series expansion is used to determine the relative displacement.

15. The scanner of claim 14, wherein the general two-dimensional Taylor series expansion is second order.

16. The scanner of claim 14, wherein the correlation data further comprises a plurality of correlation coefficients generated using a correlation function.

17. The scanner of claim 16, further comprising applying a linear mapping between the correlation coefficients and the two-dimensional Taylor series expansion.

18. The scanner of claim 16, wherein the correlation function is a first order function.

19. The scanner of claim 16, wherein the correlation function is a second order function.

20. The scanner of claim 16, wherein the correlation function is a third order function.

21. The scanner of claim 14, wherein determining the displacement of the reference feature further comprises determining values of coefficients of the two-dimensional Taylor-series expansion.

22. The scanner of claim 21, further comprising computing a statistical fit of the correlation data to obtain the coefficients of the two-dimensional Taylor series expansion.

23. The scanner of claim 21, wherein at least one of the coefficients of the two-dimensional Taylor-series expansion is generated by using the reference frame as the sample frame.

24. The scanner of claim 14, wherein determining the displacement of the reference feature further comprises determining components of the displacement based on the values of the coefficients of the two-dimensional Taylor-series expansion.

25. The scanner of claim 24, further comprising:

determining whether a precision estimate of the displacement of the reference feature is within a predefined set of predicted values.

26. The scanner of claim 24, further comprising:

applying a correction function to the generated values of the displacement between the sample and the reference frames.

* * * * *